US009442015B2

(12) United States Patent
Kudenov et al.

(10) Patent No.: US 9,442,015 B2
(45) Date of Patent: Sep. 13, 2016

(54) SNAPSHOT SPATIAL HETERODYNE IMAGING POLARIMETRY

(71) Applicants: Michael W. Kudenov, Cary, NC (US); Michael J. Escuti, Cary, NC (US)

(72) Inventors: Michael W. Kudenov, Cary, NC (US); Michael J. Escuti, Cary, NC (US)

(73) Assignees: The Arizona Board of Regents on Behalf of the University of Arizona, Tucson, AZ (US); North Carolina State University, Raleigh, NC (US)

( * ) Notice: Subject to any disclaimer, the term of this patent is extended or adjusted under 35 U.S.C. 154(b) by 97 days.

(21) Appl. No.: 14/091,190

(22) Filed: Nov. 26, 2013

(65) Prior Publication Data
US 2014/0078298 A1    Mar. 20, 2014

Related U.S. Application Data

(63) Continuation-in-part of application No. 13/452,686, filed on Apr. 20, 2012, now Pat. No. 9,046,422, and a continuation-in-part of application No. 13/399,861, filed on Feb. 17, 2012, now Pat. No. 9,074,993, which
(Continued)

(51) Int. Cl.
| | |
|---|---|
| *G01J 4/00* | (2006.01) |
| *G02F 1/01* | (2006.01) |
| *G02F 2/00* | (2006.01) |
| *G01J 3/28* | (2006.01) |
| *G01J 3/447* | (2006.01) |

(Continued)

(52) U.S. Cl.
CPC .............. *G01J 4/00* (2013.01); *G01J 3/0208* (2013.01); *G01J 3/0229* (2013.01); *G01J*

*3/2803* (2013.01); *G01J 3/447* (2013.01); *G01J 3/4531* (2013.01); *G01J 4/04* (2013.01); *G02F 1/01* (2013.01); *G02F 2/00* (2013.01); *G01J 2003/452* (2013.01)

(58) Field of Classification Search
CPC ........... G01J 2004/0001; G01J 3/0208; G01J 3/0224; G01J 3/0229; G01J 3/2803; G01J 3/447; G01J 3/4531; G01J 3/457; G01J 4/00; G01J 4/02; G01J 4/04; G02F 2/00; G02F 2/004; G02F 2/02
See application file for complete search history.

(56) References Cited

U.S. PATENT DOCUMENTS 5,781,293 A * 7/1998 Padgett et al. ................ 356/453
7,038,776 B1 * 5/2006 Ansley et al. ................ 356/364
(Continued)

FOREIGN PATENT DOCUMENTS

CN     102116674     9/2012

OTHER PUBLICATIONS

Cao et al., "Snapshot imaging polarimeter using modified Savart polariscopes," *Appl. Opt.* 51:5791-5796 (2012).
(Continued)

*Primary Examiner* — Michael P LaPage
(74) *Attorney, Agent, or Firm* — Klarquist Sparkman, LLP

(57) ABSTRACT

Polarization based channeled images are optically demodulated to produce directly viewable images. A channeled image flux is converted to an unpolarized flux by a phosphor or other sensor, and the resulting converted flux is demodulated by modulating at a spatial frequency corresponding to a modulating frequency of the channeled image flux. After modulation, the converted flux is spatially filtered to remove or attenuate portions associated with the modulation frequency and harmonics thereof. The resulting baseband flux is then imaged by direct viewing, projection, or using an image sensor and a display.

19 Claims, 40 Drawing Sheets

Related U.S. Application Data is a continuation-in-part of application No. 13/225,315, filed on Sep. 2, 2011, now Pat. No. 9,068,928.

(60) Provisional application No. 61/463,488, filed on Feb. 17, 2011, provisional application No. 61/796,974, filed on Nov. 26, 2012, provisional application No. 61/517,481, filed on Apr. 20, 2011, provisional application No. 61/517,774, filed on Apr. 25, 2011, provisional application No. 61/402,767, filed on Sep. 3, 2010.

(51) Int. Cl.
*G01J 3/453* (2006.01)
*G01J 3/02* (2006.01)
*G01J 4/04* (2006.01)
*G01J 3/45* (2006.01)

(56) References Cited

U.S. PATENT DOCUMENTS

| | | |
|---|---|---|
| 8,368,889 B2 | 2/2013 | Schwiegerling et al. |
| 2003/0142318 A1* | 7/2003 | Kuiseko .................. 356/456 |
| 2005/0237532 A1* | 10/2005 | Beale et al. ............. 356/453 |
| 2010/0271475 A1* | 10/2010 | Schwiegerling et al. .... 348/135 |
| 2011/0206291 A1 | 8/2011 | Kashani et al. |
| 2013/0027713 A1 | 1/2013 | Kudenov |

OTHER PUBLICATIONS

Kim et al., "Snapshot imaging spectropolarimeter utilizing polarization gratings," *Proc. SPIE 7086*, Imaging Spectrometry XIII, 708603 (Aug. 27, 2008).

Kudenov et al., "Snapshot imaging Mueller matrix polarimeter using polarization gratings," *Opt. Lett.* 37:1367-1369 (2012).

Kudenov et al., "Spatial heterodyne interferometry with polarization gratings," *Opt. Lett.* 37:4413-4415 (2012).

Tyo et al., "Review of passive imaging polarimetry for remote sensing applications," *App. Opt.* 45:5453-5469 (2006).

* cited by examiner (a)

(b)

(a)

(b)

(c)

(a)

(b)

(c)

(d)

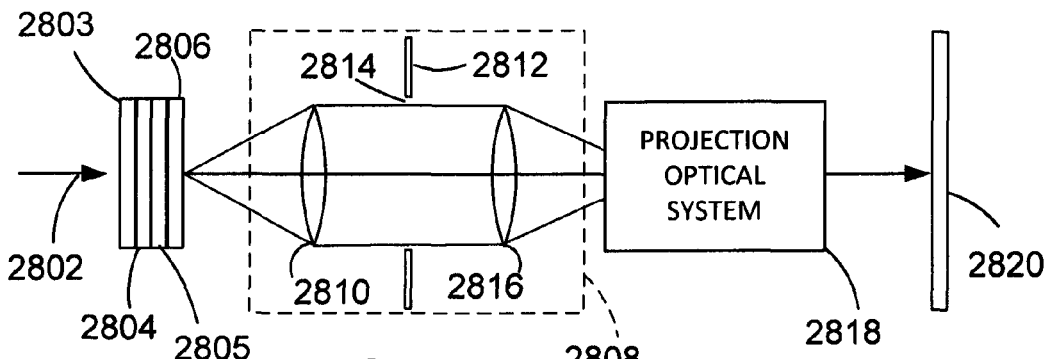
FIG. 28
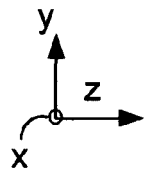
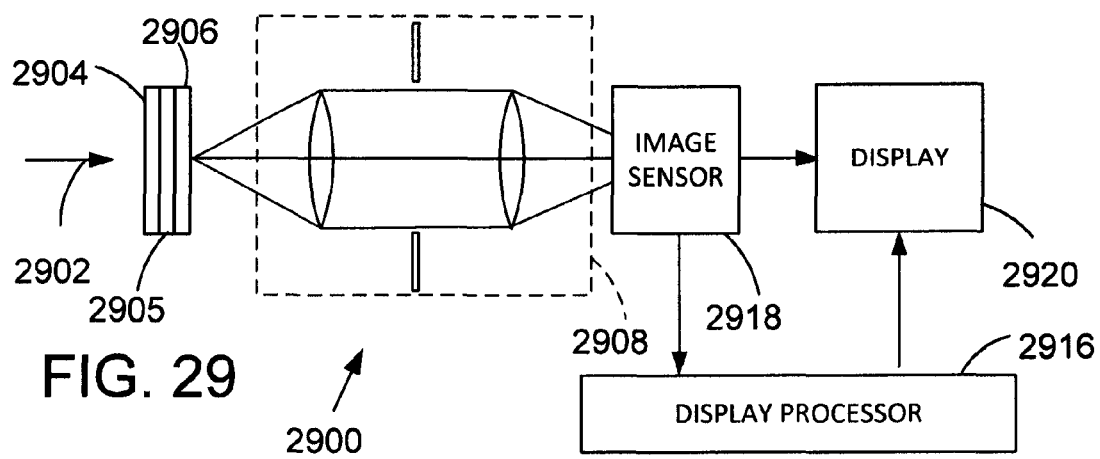
FIG. 29
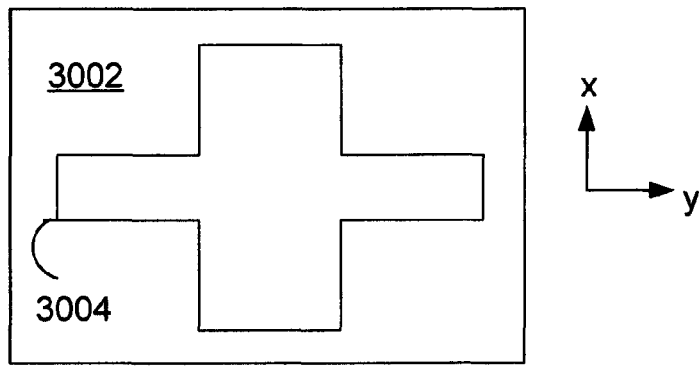
FIG. 30

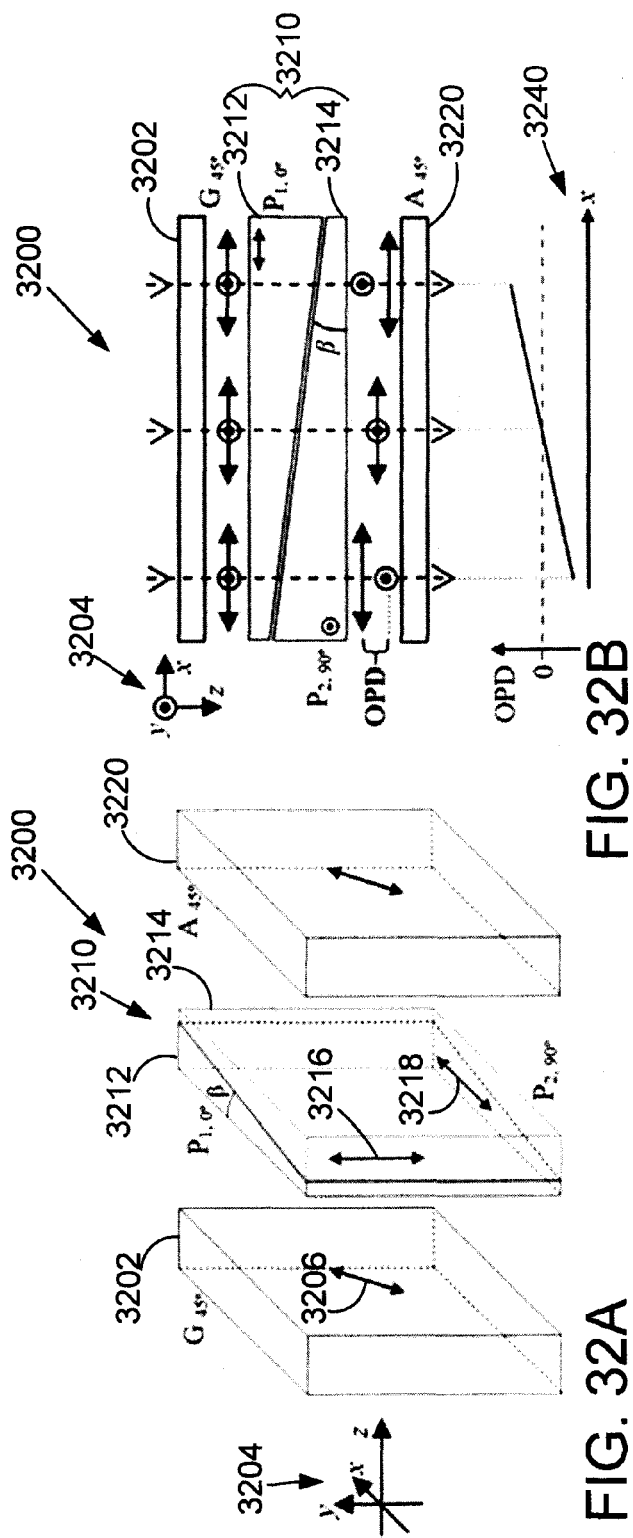
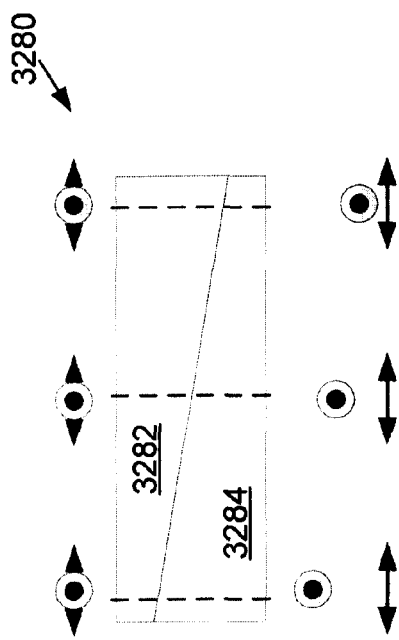
FIG. 32A
FIG. 32B
FIG. 32C

FIG. 41
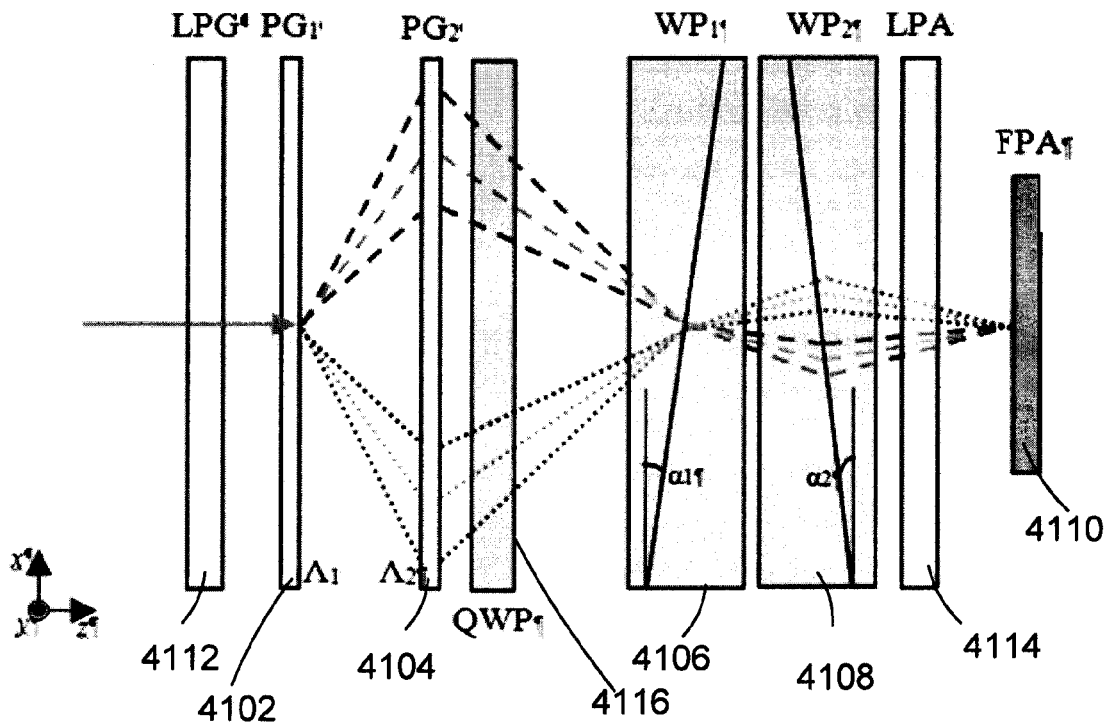
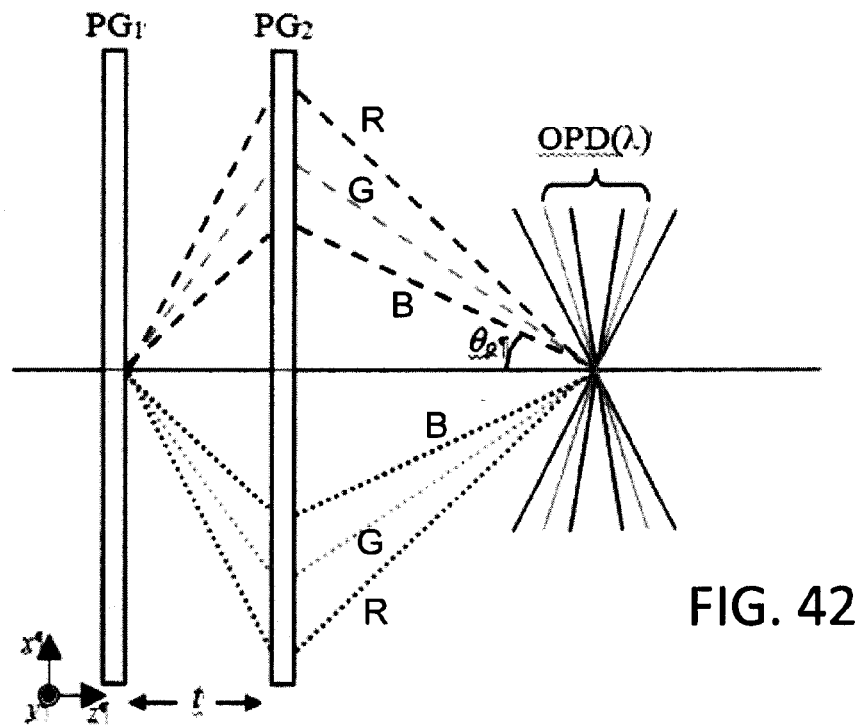
FIG. 42

SNAPSHOT SPATIAL HETERODYNE IMAGING POLARIMETRY

CROSS REFERENCE TO RELATED APPLICATIONS

This application is a continuation-in-part of U.S. patent application Ser. No. 13/452,686, filed Apr. 20, 2012 which claims the benefit of U.S. Provisional Applications 61/517,481, filed Apr. 20, 2011 and 61/517,774, filed Apr. 25, 2011. This application is also a continuation-in-part of U.S. patent application Ser. No. 13/399,861, filed Feb. 17, 2012, which is a continuation-in-part of U.S. patent application Ser. No. 13/225,315, filed Sep. 2, 2011, which claims the benefit of U.S. Provisional Application 61/402,767, filed Sep. 3, 2010. U.S. patent application Ser. No. 13/399,861 also claims the benefit of U.S. Provisional Application 61/463,488, filed Feb. 17, 2011. This application also claims the benefit of U.S. Provisional Application 61/796,974, filed Nov. 26, 2012. All of these prior applications are incorporated herein by reference.

BACKGROUND

Polarization images can yield higher contrast than intensity images, providing the opportunity for dramatically improved object identification. Furthermore, incorporation of a polarimeter into a detection system allows for the potential to ascertain the Stokes parameter elements of a scene, thereby giving a complete identification of the polarization state of light reflected or emitted from objects in the scene. From such an analysis, the spatially varying two-dimensional state of polarization (SOP) can be determined.

SOP analysis is a useful technique for object characterization and distinction, particularly for differentiating man made versus natural objects. This is particularly valuable in the thermal infrared; if objects in a scene are emitting close to the background temperature of the environment (i.e., they are close to thermal equilibrium with their environment), then thermal detection typically yields ambiguous results. Addition of polarimetry data can often significantly enhance images of such objects as polarimetry can supply information that is unavailable by intensity imaging. For example, typical long-wavelength infrared (LWIR) intensity images provide little indication of the presence of a vehicle in the shadows of trees, while a polarization image makes the presence of an automobile obvious due to polarization associated with the smooth surfaces of the automobile.

Current techniques for imaging polarimetry include rotating retarder polarimeters. Through a series of sequential measurements, the complete spatial distribution of Stokes parameters in a scene can be determined. This method has several significant limitations. Rotating parts can lead to vibrational and mechanical problems. Images of dynamic scenes can also contain polarization artifacts as a result of combining a series of measurements. Other problems are related to oversampling and spatial synchronization.

Some of the problems with rotating retarder imaging polarimetry can be addressed with "snapshot" systems that do not require dynamic components, but instead take advantage of spatial carrier fringes and Fourier reconstruction techniques in order to provide a complete polarization analysis of a scene. Examples of such approaches are described in Oka and Saito, "Snapshot complete imaging polarimeter using Savart plates," Proc. SPIE 6295:629508 (2008) and Oka and Kaneko, "Compact complete imaging polarimeter using birefringent wedge prisms," Opt. Exp. 11:1510-1519 (2003), both of which are incorporated herein by reference. These approaches use birefringent materials to produce polarization dependent phase differences to produce snapshot images.

One example of such a snapshot system is based on a pair of Savart plates (SPs) introduced in a collimated space in an imaging system. An SP shears incident radiation using crystal birefringence to produce two laterally displaced, orthogonally polarized beams. By combining two orthogonal SPs, an incident optical flux is sheared to create four separate beams. After transmission by an analyzer, these beams are recombined with a lens, resulting in amplitude modulated interference fringes containing state of polarization (SOP) information on the image plane.

While such SP systems are impressive in their snapshot capabilities, they suffer from significant limitations. Due to the reliance on interference effects, the temporal coherence of imaging radiation presents a constraint in that the visibility of the interference fringes is inversely proportional to the spectral bandwidth. For instance, in the LWIR (8-12 µm wavelengths), a fringe visibility of 50% at a mean wavelength of 10 µm requires limiting optical bandwidth $\Delta\lambda_{50\%} \approx 373$ nm, which is a significant constraint with respect to the signal to noise ratio (SNR) of the acquired data. In addition, SP polarimeters require SPs which can be expensive due to the birefringent crystals required. In many wavelength regimes, especially the infrared, the required large crystals (clear apertures >25 mm with thicknesses >10 mm) are either unavailable or prohibitively expensive. Moreover, materials suitable for LWIR use such as CdSe or CdS have birefringences $B=|n_e-n_o|$ that are approximately 10 times less than those of materials suitable for use at visible wavelengths. As a result, thick crystals are needed.

These birefringent material limitations can be avoided through the implementation of a reflective interferometric scheme. Mujat et. al., "Interferometric imaging polarimeter," JOSA A:21:2244-2249 (2004), which is incorporated herein by reference, discloses an interferometric imaging polarimeter based on a modified Sagnac interferometer. In this system, a polarizing beam splitter is used to transmit an input beam into an interferometer, and a phase difference between orthogonal polarizations produced by displacing one of the mirrors in the interferometer is used to create an interference pattern. Irradiance measurements and coherence matrix techniques are then employed to determine the state of polarization from a set of two temporally spaced images. These methods are subject to similar registration problems that plague rotating retarder polarimeters for dynamic scenes. In addition, in some cases, conventional polarimeters produce images that require additional processing for viewing.

SUMMARY

Polarimeteric systems and methods optically demodulate channeled polarimetric images in which polarization of optical radiation from an object has modulation frequencies based on spatial variations in the state of polarization of the optical radiation. In some examples, optical systems are configured to modulate an optical flux received from an object so as to produce a modulated imaging optical intensity associated with a corresponding modulation of at least one Stokes parameter associated with the optical flux. An optical demodulator demodulates the modulated imaging optical intensity and produces a viewable image associated with at least one Stokes parameter associated with the received optical flux. In some examples, the at least one Stokes parameter includes $S_1$, $S_2$, and combinations thereof. In further examples, the optical modulation system is configured to apply a polarization dependent modulation at a first spatial frequency and the optical demodulator is configured to apply a demodulation corresponding to the first spatial frequency. In a representative example, the optical demodulator includes a grating configured to establish the demodulation associated with the first spatial frequency, and a period of the grating corresponds to the first spatial frequency. In another example, the optical demodulator includes a first phosphor, a grating, and a second phosphor, wherein the first phosphor is situated to produce a modulated intensity corresponding to the modulated imaging optical intensity and direct the modulated intensity to the grating so that the grating delivers a grating modulated intensity to the second phosphor. Typically, the optical demodulator includes a spatial filter configured to transmit a baseband portion of the grating modulated intensity. In some embodiments, an eyepiece is situated for viewing the baseband demodulated optical intensity. In still further examples, the optical demodulation includes a sensor array configured to produce an electronic image associated with the modulated imaging optical intensity and a display system configured to deliver a modulated optical intensity to the optical demodulator.

Representative methods include producing an imaging optical beam having a periodic modulation associated with at least one Stokes parameter of optical radiation from an object, and optically applying a corresponding demodulation to the periodically modulated imaging optical beam. In some examples, the demodulated, periodically modulated optical beam is spatially filtered. Typically, the spatial filtering is configured to attenuate spatial frequency components at a spatial frequency corresponding to the periodic modulation of the imaging optical beam. In further examples, the spatial filtering is configured to direct spatial frequency components at a spatial frequency corresponding to a difference between a spatial frequency of the periodic modulation of the imaging optical beam and a spatial frequency associated with the optically applied demodulation. In some embodiments, the optical demodulation is applied with a grating having a period corresponding to the periodic modulation of the imaging optical beam and the periodically modulated imaging optical beam is produced by directing an optical beam from the object to a phosphor. In still other examples, the periodically modulated imaging beam is produced by directing an optical beam from the object to an image sensor, and the modulated imaging beam is produced by displaying an image based on a detected image from the image sensor.

Imaging polarimeters comprise a first polarizing grating configured to diffract portions of an input light flux having a first state of polarization and a second state of polarization in a first direction and a second direction, respectively. A second polarizing grating is configured to receive the diffracted portion from the first polarizing grating and diffract the portions associated with the first state of polarization and the second state of polarization along the second direction and the first direction, respectively, so that the first and second portions propagate displaced from and parallel to each other. A polarization analyzer is configured to produce a common state of polarization of the first and second portions. A focusing element is configured to combine the first and second portions to produce a polarization modulated image beam having a periodic modulation associated with shear between the diffracted beam portions. An optical demodulator is configured to receive the polarization modulated image beam and apply a demodulation corresponding to the periodic modulation associated with the shear so as to produce a viewable image.

These and other features and aspects of the disclosed technology are described below with reference to the accompanying drawings.

BRIEF DESCRIPTION OF THE DRAWINGS

FIG. 28 illustrates a polarimeter that demodulates a polarization modulated beam having x- and y-directed modulations.

FIG. 29 illustrates a polarimeter that displays an image based on a detected optically demodulated image beam.

FIG. 30 illustrates a representative aperture for use in optical demodulation.

FIGS. 32A-32B illustrate a birefringent prism interferometer based on a single birefringent prism pair.

FIG. 32C illustrates a Rochon prism that can be used to produce an optical path difference in the disclosed examples instead of or in combination with Wollaston prisms.

FIG. 41 is a schematic diagram of a spatial heterodyne interferometer (SHI)/spectrometer that includes polarizing gratings (PGs).

FIG. 42 illustrates Optical Path Difference (OPD) of tilted wavefronts exiting the PGs of the apparatus of FIG. 10. Representative spectral components (red, green, and blue) are tilted by an amount that is linearly proportional to wavelength $\lambda$.

DETAILED DESCRIPTION

Figure 1A:
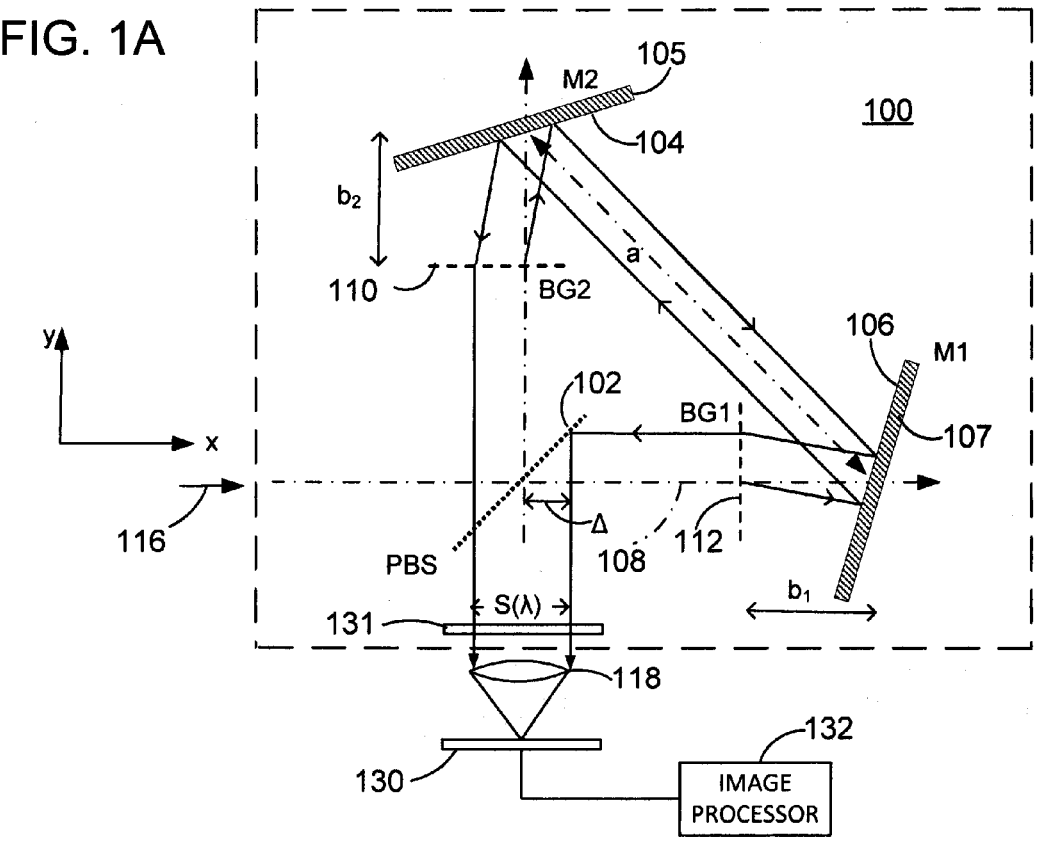
FIG. 1A illustrates a modified Sagnac interferometer configured to produce shear between counter-propagating optical fluxes using two diffraction gratings.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

As used herein, an optical flux refers to electromagnetic radiation in a wavelength range of from about 100 nm to about 100 µm. In some examples, an optical flux has a spectral width that can be as large as 0.5, 1, 2, 5, or 10 times a center wavelength, or can comprise a plurality of spectral components extending over similar spectral bandwidths. Such optical fluxes can be referred to as large bandwidth optical fluxes. Typically, an optical flux is received from a scene of interest and amplitude, phase, spectral, or polarization modulation (or one or more combinations thereof) in the received optical flux is processed based on a detected image associated with a spatial variation of the optical flux which can be stored in one or more computer-readable media as an image file in a JPEG or other format. In the disclosed examples, so-called "snapshot" imaging systems are described in which image data associated with a plurality of regions or locations in a scene of interest (typically an entire two dimensional image) can be obtained in a single acquisition of a received optical flux using a two dimensional detector array. However, images can also be obtained using one dimensional arrays or one or more individual detectors and suitable scanning systems. In some examples, an image associated with the detected optical flux is stored for processing based on computer executable instruction stored in a computer readable medium and configured for execution on a general purpose or special purpose processor, or dedicated processing hardware. In addition to snapshot imaging, sequential measurements can also be used. For convenience, examples that provide two dimensional images are described, but in other examples, one dimensional (line) images or single point images can be obtained.

For convenience, optical systems are described with respect to an axis along which optical fluxes propagate and along which optical components are situated. Such an axis is shown as bent or folded by reflective optical elements. In the disclosed embodiments, an xyz-coordinate system is used in which a direction of propagation is along a z-axis (which may vary due to folding of the axis) and x- and y-axes define transverse planes. Typically the y-axis is perpendicular to the plane of the drawings and the x-axis is perpendicular to the y-axis and the z-axis and is in the plane of the drawings.

In representative examples, the imaging polarimetry methods and apparatus disclosed herein can be used to estimate a 2-dimensional spatial Stokes parameter distribution of a scene in order to characterize aerosol size distributions, distinguish manmade targets from background clutter, evaluate distributions of stress birefringence in quality control, evaluate biological tissues in medical imaging, or for other purposes. While in typical examples, image data is evaluated so as to correspond to one or more components of a Stokes vector, data can be processed to obtain other polarization characteristics such as ellipticity or can be based on other representations such as those associated with Jones matrices.

In the disclosed embodiments, interferometers are configured to include diffraction gratings so as to produce a shear between orthogonally polarized components of an input optical flux that is proportional to a wavelength of the input optical flux. For large bandwidth optical fluxes, shear for each spectral component is proportional to a wavelength of the spectral component. A shear between optical fluxes that varies linearly with flux wavelength is referred to herein as a dispersion-compensated shear, but in some examples, shear varies nonlinearly with wavelength. In some examples, polarimeters include optical systems that can provide a total shear that includes a dispersion compensated shear and a dispersive shear. As discussed below, a dispersion compensated shear is associated with interference patterns having amplitude modulations at a spatial frequency that is independent of optical wavelength.

Polarization properties of a scene can be conveniently described using a Stokes vector. A scene Stokes vector $S(x,y)$, is defined as:

$$S(x, y) = \begin{bmatrix} S_0(x, y) \\ S_1(x, y) \\ S_2(x, y) \\ S_3(x, y) \end{bmatrix} = \begin{bmatrix} I_0(x, y) + I_{90}(x, y) \\ I_0(x, y) - I_{90}(x, y) \\ I_{45}(x, y) - I_{135}(x, y) \\ I_R(x, y) - I_L(x, y) \end{bmatrix}, \quad (1)$$

wherein x, y are spatial coordinates in the scene, $S_0$ is the total power of the beam, $S_1$ denotes a preference for linear polarization at 0° over linear polarization at 90°, $S_2$ denotes a preference for linear polarization at 45° over linear polarization at 135°, $S_3$ denotes a preference for right circular over left circular polarization states, and I(x,y) refers to optical flux intensity. By measuring all four elements of $S(x,y)$, a complete spatial distribution of the polarization state associated with an scene can be determined. The Stokes vector permits assessment of partially polarized optical fluxes and determination of an extent of polarization as, for example, $$\frac{(S_1^2 + S_2^2 + S_3^2)^{1/2}}{S_0}.$$

As discussed above, some conventional approaches to measuring scene Stokes parameters are based on recording multiple intensity measurements sequentially using different configurations of polarization analyzers. The Stokes parameters can then be calculated using Mueller matrices. However, time-sequential measurements of a rapidly changing scene are susceptible to temporal misregistration. The disclosed methods and apparatus can reduce or eliminate such misregistration errors by acquiring scene image data in a single snapshot. Sequential measurements can be made as well, if desired.

According to representative examples, interferometrically generated carrier frequencies are amplitude modulated with spatially-dependent 2-dimensional Stokes parameters associated with a scene to be imaged. Such methods can be referred to as channeled image polarimetry (CIP) methods. In typical examples, all the Stokes parameters are directly modulated onto coincident interference fringes so that misregistration problems are eliminated, and images can be acquired with readily available lenses and cameras.

EXAMPLE 1

Symmetric Grating Based Embodiments

For convenient illustration, representative embodiments are described in which diffraction gratings are symmetrically situated in a Sagnac interferometer with respect to reflectors that define counter-propagating optical paths. Following this description, other examples with arbitrary grating placements are described.

With reference to FIG. 1A, a representative Sagnac interferometer 100 includes a polarizing beam splitter (PBS) 102, and reflective surfaces 104, 106 that define an interferometer optical path 108. For convenience, the path 108 is also referred to as an interferometer axis herein. As shown in FIG. 1A, the interferometer axis 108 is folded by the reflective surfaces 104, 106. Blazed transmission gratings (BGs) 110, 112, are situated along the axis 108 at an axial distances $b_1$, $b_2$ from the reflective surfaces 106, 104, respectively. The PBS 102 is configured to receive an input optical flux 116 that is directed along the axis 108 so that portions of the input optical flux 116 are reflected or transmitted to respective reflective surfaces 104, 106 and the associated BGs 110, 112. As shown in FIG. 1A, the reflected and transmitted portions of the input optical flux counter-propagate in the interferometer 100. Typically, the input flux 116 is a collimated optical flux associated with an image scene, and a lens 118 is situated to receive and combine the counter-propagating portions of the input optical flux received from the PBS 102 after transmission by a polarization analyzer 131.

The PBS 102 can be a thin-film based beam splitter such as a polarizing beam splitter cube, a wire grid beam splitter (WGBS), or other polarization dependent beam splitter. The blazed diffraction gratings can be ruled gratings, holographic gratings, or other types of gratings. Reflective surfaces such as the surfaces 104, 106 can be provided as metallic coatings, polished metal surfaces, dielectric coatings, or based on total internal reflection. As shown in FIG. 1A, the reflective surfaces 104, 106 are provided by respective mirrors 105, 107.

The input optical flux 116 is divided into orthogonal polarization components by the polarizing beam splitter 102 and the components are directed along respective arms of the interferometer 100. For example, the portion of the light flux 116 transmitted by the PBS 102 is directed along the axis 108 to the diffraction grating 112 to the reflective surface 106. As shown in FIG. 1A, the reflective surface 106 is situated a distance $b_1$ from the BG 112 measured along the axis 108. The diffraction grating 112 diffracts at least a portion of the incident flux into a single diffraction order at an angle $\theta$, given by a diffraction equation as $\theta \approx m\lambda/d$ for small angles, wherein m is an order of diffraction and d is the period of the grating. The resulting diffracted optical flux is then reflected by the reflective surface 106 to the reflective surface 104 and then to the diffraction grating 110 so as to be incident to the diffraction grating 110 at the angle $\theta$ and is thereby diffracted so as to propagate parallel to but displaced a distance $\Delta$ from the axis 108. The displaced flux is then directed by the PBS 102 to the lens 118. The counter-propagating optical flux (i.e., the flux reflected by the PBS 102) is similarly displaced a distance $\Delta$ from the axis 108, but in an opposite direction and is directed to the lens 118 so that the counter-propagating fluxes are combined at a focal plane array detector 130 or other detector. A detected intensity distribution can be stored in one or more computer readable media for processing by an image processor 132.

Figure 10:
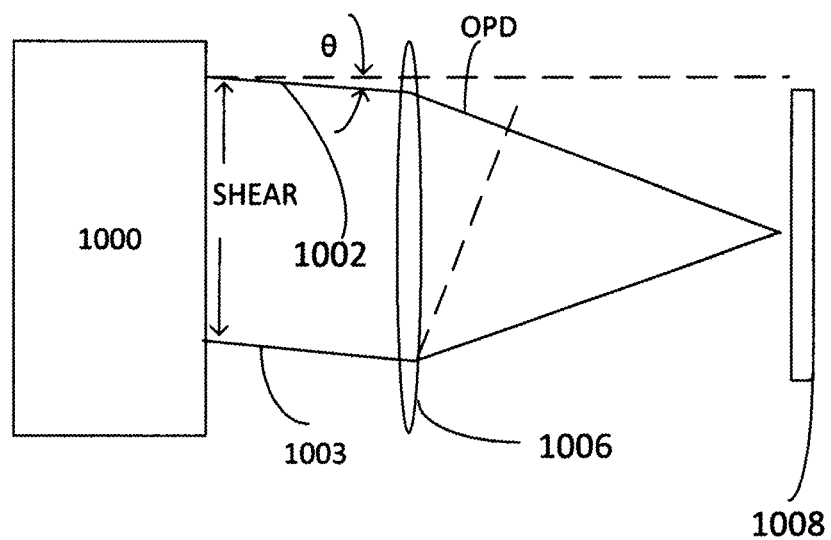
FIG. 10 illustrates determination of an optical path difference (OPD) associated with shear.

Optical path difference (OPD) associated with a focused, sheared optical flux is illustrated in FIG. 10. As shown in FIG. 10, a shearing optical system 1000 such as described above produces shear $S_{shear}$ between flux portions propagating along ray directions 1002, 1003 to a lens 1006 that combines the flux portions at a focal plane array (FPA) 1008 or other detector. For convenient illustration, the lens 1006 is shown as a singlet lens, but in other examples, multi-element lenses, reflective optics, or catadioptric optics can be used. Referring to FIG. 10, $$\text{OPD} = S_{shear} \sin(\theta) \approx S_{shear} \theta,$$

for small angle $\theta$. In FIG. 10, $\theta$ is depicted as an angle in the object space of the lens 1006 with respect to ray directions 1002, 1003. This assumes that the singlet lens 1006 has an aperture stop that is located at the lens 1006. In this special case, $\theta$ is the angle of the chief ray in both object and image space. However, in more sophisticated lens systems, $\theta$ is the angle of the chief ray in image space.

When the two sheared portions of the optical flux are combined by the lens, interference fringes are produced on the FPA 1008. This interference can be expressed as $$I(x_i, y_i) = \left\langle \left| \frac{1}{\sqrt{2}} E_x(x_i, y_i, t) e^{-j\phi_1} + \frac{1}{\sqrt{2}} E_y(x_i, y_i, t) e^{-j\phi_2} \right|^2 \right\rangle,$$

where $\langle \rangle$ represents a time average, $x_i$ and $y_i$ are image-plane coordinates, and $\phi_1$, $\phi_2$, are the cumulative phases along each ray. Expansion of this expression yields $$I(x_i, y_i) = \frac{1}{2} \left\{ \begin{array}{c} (\langle E_x E_x^* \rangle + \langle E_y E_y^* \rangle) + (\langle E_x E_y^* \rangle + \langle E_x^* E_y \rangle)\cos(\phi_1 - \phi_2) + \\ j(-\langle E_x E_y^* \rangle + \langle E_x^* E_y \rangle)\sin(\phi_1 - \phi_2) \end{array} \right\},$$

where $E_x$, $E_y$ are now understood to be functions of image plane coordinates $x_i$ and $y_i$. The phase factors are $$\phi_1 = \frac{2\pi\Delta}{\lambda f_{obj}} x_i$$

and $$\phi_2 = -\frac{2\pi\Delta}{\lambda f_{obj}} x_i.$$

The Stokes parameters are defined from the components of the electric field as $$\begin{bmatrix} S_0 \\ S_1 \\ S_2 \\ S_3 \end{bmatrix} = \begin{bmatrix} \langle E_x E_x^* \rangle + \langle E_y E_y^* \rangle \\ \langle E_x E_x^* \rangle - \langle E_y E_y^* \rangle \\ \langle E_x E_y^* \rangle + \langle E_x^* E_y \rangle \\ j(\langle E_x E_y^* \rangle - \langle E_x^* E_y \rangle) \end{bmatrix}.$$

Re-expressing I using the definitions of the Stokes parameter and $\phi_1$, $\phi_2$, yields $$I(x_i, y_i) = \frac{1}{2} \left[ S_0 + S_2 \cos\left(\frac{4\pi\Delta}{f_{obj}} x_i\right) - S_3 \sin\left(\frac{4\pi\Delta}{f_{obj}} x_i\right) \right]$$

Consequently, the shear modulates $S_2$ and $S_3$ onto a carrier frequency, while $S_0$ remains as an un-modulated component. The carrier frequency U is a function of shear and is given by $$U = \frac{2\pi S(\lambda)}{\lambda f} \quad (2)$$

Fourier filtering can then be used to calibrate and reconstruct the spatially-dependent Stokes parameters over the image plane.

Figure 1B:
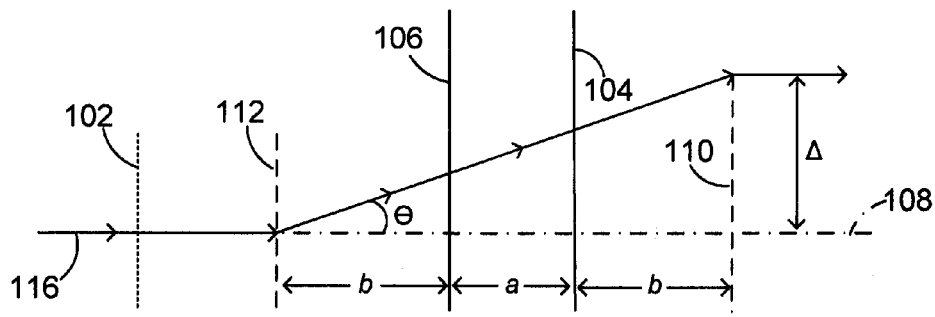
FIG. 1B is an unfolded view of a portion of the interferometer of FIG. 1A.

The determination of the displacement Δ as a function of interferometer geometry is illustrated in the partial unfolded layout of FIG. 1B. The displacement Δ is dependent on the grating-reflective surface axial separations $b_1 = b_2 = b$ and the axial separation a of the reflective surfaces 104, 106. For small angles, the angular deviation θ from the on-axis path can be expressed as:

$$\theta \approx \frac{m\lambda}{d} \approx \frac{\Delta}{2b+a}, \quad (3)$$

wherein λ is the optical flux and m is a diffraction order. The total shear $S(\lambda) = 2\Delta$ can then be expressed as:

$$S(\lambda) = 2\Delta = \frac{m\lambda}{d}(4b + 2a) \quad (4)$$

Thus, the generated shear is directly proportional to wavelength.

The focusing lens 118 combines the sheared optical fluxes at the detector 130 so as to produce fringes (i.e., intensity modulation) at a spatial carrier frequency U based on the total shear, i.e., at a spatial carrier frequency U given by:

$$U = \frac{2\pi S(\lambda)}{\lambda f} = \frac{2\pi m(4b + 2a)}{df}, \quad (5)$$

wherein f is a focal length of the lens 118, and d is a grating period.

In some examples, gratings of different periods and situated to diffract at different orders are used, and the shear is given by:

$$S(\lambda) = 2\Delta = \lambda \left( \frac{m_1}{d_1} + \frac{m_2}{d_2} \right)(2b + a),$$

wherein $m_1$ and $m_2$ are grating diffraction orders, and $d_1$ and $d_2$ are grating periods.

Because the shear is wavelength dependent, the spatial frequency U of the interference fringes which contain the polarization information from the scene is consequently wavelength independent in a paraxial approximation. As a result, high visibility fringes can be obtained for broadband optical sources, regardless of the spatial or temporal coherence of the received optical flux. In addition, a fringe period U can be selected by changing one or more of the reflective surface spacing a, grating spacings $b_1$, $b_2$, grating period d, diffraction order m, and focal length f of the lens 118. In the example of FIG. 1B, the grating-reflective surface spacing is the same for both the gratings 110, 112, but in other examples can be different.

The example of FIGS. 1A-1B is based on a Sagnac interferometer design in which the two optical fluxes to be combined counter-propagate along a common optical path. Thus, such a configuration tends to be resistant to vibration, and input optical fluxes of limited spatial and/or temporal coherence can be used. In other examples, gratings can be situated in interferometers of other configurations, particularly division of amplitude interferometers so as to produce similar shear. For example, diffraction gratings can be used in conjunction with a Mach-Zehnder interferometer to produce shear, although adequate interference fringe visibility may require appreciable optical flux coherence as the Mach Zehnder interferometer does not provide a common optical path. Accordingly, in applications to broad wavelength ranges, common path interferometers generally provide superior results.

In some applications, measurement of all four Stokes parameters is unnecessary. For example, $S_3$ is typically negligible in the thermal infrared and loss of the capability of measuring circular polarization (i.e., $S_3$) is of little consequence. If measurement of $S_3$ is unnecessary, an interferometer system similar to that of FIG. 1A can be provided with an achromatic quarter wave retarder situated with its fast axis at 45 degrees to the axis of the PBS 102 at an interferometer input. Such a configuration permits measurement of $S_0$, $S_1$, and $S_2$. An intensity distribution I(x, y) generated at a focal plane array with such a system can be expressed as:

$$I(x,y) = \frac{1}{2}S_0(x,y) - \frac{1}{2}|S_{12}(x,y)| \cos[2\pi Uy - \arg\{S_{12}(x,y)\}] \quad (6)$$

wherein U is the shear generated by the interferometer, $S_{12} = S_1 + jS_2$, so that $|S_{12}|$ is a degree of linear polarization and $\arg\{S_{12}\}$ is an orientation of the linear polarization.

Figure 2:
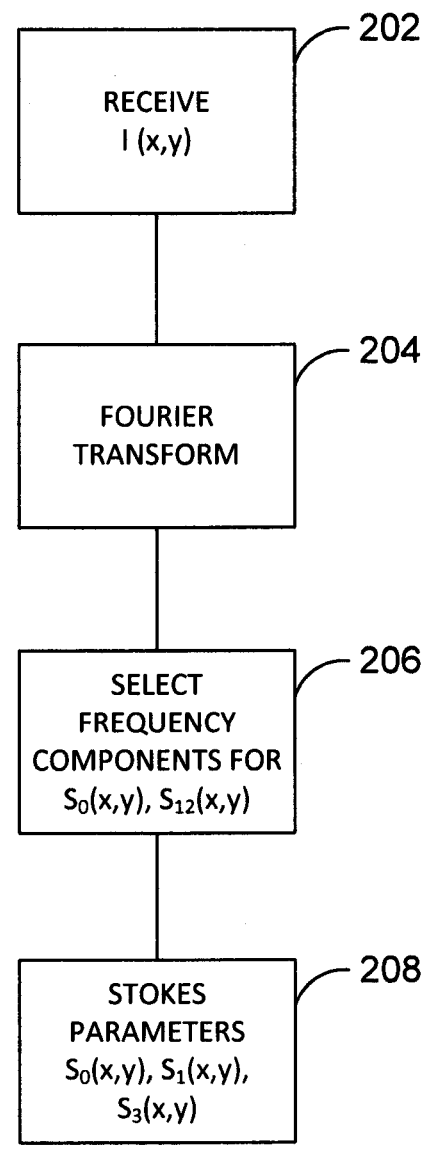
FIG. 2 illustrates an interferometer-based polarimeter that includes an input quarter wave retarder and that is configured for estimation of spatial distributions of Stokes parameters $S_0$, $S_1$, and $S_2$.

Stokes parameters can be extracted from this intensity distribution as shown in FIG. 2. A recorded fringe intensity I(x,y) is received at 202, and at 204, the recorded intensity is Fourier transformed with respect to the shear axis (in the example of FIGS. 1A-1B, a y-axis). At 206, spatial frequency components at zero frequency and at spatial frequency U are identified that are associated with particular combinations of Stokes parameters, such as $S_0(x,y)$ and $S_{12} = S_1 + jS_2$ as shown above. At 208, spatial distributions of the Stokes parameters are calculated based on the selected frequency component. Typically, the selected components are inverse Fourier transformed for use in estimating the associated Stokes parameter distributions.

Figure 3:
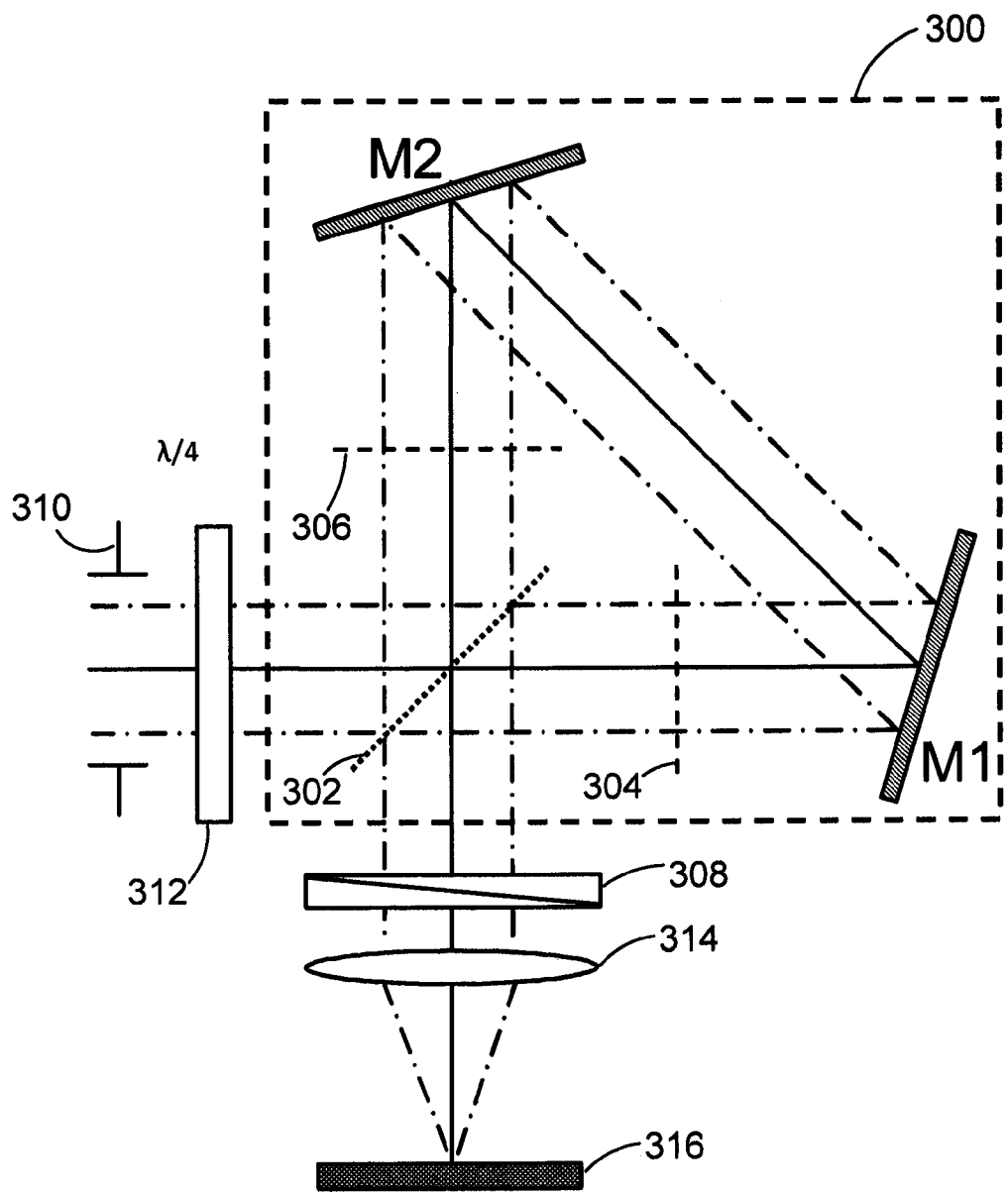
FIG. 3 illustrates an interferometer-based polarimeter that includes an input quarter wave retarder and output linear analyzer configured for estimation of spatial distributions of linear polarization.

A representative interferometer based polarimetry system configured to obtain a linear state of polarization distribution associated with a scene is illustrated in FIG. 3. As shown in FIG. 3, a modified Sagnac interferometer 300 includes an input PBS 302, diffraction gratings 304, 306 and an output linear polarizer 308. An optical flux associated with a scene is directed through an entrance aperture 310 and a quarter wave retarder 312 to the interferometer 300. An objective lens 314 is situated to produce an image that contains modulated polarization information on a focal plane array 316 by combining sheared, counter-propagating optical fluxes.

EXAMPLE 2

Generalized Dispersion Compensated Sagnac Interferometer Systems

Figure 4A:
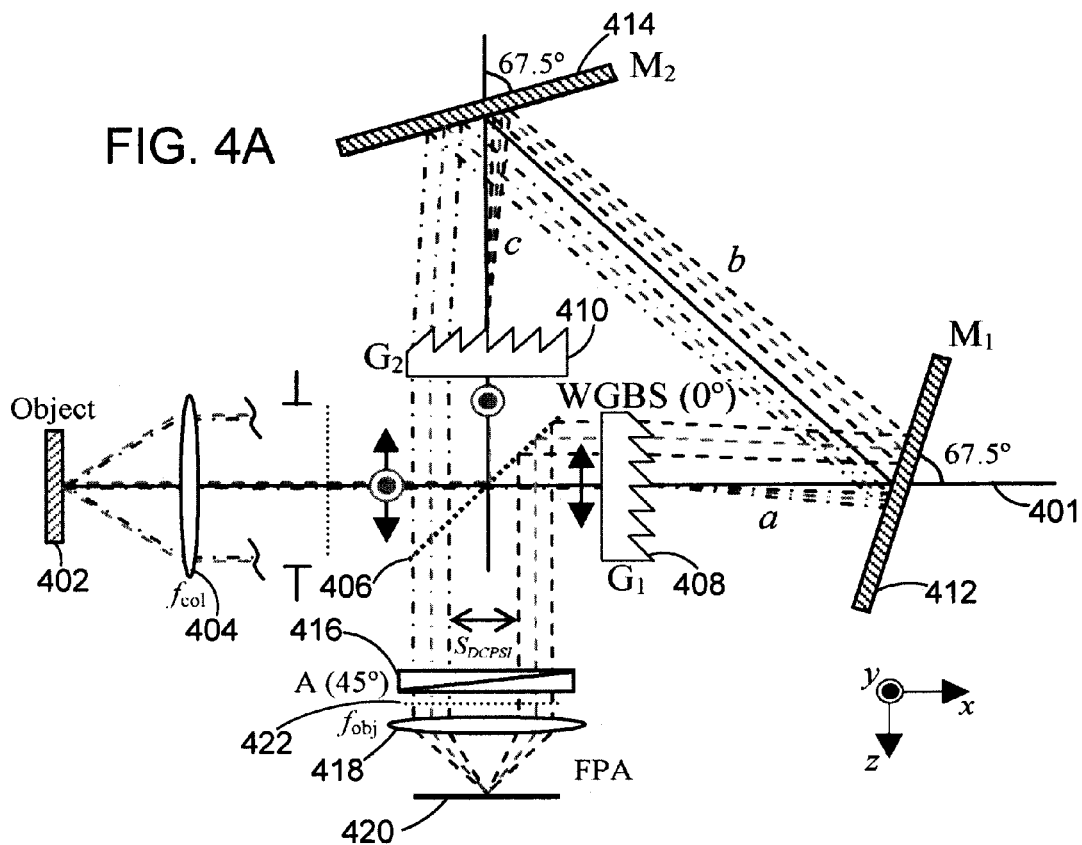
FIGS. 4A-4B illustrate propagation of multiple spectral components in a dispersion compensated interferometer that includes two blazed gratings.
Figure 4B:
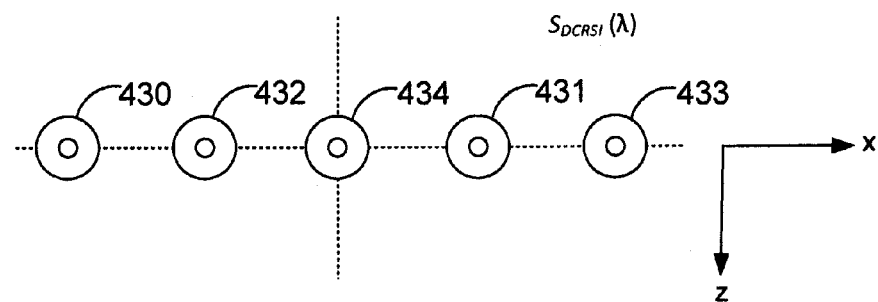

A generalized Sagnac interferometer based polarimeter is illustrated in FIGS. 4A-4B. As shown in FIG. 4A, an object 402 is situated on an axis 401 so that an optical flux from the object 402 is directed to a collimating lens 404 and to a PBS 406. In some examples, the collimating lens 404 can be omitted. A portion of the optical flux in a first polarization state (shown as in the plane of FIG. 4A) is directed through a first grating 408 to mirrors 412, 414, and then to a second grating 410 and the PBS 406. This portion is then directed to an analyzer 416 and focused by an objective lens 418 to a focal plane array 420. A portion of the input optical flux in a second polarization state (shown in FIG. 4A as perpendicular to the plane of FIG. 4A) is oppositely directed and is combined with the counter-propagating flux in the first polarization state at the focal plane array 420 by the lens 418. The combination of the counter-propagating fluxes at the focal plane array produces an interference pattern I(x,y) that can be used to determine one or more of the Stokes parameters or provide other indication of polarization.

For identical diffraction gratings $G_1$ and $G_2$ with grating period d, the shear $S_{DCPSI}$ is given by:

$$S_{DCPSI} = \frac{2m\lambda}{d}(a+b+c) \tag{7}$$

wherein a, b, and c represent the distances between $G_1$ and $M_1$, $M_1$ and $M_2$, and $M_2$ and $G_2$, respectively, and m is a diffraction order. FIG. 4B illustrates the sheared optical flux in a plane 422 that is perpendicular to a z-axis. An undiffracted component of the input flux is situated on axis at 434 while counter-propagating diffracted components associated with a longer and a shorter wavelength are displaced to locations 430, 433 and 432, 431, respectively.

The combined output optical flux as focused by the objective lens (focal length $f_{obj}$) produces an intensity distribution:

$$I_{DCPSI}(x_i, y_i) = \frac{1}{2}\sum_{m=0}^{d/\lambda_{min}} S'_0(m) + \frac{1}{2}\sum_{m=1}^{d/\lambda_{min}} \left[ \begin{array}{l} S'_2(m)\cos\left(\frac{2\pi}{f_{obj}}\frac{2m}{d}(a+b+c)x_i\right) - \\ S'_3(m)\sin\left(\frac{2\pi}{f_{obj}}\frac{2m}{d}(a+b+c)x_i\right) \end{array} \right]. \tag{8}$$

The intensity distribution $I_{DCPSI}$ is a summation from a diffraction order m=0 to a maximum diffraction order m=(d/$\lambda_{min}$)sin($\pi$/2), wherein $\lambda_{min}$ is a shortest wavelength component of a combined optical flux at the detector. The Stokes parameters $S_0'(m)$, $S_2'(m)$, and $S_3'(m)$ as weighted by grating diffraction efficiency $E(\lambda,m)$ are given by:

$$S'_0(m) = \int_{\lambda_{min}}^{\lambda_{max}} DE^2(\lambda, m) S_0(\lambda) d\lambda, \tag{9}$$

$$S'_2(m) = \int_{\lambda_{min}}^{\lambda_{max}} DE^2(\lambda, m) S_2(\lambda) d\lambda, \tag{10}$$

$$S'_3(m) = \int_{\lambda_{min}}^{\lambda_{max}} DE^2(\lambda, m) S_3(\lambda) d\lambda, \tag{11}$$

wherein $\lambda_{min}$ and $\lambda_{max}$ are the minimum and maximum wavelengths in the combined optical flux. Spatial carrier frequencies are given by:

$$U_{DCPSI} = \frac{2m}{df_{obj}}(a+b+c), \tag{12}$$

which is independent of wavelength (i.e., lacks dispersion), permitting white-light interference fringes to be generated. In addition, carrier frequency depends on the diffraction order m, and this dependence can be used in multispectral imaging by, for example, substituting multiple-order gratings for single order gratings. The diffraction efficiency weighted Stokes parameters can be obtained by demodulating $I_{DCPSI}$ with respect to one or more of spatial frequencies $U_{DCPSI}$.

EXAMPLE 3

White Light Polarimetric Reconstructions in $S_1$ and $S_2$

A quarter wave retarder (QWR) oriented at 45° in front of a simplified channeled spectropolarimeter such as shown in FIG. 4A can be used to measure linear polarization ($S_0$, $S_1$, and $S_2$). The Mueller matrix for a QWR at 45° is $$M_{QWR,45°} = \begin{bmatrix} 1 & 0 & 0 & 0 \\ 0 & 0 & 0 & -1 \\ 0 & 0 & 1 & 0 \\ 0 & 1 & 0 & 0 \end{bmatrix}$$

Multiplication of this matrix by an arbitrary incident Stokes vector yields $$S_{out} = M_{QWR,45°}[S_0 S_1 S_2 S_3]^T = [S_0 -S_3 S_2 S_1]^T.$$

Therefore, the QWR converts any incident linear horizontal or vertical polarization states ($S_1$) into circular polarization ($S_3$) and vice versa. Consequently, with an included QWR, the detected intensity pattern becomes $$I_{DCPSI}(x_i, y_i) = \frac{1}{2}\sum_{m=0}^{d/\lambda_1} S'_0(m) + \frac{1}{2}\sum_{m=1}^{d/\lambda_1} \left[ \begin{array}{l} S'_2(m)\cos\left(\frac{2\pi}{f_{obj}}\frac{2m}{d}(a+b+c)x_i\right) - \\ S'_1(m)\sin\left(\frac{2\pi}{f_{obj}}\frac{2m}{d}(a+b+c)x_i\right) \end{array} \right],$$

wherein $S_1'(m)$ is analogous to $S_3'(m)$, and is defined as $$S'_1(m) = \int_{\lambda_1}^{\lambda_2} DE^2(\lambda, m) S_1(\lambda) d\lambda.$$

Inverse Fourier transformation of channels $C_0$ (zero frequency component) and $C_1$ (component at frequency $U_{DCPSI}$) yields $$\mathcal{F}^{-1}[C_0] = \frac{S'_0(1)}{2}$$

$$\mathcal{F}^{-1}[C_1] = \frac{1}{4}(S'_2(1) + jS'_1(1))\exp(j2\pi U_{DCPSI} x_i),$$

assuming that the m=1 diffraction order is dominant. Thus, a full linear polarization measurement including the degree of linear polarization (DOLP) and its orientation can be calculated from a single interference pattern. The DOLP and its orientation can be determined as:

$$DOLP = \frac{\sqrt{S_1^2 + S_2^2}}{S_0}$$

$$\phi = \frac{1}{2}\operatorname{atan}\left(\frac{S_2}{S_1}\right).$$

EXAMPLE 4

Dual-Band Snapshot Imaging Polarimeter

Figure 5:
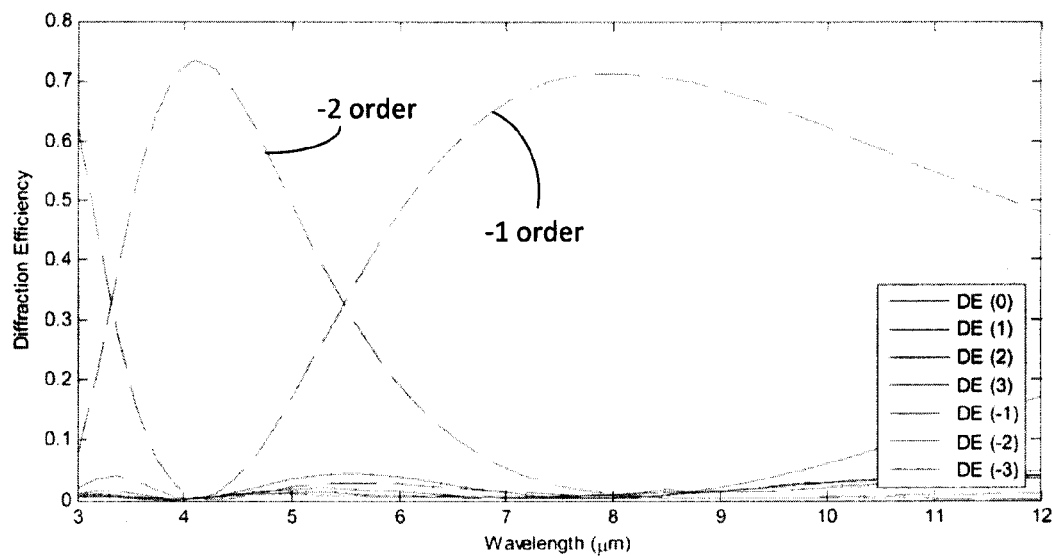
FIG. 5 is a graph of theoretical diffraction efficiency for a blazed grating designed for a wavelength of roughly 8 μm on a ZnSe substrate. Diffraction efficiencies for the 0, +/−1, +/−2, and +/−3 orders are shown.

Blazed gratings can have high diffraction efficiency into a single diffraction order at a design wavelength. At other wavelengths, a blazed grating can produce substantial diffraction into a plurality of diffraction orders. In some examples, polarization analysis can be provided in two or more wavelength bands that are nearly integer multiples of each other. For example, analysis in a combination of a midwavelength infrared band (MWIR) of about 3-5 μm and a long wavelength infrared band (LWIR) of about 8-12 μm can be provided. These wavelength bands are close to an integer separation in optical path difference so that a blazed grating designed for a +1 order at a wavelength of 8 μm will have maximum efficiency at 8 μm in the +1 order, 4 μm in the +2 order, 2 μm in the +3 order, etc. Therefore, a grating can be chosen to be suitable for both MWIR and LWIR bands. Diffraction efficiencies for a representative grating having a design wavelength of 8 μm at various diffraction orders is shown in FIG. 5. As shear is proportional to diffraction order, such a configuration produces twice as much shear in the MWIR than in the LWIR so that fringe spatial frequency in the MWIR is twice that in the LWIR. MWIR and LWIR image contributions can be separated by demodulation of the fringes based on corresponding fringe spatial frequencies. Other diffraction orders can also appear in the detected fringes, and these can be reduced or removed based on their differing spatial frequencies.

EXAMPLE 5

Deep Grating Multispectral Snapshot Imaging Spectrometer

Figure 6:
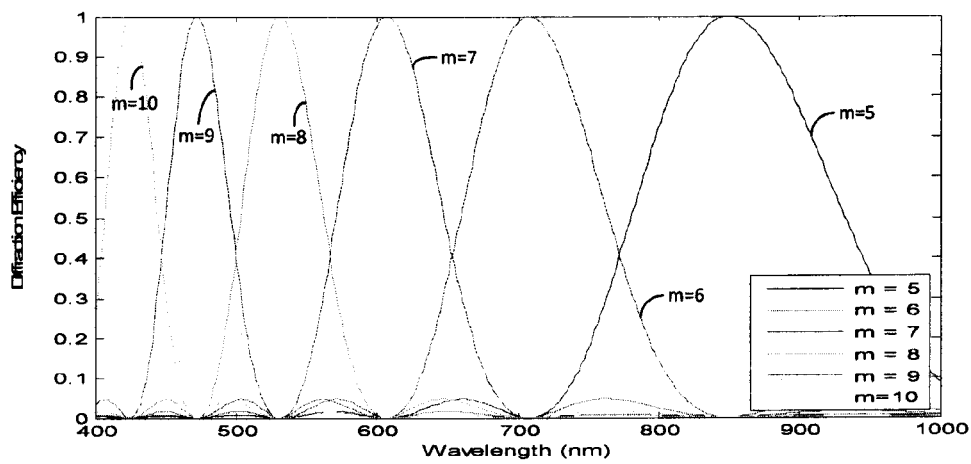
FIG. 6 is a graph of diffraction efficiency for a multiple order "deep" blazed diffraction grating having a 2.12 μm grating depth.
Figure 7A:
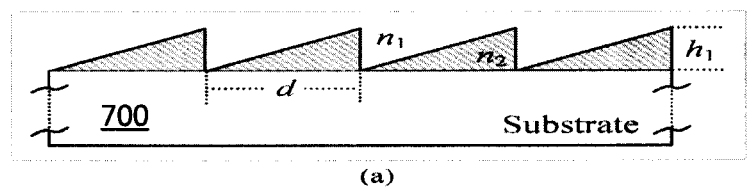
FIGS. 7A-7B illustrate single order and multiple order blazed gratings.
Figure 7B:
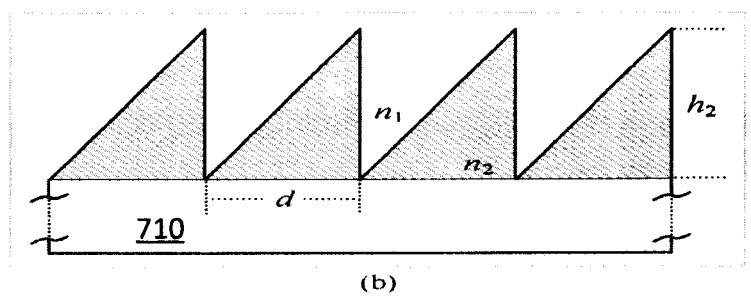

As shown above, in dual-band operation, an MWIR carrier frequency generated by a second order diffraction order is twice that of the LWIR carrier frequency generated by a first diffraction order. In additional examples, scene spatial information over a wide wavelength range can be modulated onto carrier frequencies that are spectrally dependent so that polarization information or spectral information can be extracted. In such applications, a 'deep', or multiple-order blazed grating (MBG) having multiple diffraction orders spanning the wavelength region of interest can be used. FIG. 6 is a graph of diffraction efficiency of such an MBG for a wavelength range spanning the visible and near infrared spectrum for diffraction orders 5-10. FIGS. 7A-7B are cross-sectional views of a single order BG 700 and an MBG 710. Both are defined by periodic steps of triangular cross-section between refractive indices $n_1$ and $n_2$ with period d, but the BG 700 has a height $h_1$ which is smaller than a height $h_2$ of the MBG 710.

Theoretical diffraction efficiency (DE) for an ideal blazed grating at a wavelength λ in a diffraction order m can be calculated as $$DE(\lambda, m) = \operatorname{sinc}^2\left(\frac{m - OPD}{\lambda}\right), \quad (13)$$

wherein $$OPD = h(n_1 - n_2), \quad (14)$$

and h is groove height, OPD is an optical path difference, and $n_1$, $n_2$ are indices of refraction for incident medium and blaze medium, respectively.

EXAMPLE 6

Back-to-Back Grating Multispectral Snapshot Imaging Spectrometer

Figure 8A:
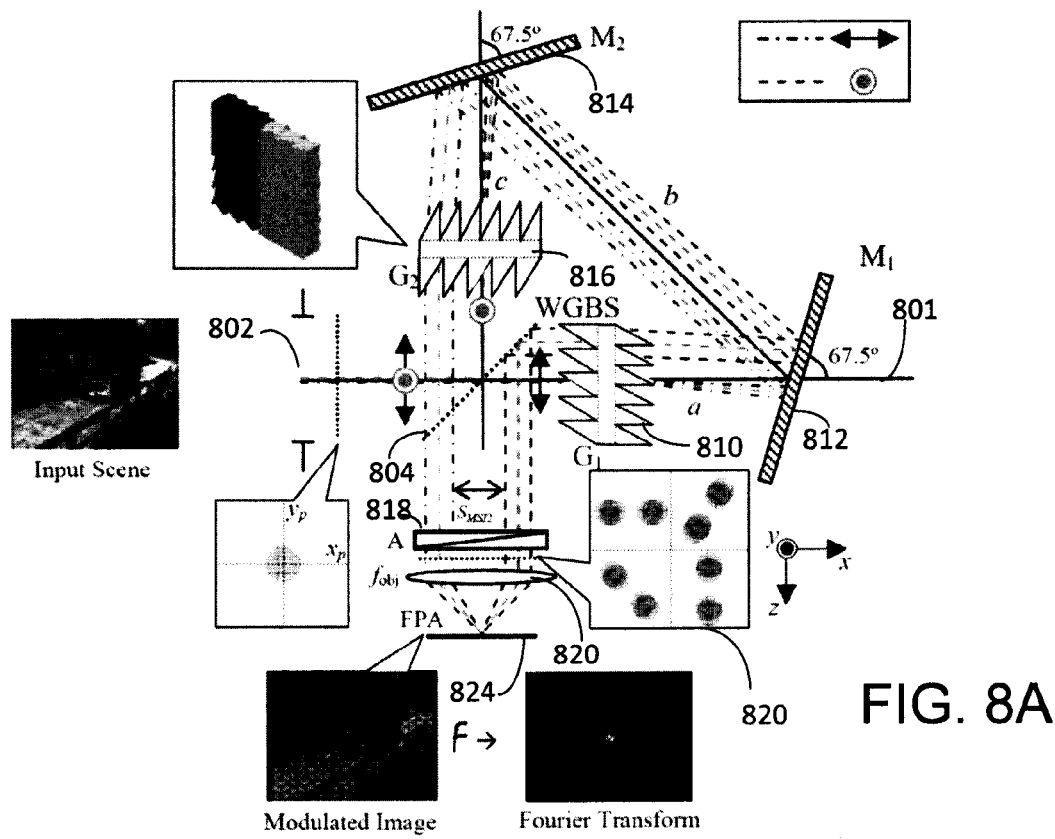
FIG. 8A illustrates a Sagnac interferometer based imaging polarimeter that includes multiple-order blazed gratings (MBGs) situated to provide multiple diffraction orders in two directions.

In other examples, multispectral polarimeters can include back-to-back gratings or grating assemblies with grating segments of various periods and orientation. With reference to FIG. 8A, a multispectral imaging polarimeter 800 includes an aperture 802 and a PBS 804 situated along an axis 801 and configured to receive an input optical flux, typically an optical flux associated with a two dimensional scene. The PBS 804 is situated to transmit a first polarization component to a first multi-wavelength blazed grating (MBG) 810, mirrors 812, 814, a second MBG 816 for transmission by the PBS 804 to a linear polarizer 818. An objective lens 820 focuses the received flux onto a focal plane array detector (FPA) 824. The PBS 804 is situated to reflect a second polarization component of the flux to the second MBG 816, mirrors 814, 812, the first MBG 810 for reflection by the PBS 804 to the linear polarizer 818. The objective lens 820 focuses the received flux onto the FPA 824 in combination with the flux transmitted by the PBS 804. As a result, a fringe pattern is formed on the FPA 824, with spatial carrier frequencies proportional to diffraction order.

Figure 8B:
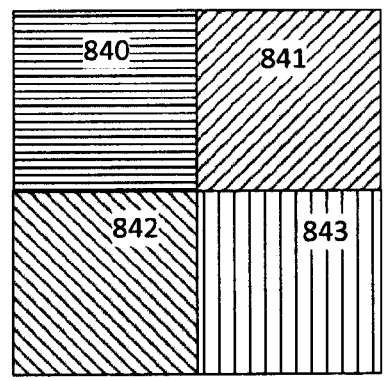
FIG. 8B illustrates a grating assembly that provides multiple diffraction orders in a plurality of directions.

The MBGs 810, 812 can be deep gratings as described above and shown in FIG. 7B. Such gratings produce fringe modulations at a variety of frequencies for corresponding spectral components of the scene optical flux based. Back to back gratings or multi-segmented gratings can be used. In the example of FIG. 8A, the MBGs 810, 812 are multi-segmented gratings as shown in FIG. 8B. For example, the MBG 810 can comprise grating segments 840-843 each having a different orientation and grating period. The grating segments can be low order blazed gratings or MBGs as well. The grating segments 840-843 can produce shears of different magnitudes and in different directions. In one example, an intensity distribution 820 is illustrated in a plane perpendicular to a z-axis (direction of optical flux propagation) and situated between the lens 820 and the analyzer 818. Shear of the input optical flux to locations displaced along both the x-axis and the y-axis and combinations of such shears is apparent.

If a linear polarizer is inserted with its axis at 45° with respect to the x-axis, then the Stokes vector incident on the PBS 804 is given by:

$$S_{WGBS} = \frac{1}{2}\begin{bmatrix} 1 & 0 & 1 & 0 \\ 0 & 0 & 0 & 0 \\ 1 & 0 & 1 & 0 \\ 0 & 0 & 0 & 0 \end{bmatrix}\begin{bmatrix} S_{0,inc} \\ S_{1,inc} \\ S_{2,inc} \\ S_{3,inc} \end{bmatrix} = \begin{bmatrix} S_{0,inc} + S_{2,inc} \\ 0 \\ S_{0,inc} + S_{2,inc} \\ 0 \end{bmatrix}. \quad (15)$$

$S_{0,inc}$, $S_{1,inc}$, $S_{2,inc}$, and $S_{3,inc}$ are the incident Stokes parameters at the linear polarizer and are implicitly dependent upon wavelength ($\lambda$). Substituting the values from $S_{WGBS}$ for the Stokes parameters from the equations above yields:

$$S'_0(m) = S'_2(m) = \int_{\lambda_{min}}^{\lambda_{max}} DE^2(\lambda, m)[S_{0,inc}(\lambda) + S_{2,inc}(\lambda)]\,d\lambda, \quad (16)$$

Substituting the values for $S_0'(m)$, $S_2'(m)$, and $S_3'(m)$ yields the intensity pattern:

$$I_{MSI}(x_i, y_i) = \frac{1}{2}\sum_{m=0}^{Ce[\lambda_1/\lambda_{min}]} [S''_0(m)] + \quad (17)$$
$$\frac{1}{2}\sum_{m=1}^{Ce[\lambda_1/\lambda_{min}]} \left[S''_0(m)\cos\left(\frac{2\pi}{f_{obj}}\frac{2m}{d}(a+b+c)x_i\right)\right],$$

wherein $$S''_0(m) = \int_{\lambda_{min}}^{\lambda_{max}} DE^2(\lambda, m)[S_{0,inc}(\lambda) + S_{2,inc}(\lambda)]\,d\lambda. \quad (18)$$

It should be noted that the dominant orders experimentally observed in the system correspond to the ceiling (Ce) of $\lambda_1/\lambda_{min}$, where $\lambda_1$ is the first order blaze wavelength of the diffraction grating. This changes the maximum limit of the summation from $d/\lambda_{min}$ to $Ce[\lambda_1/\lambda_{min}]$.

EXAMPLE 7

Combined Gratings/Reflectors

Figure 9:
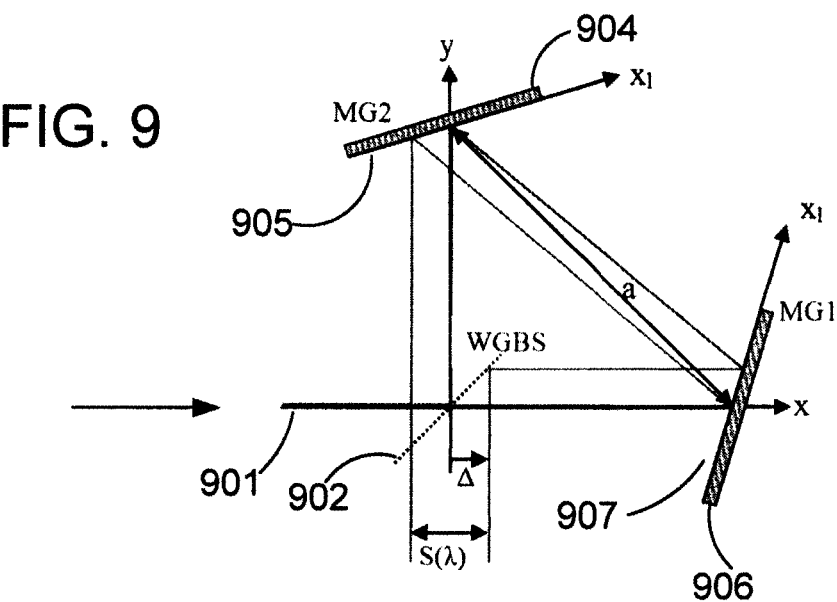
FIG. 9 illustrates a Sagnac interferometer system that includes diffraction gratings formed on mirror surfaces.

With reference to FIG. 9, a Sagnac interferometer based polarimeter includes mirrors 904, 906 that include diffraction gratings 905, 907 at respective mirror surfaces. Shear is dependent on pupil position in the y-plane due to the variation in separation along the mirror local x-axes $x_l$. The on-axis shear is:

$$S(\lambda) = \frac{2am\lambda}{d} \quad (19)$$

wherein a is a separation between mirrors 904, 906 along an optical axis 901 and is a function of $x_l$. To correct or compensate, a slowly varying chirp can be added to the blazed gratings on the mirrors 904, 906 such that a grating period d depends upon $x_l$. With such a modification, shear S can be constant or nearly so over the entire pupil.

EXAMPLE 8

Serial or Parallel Sagnac Interferometer Systems

Figure 11A:
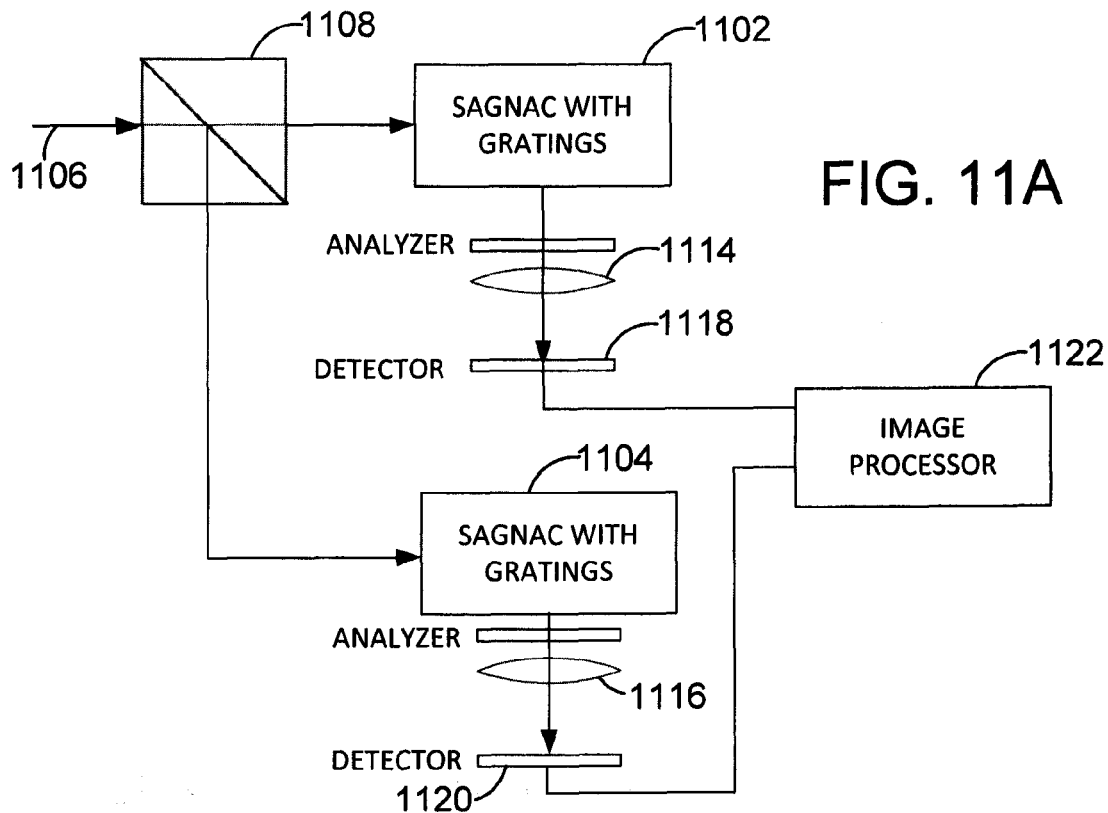
FIGS. 11A-11B illustrate polarimeters based on parallel or serial arrangements of Sagnac interferometers.
Figure 11B:
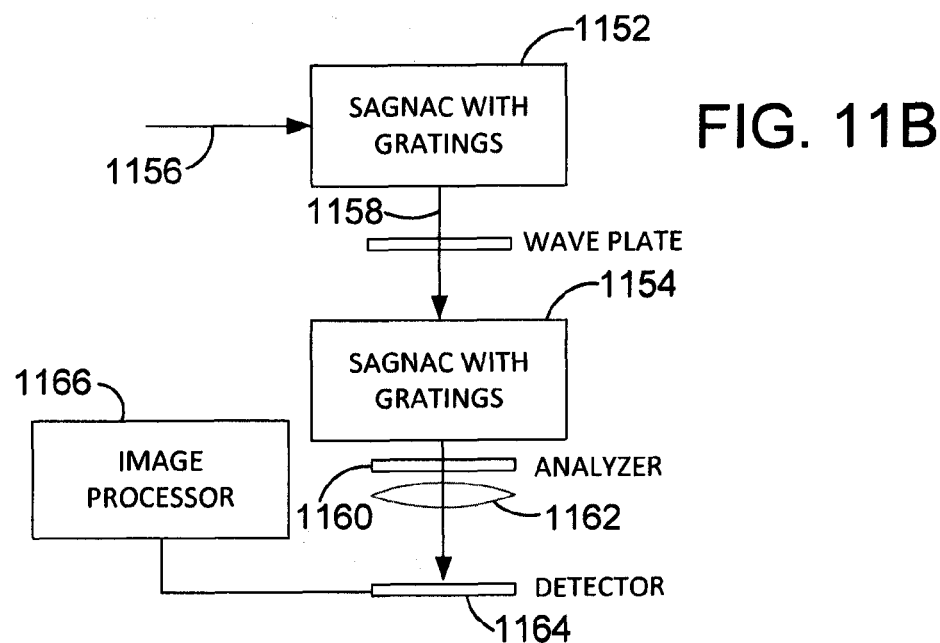

In some applications, determination of all four Stokes parameter may be desirable. Representative systems are illustrated in FIGS. 11A-11B. Referring to FIG. 11A, first and second Sagnac interferometer systems 1102, 1104 that include diffraction gratings as described in the examples above are configured to receive respective portions of an input optical flux 1106 from a beam splitter 1108. Typically, the beam splitter 1108 is substantially polarization independent, and can be provided as a plate beam splitter or other suitable optical element. The Sagnac interferometers direct sheared optical fluxes to respective polarizers (or other polarization components) 1110, 1112, lenses 1114, 1116, and array detectors 1118, 1120, respectively. An image processor 1122 receives detected interference signals from the array detectors 1118, 1120, respectively, and produces estimates of some or all Stokes parameters.

FIG. 11B illustrates a representative serial configuration that permits estimation of all four Stokes parameters. This configuration includes Sagnac interferometer systems 1152, 1154 situated in series. The interferometer 1152 is situated to receive an input optical flux 1156 and produce a sheared output flux 1158 that is directed to a retarder such as a quarter waver retarder or half wave retarder or other retarder and directed to the interferometer 1154. The interferometer 1154 provides additional shear and the sheared output is directed to an analyzer 1160, a lens 1162, and an array detector 1164. A detected interference pattern is evaluated in an image processor 1166 that is configured to identify one or more spatial frequency components in the detected interference pattern so as to provide estimates of one or more Stokes parameters.

The interferometers 1152, 1154 can be configured so as to produce interference patterns at different spatial frequencies based on, for example, diffraction grating periods, diffraction orders, or grating or mirror spacings. Modulations imposed by the interferometers can be detected based on these differing spatial frequencies. Alternatively, the interferometers 1152, 1154 can be configured to provide modulations at spatial frequencies associated with different spatial directions. For example, a first interferometer can provide an x-modulation and a second interferometer can provide a y-modulation that can be at the same or different spatial frequency so that modulation associated with the Stokes parameters can be identified based on either direction or spatial frequency or both.

EXAMPLE 9

Calcite Blazed Grating Pairs

Figure 12:
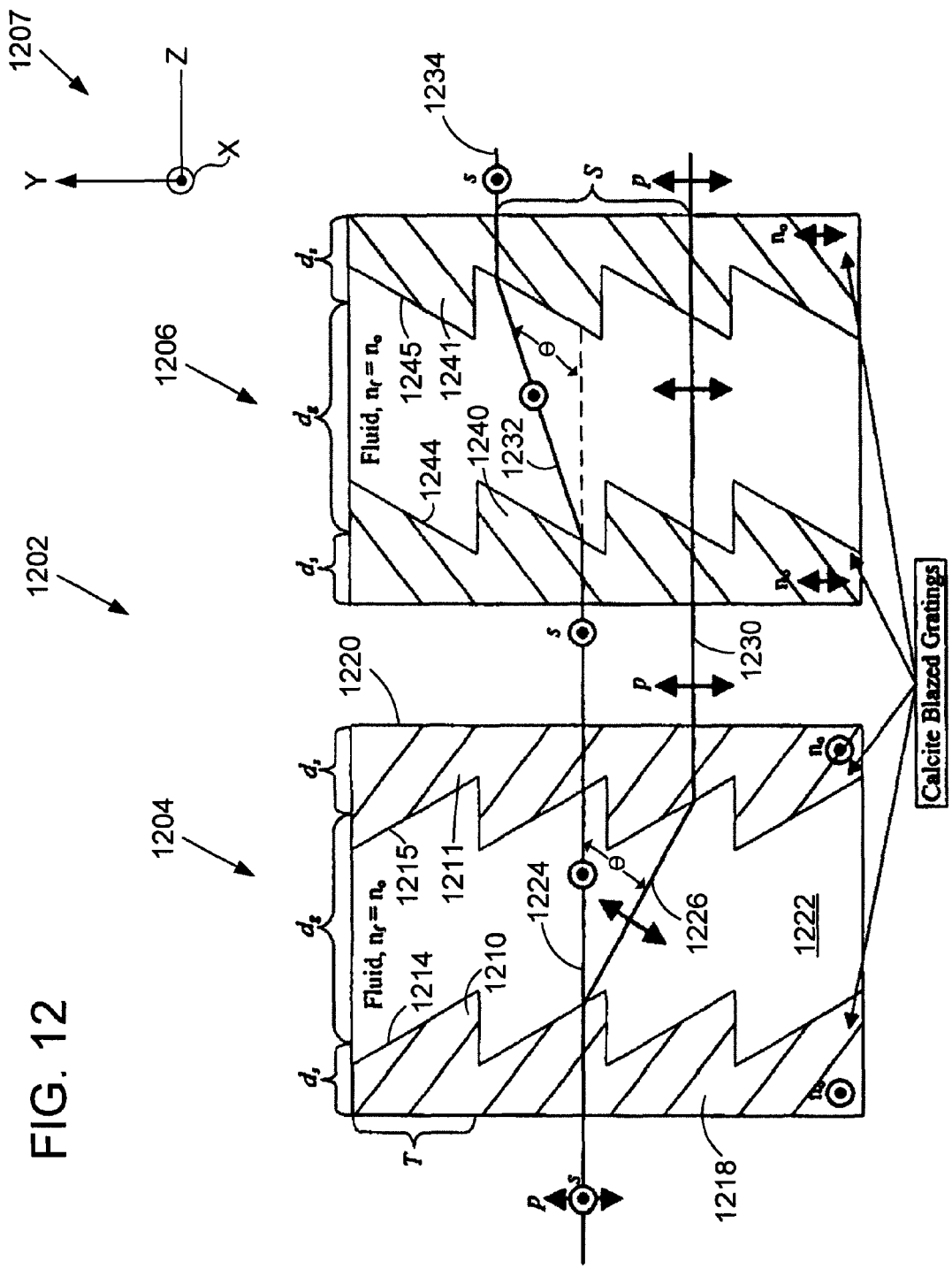
FIG. 12 is a schematic diagram of blazed birefringent grating pairs situated to produce a compensated shear.

Imaging or other polarimeters suitable for use white light or other broadband radiation can be based on polarization dependent diffraction gratings. Such polarimeters can produce modulated fringe patterns from which one or more Stokes images can be extracted as described above with Sagnac interferometer produced shear. FIG. 12 illustrates a portion of a representative optical system that includes a grating pair 1202 that includes a first grating 1204 and a second grating 1206. For convenience, the grating pair 1202 is described with reference to an orthogonal xyz-coordinate system 1207. A Y-axis and a Z-axis are shown in the plane of the drawing, and an X-axis is perpendicular to the plane of the drawing. The grating 1204 includes first and second birefringent subgratings 1210, 1211 having shaped ("blazed") surfaces 1214, 1215, respectively, that are periodic along the Y-axis. As shown in FIG. 12, the subgratings 1210, 1211 also include planar surfaces 1218, 1220 that can serve as optical input/output surfaces. These surfaces area typically planar, but non-planar surfaces can be used. The surfaces 1214, 1215 can be formed by any convenient process such as ruling or etching. In one convenient implementation, the surfaces 1214, 1215 are formed using anisotropic etching of a birefringent material such as calcite. The shaped surfaces 1214, 1215 are situated so as to be spaced apart and facing each other along an axis 1220. In addition, the surfaces 1214, 1215 are optically coupled with an index matching material 1222 such as an index matching liquid.

The birefringent subgratings 1210, 1211 can be formed of a uniaxial or biaxial material. The shaped surface 1214 and the subgrating 1210 are configured so that a selected input polarization (shown in FIG. 12 as an s-polarization) propagates in the subgrating 1210 and experiences a first index of refraction $n_o$ as so-called "ordinary" ray. A refractive index of the index matching material 1222 is selected to be substantially equal to $n_o$ so that an input beam corresponding to an "ordinary ray" is undiffracted and unrefracted at the shaped surface 1214. As shown in FIG. 12, the subgrating 1210 is configured so that an X-directed linear polarization is undiffracted by the shaped surface 1214 and propagates along a path 1224 that is substantially unchanged by the shaped surface 1214. In contrast, an orthogonal polarization (a Y-directed linear polarization, referred to as a p-polarization in FIG. 12) is diffracted/refracted based on a refractive index difference between the refractive index of the matching material 1222 and an extraordinary refractive index $n_e$ in the subgrating 1210 and propagates along a path 1226. The subgrating 1211 and the shaped surface 1215 are similarly configured so that the ordinary polarization exits the grating 1204 along the path 1226 and the extraordinary polarization is diffracted/refracted by the shaped surface 1215 so as to exit the grating 1204 along a path 1230 that is substantially parallel to and offset from the path 1226 associated with the ordinary ray.

The displaced ordinary and extraordinary beams could be combined with a lens and at least partially projected into a common state of polarization with a polarizer that is unaligned with either to produce interference fringes. Unfortunately, the displaced beams are associated with significant phase delays so that broadband illumination would produce no fringes or fringes with limited visibility. To compensate, the second grating 1206 is configured similarly to the first grating 1204, but with birefringent subgratings 1240, 1241 arranged so that the ordinary beam is diffracted/refracted along path 1232 by a shaped surface 1244 and then along a path 1234 by a shaped surface 1245. Thus, the same diffraction angles are encountered by both polarization components, although in different polarizing gratings. As a result, orthogonally polarized beams exit the second grating 1206 along parallel, displaced paths 1230, 1234. With each polarization displaced, broadband or white light fringes can be obtained. The shear S between the paths 1230, 1234 can be obtained as $S=2\, d_g \tan \theta \approx 2\, d_g \lambda/T$, wherein $\lambda$ is a wavelength, $\theta$ is a diffraction angle, m is a diffraction order, T is a grating period, and $d_g$ is separation of the shaped surfaces 1214, 1215 or 1244, 1245. As discussed above, a shear that is proportional to wavelength results in a spatial carrier frequency that is independent of wavelength, and thus suitable for use with broadband radiation.

In the example of FIG. 12, grating periods and shaped surface separations are the same for both the first and second gratings 1204, 1206, but in other examples, different spacing and periods can be used. Typically, differing periods and/or spacings tend to produce less visible fringes with broadband radiation. The configuration of FIG. 12 produces a compensated shear suitable for use with broadband radiation.

EXAMPLE 10

Dual Calcite Blazed Grating Pairs for X- and Y-Displacements

Figure 13:
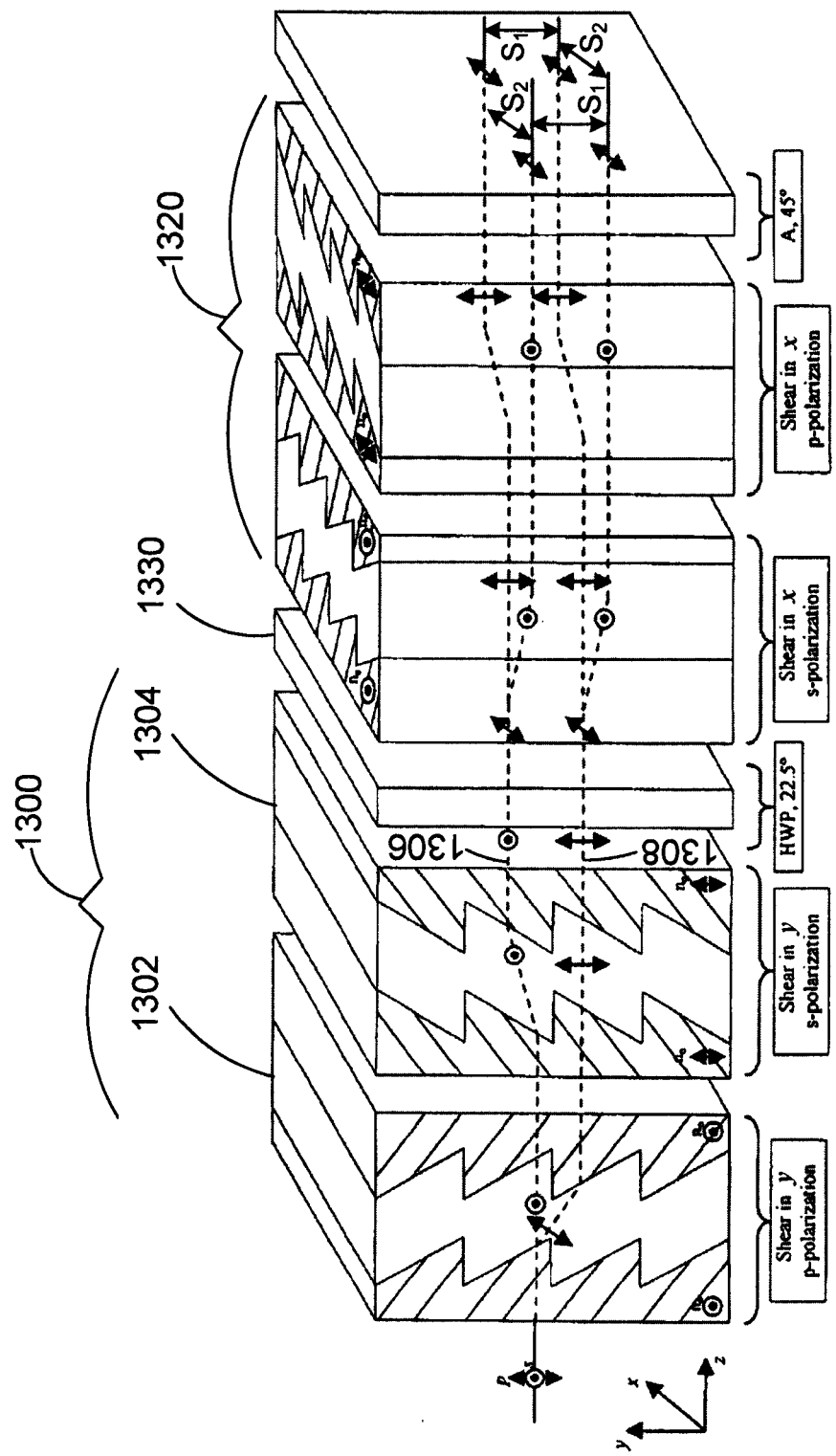
FIG. 13 is a schematic diagram of two pairs of blazed birefringent gratings configured to produce four beams based on compensated shears in an X-direction and a Y-direction.

Referring to FIG. 13, a first grating pair 1300 includes first and second calcite blazed gratings 1302, 1304 such as those described above and configured to produce compensated shear along a Y-direction so that an s-polarized beam 1306 and a p-polarized beam 1308 have a compensated shear $S_Y$ along a Y-direction. One or both of the beams 1306, 1308 can be sheared in an X-direction with a second grating pair 1320 that includes first and second calcite blazed gratings 1322, 1324 oriented orthogonal to those of the first grating pair 1300. The second grating pair 1320 can be configured to produce a shear $S_x$ that is the same or different that the shear $S_Y$ based on grating periods or spacings.

A half-waveplate (HWP) 1330 is situated with a fast or slow axis at about 22.5 degrees with respect to the X-axis or the Y-axis and between the first grating pair 1300 and the second grating pair 1320. The HWP 1330 rotates the plane polarization of each of the beams 1306, 1308 by 45 degrees so each of the beams 1306, 1308 is further sheared in an X-direction by the second grating pair 1320. Thus, four sheared beams are produced. To produce interference fringes, a polarization analyzer 1340 is situated so as to transmit linear polarization along an axis at 45 degrees with respect to the X-axis or the Y-axis. The corresponding polarized beams can then be focused to produce interference fringes.

EXAMPLE 11

Dual Calcite Blazed Grating Pairs for Linear SOP Imaging

Figure 14:
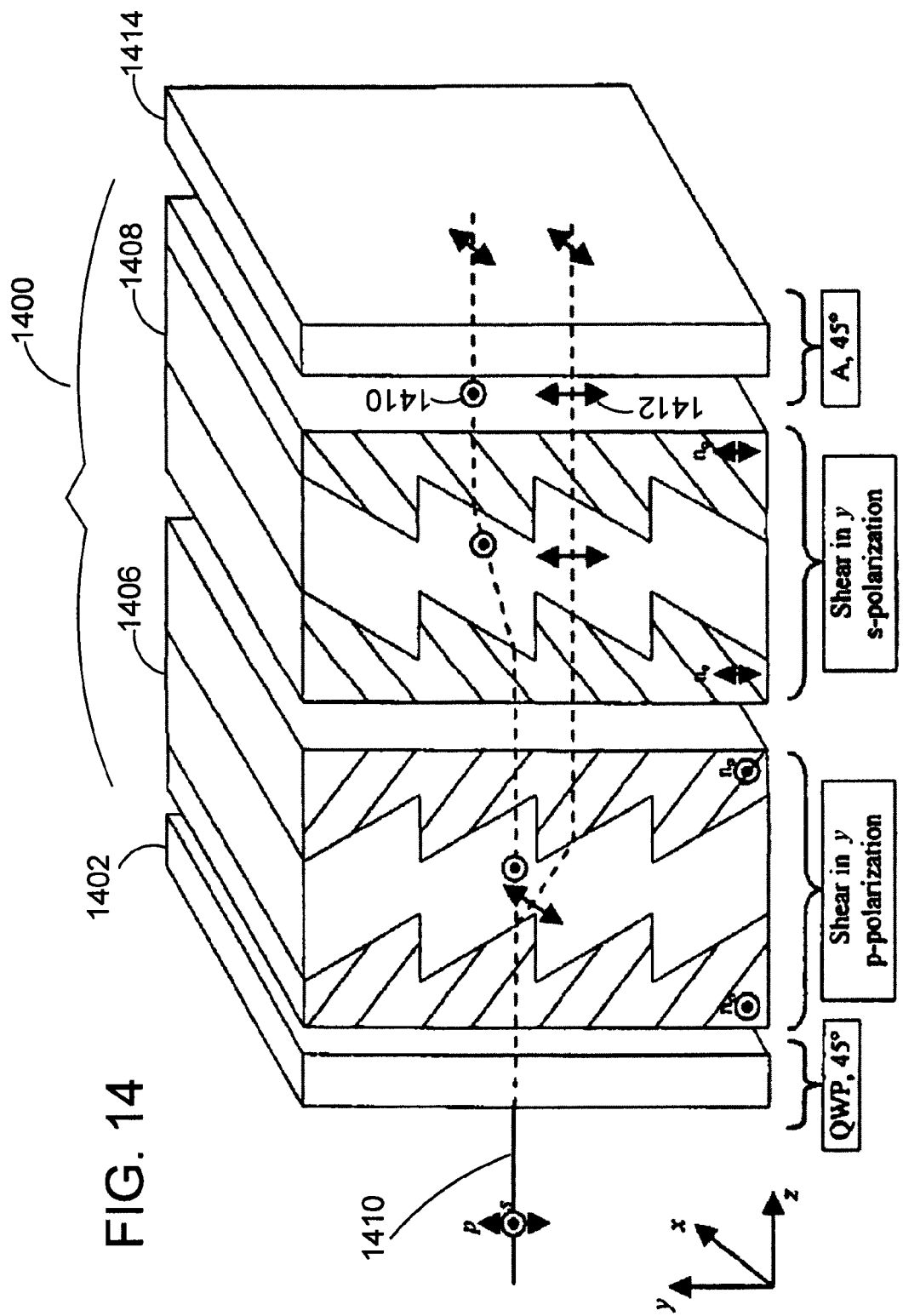
FIG. 14 illustrates production of a shear with a polarizing grating pair.

FIG. 14 is a representative example of a birefringent grating pair 1400 configured for linear polarization measurements. A quarter waveplate 1402 and first and second gratings 1406 and 1408 are situated along an axis 1410. An analyzer 1414 is situated with a fast axis at 45 degrees with respect to the states of polarization of the sheared beams 1410, 1412. Measurements of Stokes parameters $S_1$ and $S_2$ can be obtained, and the assembly can be located in a focal plane of a 4f imaging system (i.e., an imaging system with object and image distances of twice a focal length) or in front of a single lens/FPA combination for imaging of distant objects.

EXAMPLE 12

Liquid Crystal Polarization Grating (PG) Pairs

Figure 15:
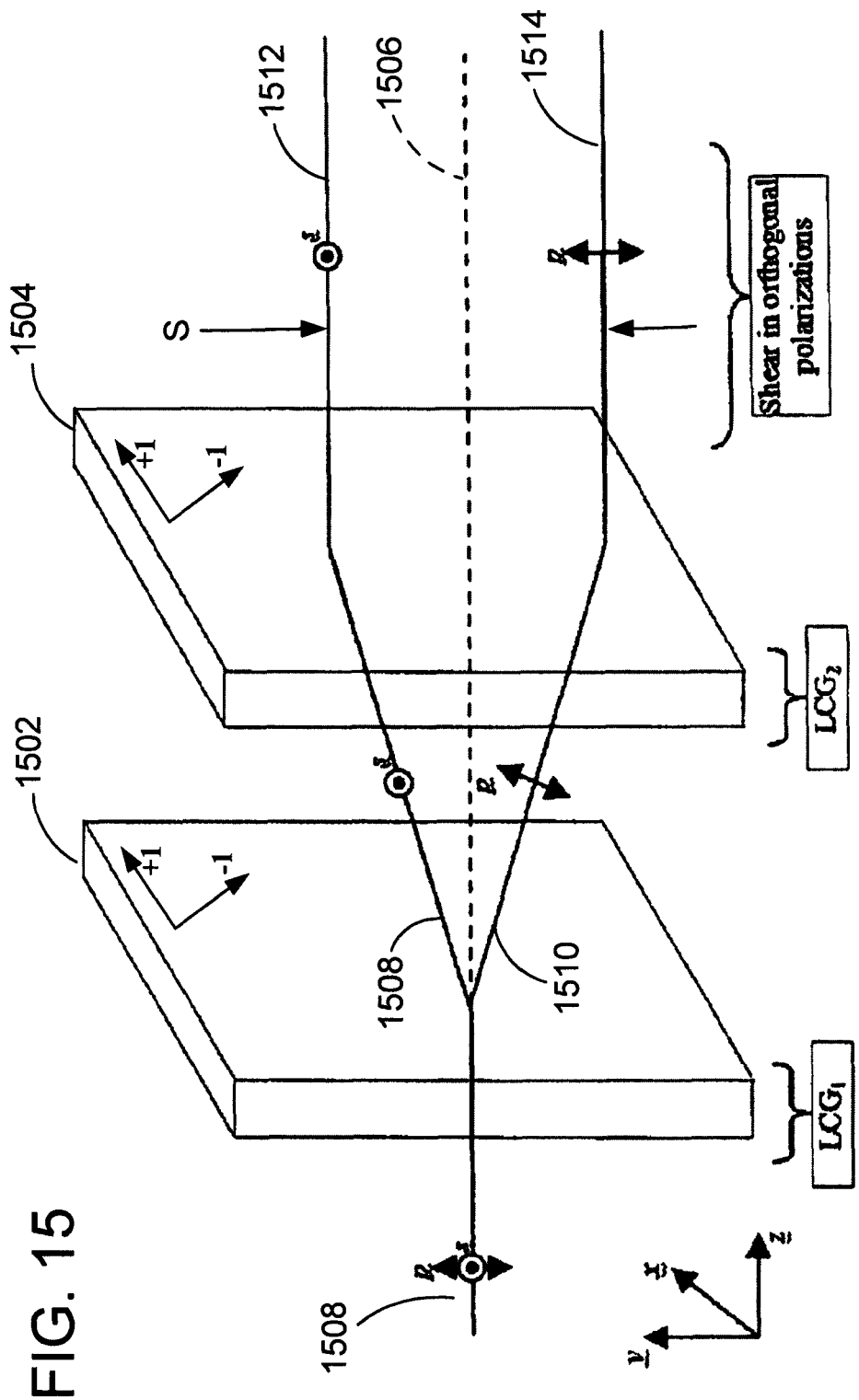
FIG. 15 illustrates production of a shear with polarizing liquid crystal gratings.

With reference to FIG. 15, a first liquid crystal grating (LCG1) 1502 and a second liquid crystal grating (LCG2) 1504 are situated on an axis 1506 so as to receive an input optical flux 1508 and produce a shear S between first and second polarization components. In the example of FIG. 15, the LCG 1502 diffracts an s-component upward into a +1 diffraction order along 1508 and a p-component downward into a −1 diffraction order along 1510. The LCG 1504 is also situated to diffract the s-component received from the LCG 1502 into a +1 diffraction order so as to exit the LCG 1504 along an axis 1512 that parallel to and displaced upwardly from the axis 1506. In addition, the LCG 1504 diffracts the received p-component into a −1 diffraction order along an axis 1514 that is parallel to and displaced downwardly from the axis 1506.

For convenience, FIG. 15 is described with reference to particular orthogonal linear polarizations, but any orthogonal polarization states can be similarly processed using one or more quarter waveplates, half waveplates, or other retardation plates, typically situated prior to the LCG 1502.

EXAMPLE 13

Channeled Imaging Polarimeter Using PGs

Figure 16:
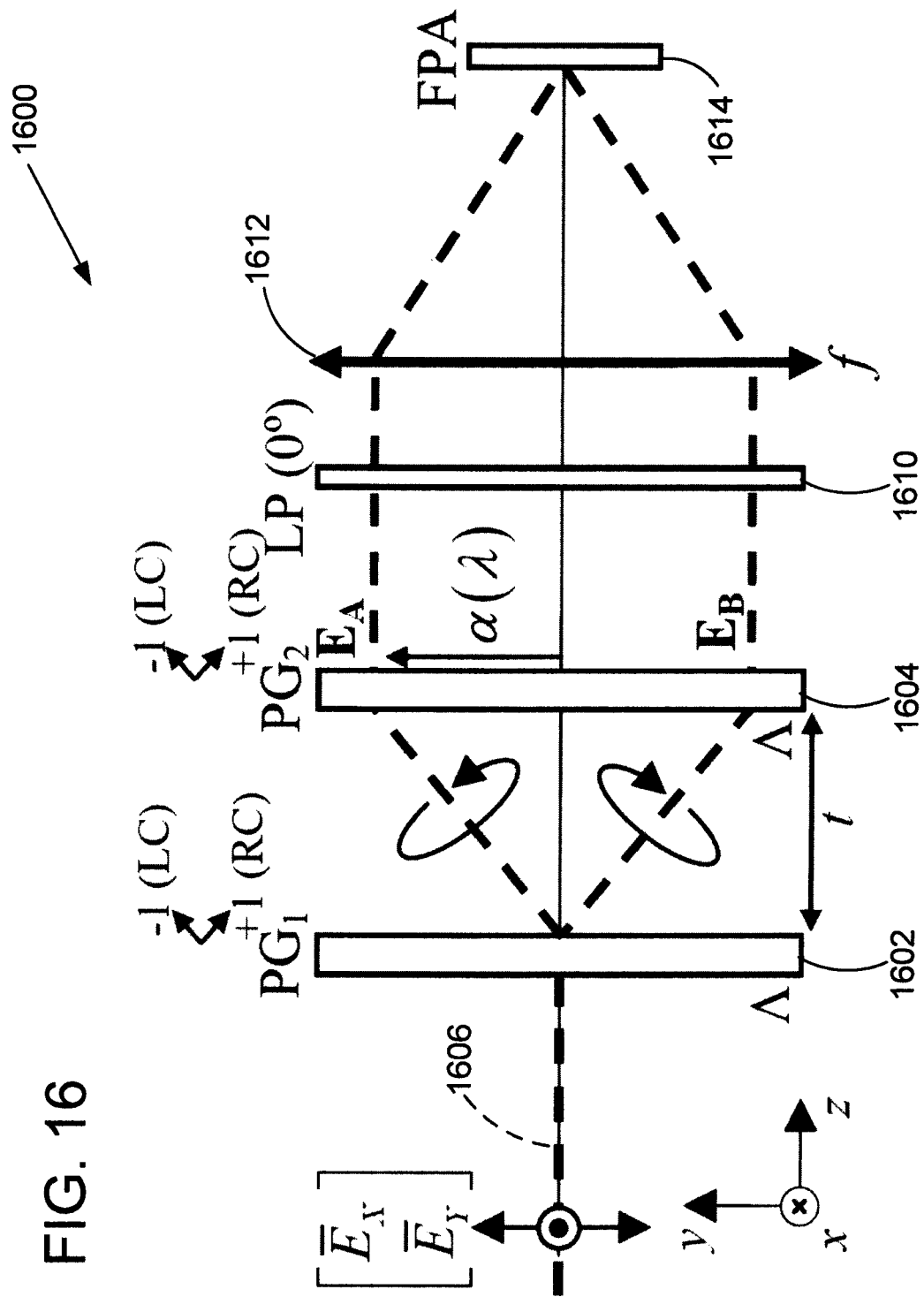
FIG. 16 is a schematic diagram of a CLI polarimeter using right circular (RC) and left circular (LC) polarizations diffracting into the −1 and +1 diffraction orders, respectively.

FIG. 16 illustrates a representative channeled imaging polarimeter (CIP) 1600. The CIP 1600 is configured to interferometrically generate carrier frequencies that are amplitude modulated based on spatially-dependent 2-dimensional Stokes parameters. Such a CIP exhibits inherent image registration and can be implemented with simple optical components. Image registration is inherent as all the Stokes parameters are directly modulated onto coincident interference fringes and the shear producing optical components can be added to nearly any pre-existing lens and camera system.

The CLI 1600 includes a first polarizing grating (PG) 1602 and a second PG 1604 that are situated along an axis 1606 and spaced apart by a distance t. The PGs 1602, 1604 provide shear similar to that produced by a diffractive Savart plate, so that interference fringes similar to a Sagnac interferometer's white-light fringes can be produced. Some or all Stokes parameters can be obtained. As shown in FIG. 16, the PGs 1602, 1604 have grating period Λ, and the PG 1604 is followed by a linear polarizer (LP) 1610 oriented with its transmission axis at 0° with respect to an X-axis axis. An objective lens 1612 with focal length f images collimated light from the PGs 1602, 1604 to produce polarization modulated fringes at a focal plane array (FPA) 1614.

Various PGs can be used. In a convenient example, spatially-periodic birefringence devices are used based on liquid crystal (LC) materials such as described in Oh and Escuti, "Numerical analysis of polarization gratings using the finite-difference time-domain method," *Phys Rev A* 76 (4), 043815 (2007), Oh and Escuti, "Achromatic diffraction from polarization gratings with high efficiency," *Opt. Lett.* 33, 2287-2289 (2008), Crawford et al., "Liquid-crystal diffraction gratings using polarization holography alignment techniques," *J Appl Phys* 98, 123102 (2005), Escuti et al., "Simplified spectropolarimetry using reactive mesogen polarization gratings," *Proc. SPIE* 6302, 630207, (2006), Escuti et al., U.S. Patent Application Publication 2010/0110363, and Escuti et al., U.S. Patent Application Publication 2010/0225856, all of which are incorporated herein by reference.

Such PGs can serve as thin-film beamsplitters that are functionally analogous to Wollaston prisms. In both elements, incident light is angularly separated into two, forward-propagating, orthogonal polarizations. However, typical PGs are an embodiment of the Pancharatnam-Berry phase operating on circular eigen-polarizations, whereas Wollaston prisms are based on double refraction and operate on linear eigen-polarizations. Details of LC microstructure and holographic fabrication can be found in the references noted above.

The polarization behavior and diffraction efficiency spectra of such LC PGs are different than conventional phase or amplitude gratings. While the natural eigen-polarizations are circular (i.e., linearly proportional to $S_3/S_0$), LC PGs can be paired with a quarter waveplate (QWP) in order to separate incident light based on other desired polarizations (i.e., $S_1/S_0$ or $S_2/S_0$). Light diffracted from the PGs is directed almost entirely into the first (m=±1) or zero (m=0) diffraction orders, wherein diffraction angles are defined by the classical grating equation $\sin \theta_m = m\lambda/\Lambda - \sin \theta_{in}$, wherein Λ is the grating period, m is the grating order, and $\theta_m$ and $\theta_{in}$ are the diffracted and incidence angles, respectively. The diffraction efficiency of a PG can be typically expressed as:

$$\eta_{\pm 1} = \left(\frac{1}{2} \mp \frac{S_3}{2S_0}\right)K,$$

$$\eta_0 = (1 - K),$$

wherein K is a factor determined by the LC structure in the PG.

The CLI polarimeter 1600 preferably uses PGs that are capable of high efficiency operation over a broad (whitelight) spectrum. The original LC-based PG had a relatively narrow diffraction efficiency spectrum such that high first-order efficiency (>99%) occurred only at wavelengths close to a specified design wavelength $\lambda_0$ (typically within $\Delta\lambda/\lambda_0 \sim 13\%$). However, broadband PGs having a high efficiency spectral bandwidth ($\Delta\lambda/\lambda_0 \sim 56\%$) which can cover most of the visible wavelength range are available. For these PGs, the factor K can be approximated as K=1, so that $\eta_{\pm 1}=1$ and $\eta_0=0$ for most visible wavelengths (e.g., 450-750 nm).

In the CLI polarimeter 1600, incident light is transmitted by $PG_1$ and diffracted into left and right circularly polarized components, propagating above and below the axis 1606, respectively. After transmission through $PG_2$, the two beams ($E_A$ and $E_B$) are diffracted again to propagate parallel to the optical axis 1606 and are now sheared by a distance 2α. The linear polarizer (LP) 1610 analyzes both beams, thus producing a common polarization state. Imaging both beams onto the FPA 1614 with the lens 1612 combines the two beams and produces interference fringes.

The intensity pattern on the FPA 1614 can be estimated by assuming that an arbitrarily polarized electric field is incident on the first polarization grating ($PG_1$). The incident field can be expressed as $$E_{inc} = \begin{bmatrix} \overline{E}_X \\ \overline{E}_Y \end{bmatrix} = \begin{bmatrix} E_X(\xi,\eta)e^{j\varphi_x(\xi,\eta)} \\ E_Y(\xi,\eta)e^{j\varphi_y(\xi,\eta)} \end{bmatrix},$$

wherein ξ, η are the angular spectrum components of x and y, respectively. The PG's +1 and −1 diffraction orders can be modeled as right and left circular polarization analyzers with their Jones matrices expressed as $$J_{+1,RC} = \frac{1}{2}\begin{bmatrix} 1 & i \\ -i & 1 \end{bmatrix},$$

$$J_{-1,LC} = \frac{1}{2}\begin{bmatrix} 1 & -i \\ i & 1 \end{bmatrix}.$$

After transmission through $PG_1$ and $PG_2$, the x and y polarization components of the electric field, for each of the two beams, are $$E_A = J_{-1,LC}E_{inc} = \frac{1}{2}\begin{bmatrix} \bar{E}_X(\xi,\eta-\alpha) - j\bar{E}_Y(\xi,\eta-\alpha) \\ j\bar{E}_X(\xi,\eta-\alpha) + \bar{E}_Y(\xi,\eta-\alpha) \end{bmatrix},$$

$$E_B = J_{+1,RC}E_{inc} = \frac{1}{2}\begin{bmatrix} \bar{E}_X(\xi,\eta+\alpha) + j\bar{E}_Y(\xi,\eta+\alpha) \\ -j\bar{E}_X(\xi,\eta+\alpha) + \bar{E}_Y(\xi,\eta+\alpha) \end{bmatrix},$$

wherein $\alpha$ is the shear, calculated using the paraxial approximation as $$\alpha \cong \frac{m\lambda}{\Lambda}t$$

wherein m is a diffraction order (usually either 1 or −1). The total electric field incident on the linear polarizer (LP) 1610 is $$E^+_{LP} = E_A + E_B =$$

$$\frac{1}{2}\begin{bmatrix} \bar{E}_X(\xi,\eta+\alpha) + j\bar{E}_Y(\xi,\eta+\alpha) + \bar{E}_X(\xi,\eta-\alpha) - j\bar{E}_Y(\xi,\eta-\alpha) \\ -j\bar{E}_X(\xi,\eta+\alpha) + \bar{E}_Y(\xi,\eta+\alpha) + j\bar{E}_X(\xi,\eta-\alpha) + \bar{E}_Y(\xi,\eta-\alpha) \end{bmatrix}.$$

Transmission through the linear polarizer, with its transmission axis at 0°, yields $$E^-_{LP} = \begin{bmatrix} 1 & 0 \\ 0 & 0 \end{bmatrix} E^+_{LP} =$$

$$\frac{1}{2}\begin{bmatrix} \bar{E}_X(\xi,\eta+\alpha) + j\bar{E}_Y(\xi,\eta+\alpha) + \bar{E}_X(\xi,\eta-\alpha) - j\bar{E}_Y(\xi,\eta-\alpha) \\ 0 \end{bmatrix}.$$

The objective lens 1614 produces a Fourier transformation of the field as, $$E_f = F[E^-_{LP}]_{\xi=\frac{x}{\lambda f},\eta=\frac{y}{\lambda f}} =$$

$$\frac{1}{2}\left[\bar{E}_X e^{j\frac{2\pi}{\lambda f}\alpha y} + j\bar{E}_Y e^{j\frac{2\pi}{\lambda f}\alpha y} + \bar{E}_X e^{-j\frac{2\pi}{\lambda f}\alpha y} - j\bar{E}_Y e^{-j\frac{2\pi}{\lambda f}\alpha y}\right],$$

wherein $\bar{E}_X$ and $\bar{E}_Y$ are now implicitly dependent upon x and y and f is the focal length of the objective lens 1614. Total electric field intensity can be written as follows:

$$I = |E_f|^2 = \frac{1}{2}(|\bar{E}_X|^2 + |\bar{E}_Y|^2) +$$

$$\frac{1}{4}(\bar{E}_X\bar{E}_X^* - \bar{E}_Y\bar{E}_Y^*)e^{j\frac{2\pi}{\lambda f}2\alpha y} + \frac{1}{4}(\bar{E}_X\bar{E}_X^* - \bar{E}_Y\bar{E}_Y^*)e^{-j\frac{2\pi}{\lambda f}2\alpha y} +$$

$$j\frac{1}{4}(\bar{E}_X\bar{E}_Y^* + \bar{E}_Y\bar{E}_X^*)e^{j\frac{2\pi}{\lambda f}2\alpha y} - j\frac{1}{4}(\bar{E}_X\bar{E}_Y^* + \bar{E}_Y\bar{E}_X^*)e^{-j\frac{2\pi}{\lambda f}2\alpha y}.$$

Simplification using the Stokes parameter definitions yields the final expression for the intensity pattern:

$$I(x,y) = \frac{1}{2}\left[S_0(x,y) + S_1(x,y)\cos\left(\frac{2\pi}{\lambda f}2\alpha y\right) + S_2(x,y)\sin\left(\frac{2\pi}{\lambda f}2\alpha y\right)\right]. \quad (20)$$

Consequently, the intensity recorded on the FPA 1614 contains the amplitude modulated Stokes parameters $S_0$, $S_1$ and $S_2$. Substitution of the shear into Eq. (20) produces an expression for intensity I:

$$I(x,y) = \frac{1}{2}\left[S_0(x,y) + S_1(x,y)\cos\left(2\pi\frac{2mt}{f\Lambda}y\right) + S_2(x,y)\sin\left(2\pi\frac{2mt}{f\Lambda}y\right)\right]. \quad (21)$$

From Eq. (2), the frequency of the interference fringes, or the carrier frequency, denoted by U is $$U = \frac{2mt}{f\Lambda}. \quad (22)$$

Thus, the linear Stokes parameters are amplitude modulated onto spectrally broadband (white-light) interference fringes.

EXAMPLE 14

CLI Calibration

A CLI polarimeter such as that of FIG. 16 can be calibrated by applying a reference beam calibration technique as described in Oka and Saito, "Snapshot complete imaging polarimeter using Savart plates," Proc. SPIE 6295, 629508 (2006) and Kudenov et al., "Prismatic imaging polarimeter calibration for the infrared spectral region," *Opt. Exp.* 16, 13720-13737 (2008), both of which are incorporated herein by reference. First, a forward 2-dimensional (2D) Fourier transformation is performed on the intensity pattern of Eq. (21), producing $$I(\xi,\eta) = F[I(x,y)] = \frac{1}{2}S_0(\xi,\eta) + \frac{1}{4}S_1(\xi,\eta)*[\delta(\xi,\eta+U) + \delta(\xi,\eta-U)] + i\frac{1}{4}S_2(\xi,\eta)*[\delta(\xi,\eta+U) - \delta(\xi,\eta-U)], \quad (23)$$

wherein $\xi$ and $\eta$ are the Fourier transform variables for x and y, respectively, and $\delta$ is the Dirac delta function. Eq. (23) indicates the presence of three "channels" in the Fourier domain. The $S_1$ and $S_2$ Stokes parameters are modulated (i.e., convolved) by two shifted ($\pm U$) delta functions, while the $S_0$ Stokes parameter remains unmodulated. These three channels are denoted as $C_0$ ($S_0$), $C_1$ (($S_1-iS_2$)$\delta(\xi,\eta-U)$) and $C_1^*$(($S_1+iS_2$)$\delta(\xi,\eta+U)$), respectively. Applying a 2D filter to two of the three channels ($C_0$ and $C_1$ or $C_1^*$), followed by an inverse Fourier transformation, enables their content to be isolated from the other components. Inverse Fourier transformation of channels $C_0$ and $C_1$ produces $$C_0 = \tfrac{1}{2}S_0(x,y), \quad (24)$$

$$C_1 = \tfrac{1}{4}(S_1(x,y) - iS_2(x,y))e^{i2\pi Uy}. \quad (25)$$

Therefore, the $S_0$ Stokes parameter can be extracted directly from Eq. (24), while the $S_1$ and $S_2$ components are modulated by an exponential phase factor $e^{i2\pi Uy}$. Isolating this phase factor from the sample data ($C_{0,sample}$ and $C_{1,sample}$) is accomplished by comparing it to a previously measured reference polarization state ($C_{0,ref}$ and $C_{1,ref}$) containing the known distribution $[S_{0,ref}, S_{1,ref}, S_{2,ref}, S_{3,ref}]^T$. The sample's Stokes parameters are demodulated by dividing the sample data by the reference data, followed by normalization to the $S_0$ Stokes parameter and extraction of the real and imaginary parts, $$S_0(x, y) = |C_{0,sample}|, \quad (26)$$

$$\frac{S_1(x, y)}{S_0(x, y)} = \Re\left[\frac{C_{1,sample}}{C_{1,reference}} \frac{C_{0,reference}}{C_{0,sample}} \left(\frac{S_{1,ref}(x, y) - iS_{3,ref}(x, y)}{S_{0,ref}(x, y)}\right)\right], \quad (27)$$

$$\frac{S_2(x, y)}{S_0(x, y)} = \Im\left[\frac{C_{1,sample}}{C_{1,reference}} \frac{C_{0,reference}}{C_{0,sample}} \left(\frac{S_{1,ref}(x, y) - iS_{2,ref}(x, y)}{S_{0,ref}(x, y)}\right)\right]. \quad (28)$$

For instance, using reference data created by a linear polarizer, oriented at 0° $[S_0, S_1, S_2, S_3]^T = [1, 1, 0, 0]^T$, yields the following reference-beam calibration equations:

$$S_0(x, y) = |C_{0,sample}|, \quad (29)$$

$$\frac{S_1(x, y)}{S_0(x, y)} = \Re\left[\frac{C_{1,sample}}{C_{1,reference}} \frac{C_{0,reference}}{C_{0,sample}}\right], \quad (30)$$

$$\frac{S_2(x, y)}{S_0(x, y)} = \Im\left[\frac{C_{1,sample}}{C_{1,reference}} \frac{C_{0,reference}}{C_{0,sample}}\right]. \quad (31)$$

Eqns. (29)-(31) are applied to the measured data in order to extract the scene's spatially-dependent Stokes parameters.

EXAMPLE 15

CLI Polarimeter Implementation

Figure 17:
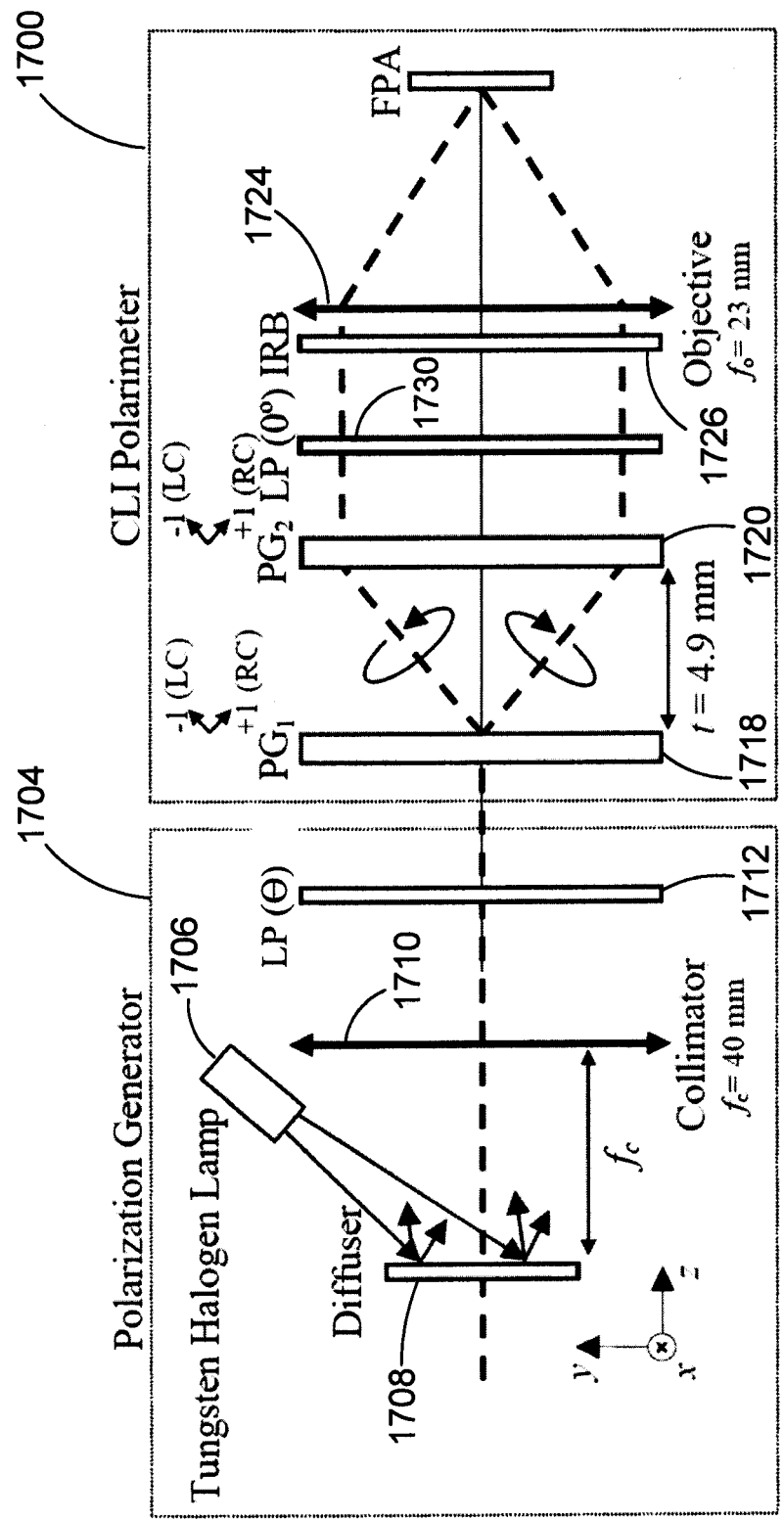
FIG. 17 is an arrangement for establishing the measurement accuracy of a CLI polarimeter in white-light.

An experimental configuration for establishing the measurement accuracy of a CLI polarimeter 1700 in white-light is illustrated in FIG. 17. A linear polarization generator (LPG) 1704 includes a tungsten halogen fiber-lamp 1706 configured to illuminate a diffuse white ceramic plate 1708. The diffuser 1708 is positioned near the focal point of a collimating lens 1710 with an effective focal length, $f_c$, of 40 mm. Collimated light propagates to a linear polarizer 1712 oriented with its transmission axis at θ. The polarization generator 1704 produces a uniformly polarized scene for the CLI polarimeter 1700 to image. The period of polarization gratings (PG₁ and PG₂) 1718, 1720 is Λ=7.9 μm and the focal length of an objective lens 1724 is $f_o$=23 mm. An infrared blocking filter (IRB) 1726 is situated in front of the objective lens 1724 to limit the spectral passband of the imaged light to 410-750 nm. Lastly, a FPA 1730 is an 8-bit monochrome machine vision camera, containing 640×480 pixels, placed at the focal point of the objective lens 1724. A linear polarizer 1730 is configured to analyze the sheared beams.

EXAMPLE 16

Calibration Verification

Figure 18A:
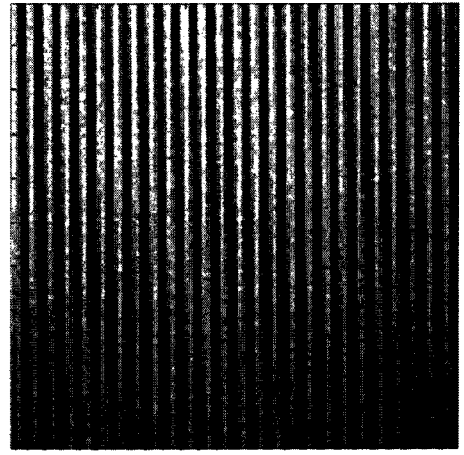
FIGS. 18A-18C are white-light interference fringe patterns generated in a central 100×100 pixels on a focal plane array at polarizer orientations of θ=0°, θ=50°, and θ=90°, respectively.
Figure 18B:
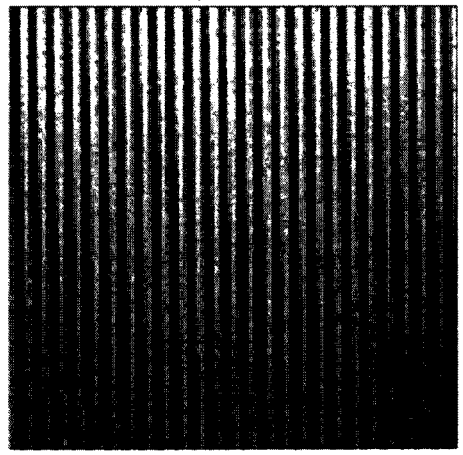
Figure 18C:
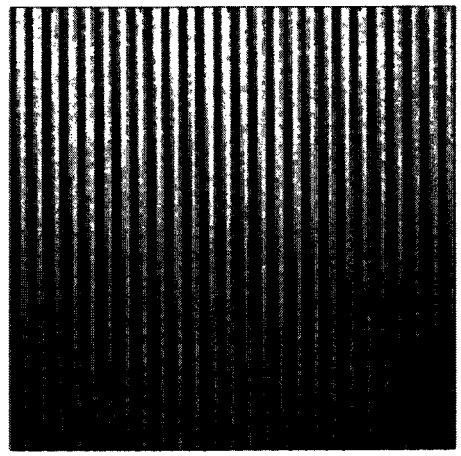

In order to verify the mathematical relationship of Eq. (2), in addition to the calibration accuracy defined at a constant illumination condition, reference data were taken with the apparatus of FIG. 17 and rotating the LP 1712 for angles θ between 0° and 180° in 10° increments. After reconstruction, a central portion of the field of view (FOV) was averaged over a 100×100 pixel area to obtain an average value for the measured polarization state. Images of the white-light interference fringes from this 100×100 pixel area are depicted in FIGS. 18A-18C for θ equal to 0°, 50° and 90°, respectively.

Figure 19:
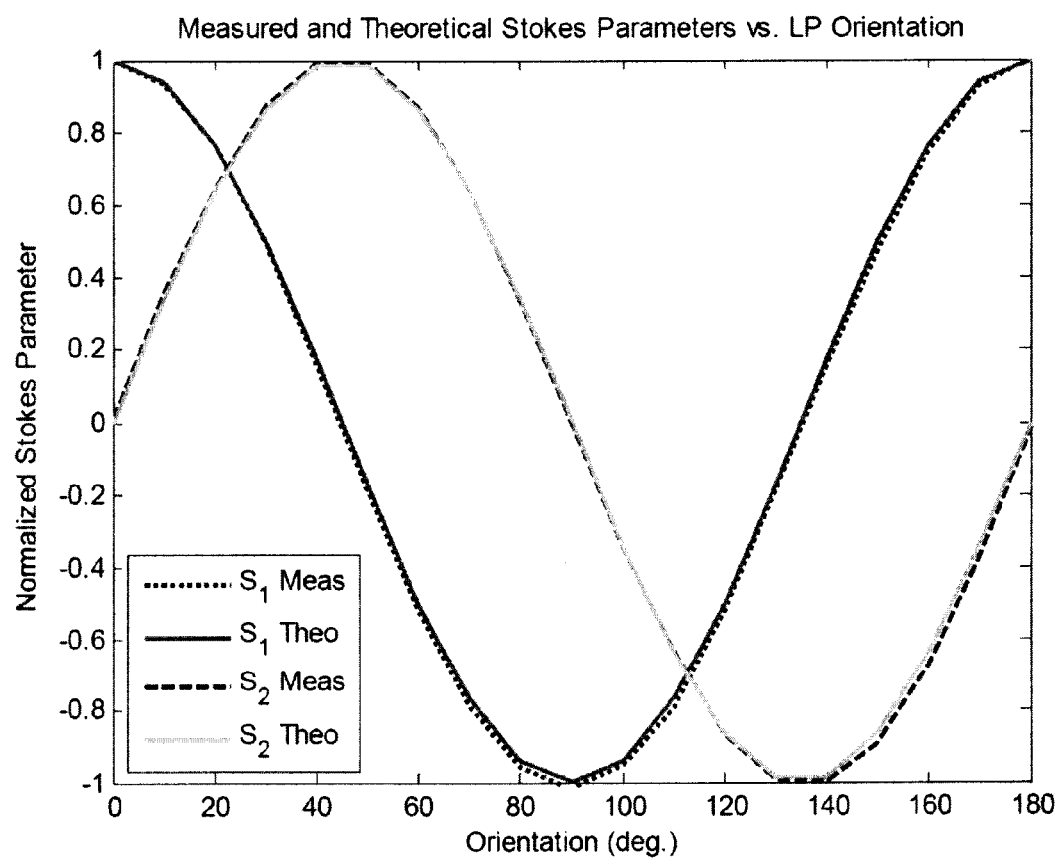
FIG. 19 is a graph comparing measured and theoretical polarimetric reconstructions.

Note that the phase of the sinusoidal fringes changes while the amplitude remains constant for varying linear polarizer orientations. This phase change is directly related to Eq. (21), and indicates the varying proportions of $S_1$ to $S_2$ as the LP 1712 is rotated. Meanwhile, the amplitude remains constant because the degree of linear polarization (DOLP= $\sqrt{S_1^2 + S_2^2}/S_0$) from the LPG 1704 is constant (~1). Plotting the measured $S_1$ and $S_2$ Stokes parameters versus θ and comparing them to the theoretical values yields the results depicted in FIG. 19. The calculated RMS error for both curves is approximately 1.6%. This implies that the amplitude modulation of Eq. (21) accurately follows the incident Stokes parameter variation.

EXAMPLE 17

Polarization Grating Performance

Figure 20:
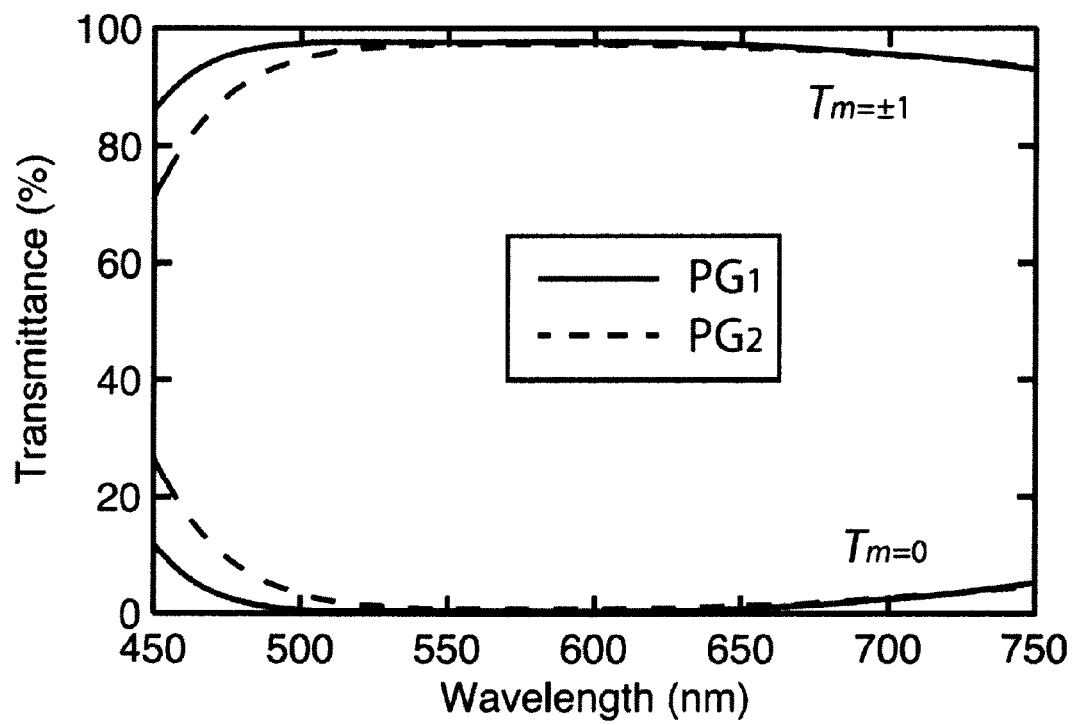
FIG. 20 includes measured zero-order and total first-order ($T_{\pm1}=T_{+1}+T_{-1}$) transmission spectra of a representative polarization grating.

To assess the performance of PGs, zeroth diffraction order transmissions can be measured. This provides an approximate metric for how efficiently PGs diffract light into the +/−1 diffraction orders. Results of typical transmission measurements are shown in FIG. 20, demonstrating that the PGs are highly efficient for wavelengths spanning 500-750 nm, but rather inefficient below 475 nm. Consequently, zero-order light transmitted at wavelengths less than 475 nm can cause error in the calculated Stokes parameters, primarily in the normalization of the measured Stokes parameters to $S_0$. Expressing the Stokes parameters in Eq. (21) as spectrally band-integrated functions yields $$S'_n(x, y) = \int_{\lambda_1}^{\lambda_2} DE^2(\lambda) S_n(x, y, \lambda) d\lambda,$$

wherein DE is the diffraction efficiency of one PG for the +1st or −1st order, the prime superscript on the Stokes parameters indicate that they have been spectrally band-integrated, and the subscript n=0, 1, or 2 indicates the $S_0$, $S_1$, or $S_2$ Stokes parameter, respectively. It is assumed for this example that both PGs have the same DE as a function of wavelength. In a spectral region where the DE is not ideal, such that DE<1.0, then some light transmitted through the PGs is not diffracted. This can be introduced to the model [Eq. (21)] as an additional unmodulated zero-order undiffracted offset term $\Delta_{offset}$:

$$I(x, y) = \frac{1}{2}\left[\Delta_{offset}(x, y) + S'_0(x, y) + S'_1(x, y)\cos\left(2\pi\frac{2mt}{f\Lambda}y\right) + S'_2(x, y)\sin\left(2\pi\frac{2mt}{f\Lambda}y\right)\right],$$

Reconstructing via Eqns. (26)-(28) yields the appropriate absolute results for $S_1$ and $S_2$; however, $S_0$ will be erroneous due to the additional offset. Therefore, measured normalized Stokes parameters can be introduced and denoted by double primes $$S''_0(x, y) = S'_0(x, y) + \Delta_{offset}(x, y),$$

$$\frac{S''_n(x, y)}{S''_0(x, y)} = \frac{S'_n(x, y)}{S'_0(x, y) + \Delta_{offset}(x, y)},$$

wherein the subscript n=1 or 2 indicates the $S_1$ or $S_2$ Stokes parameter, respectively. Consequently, error is induced into the $S_1$ and $S_2$ Stokes parameters from the normalization to the effectively larger $S_0$ component ($S'_0(x, y)+\Delta_{offset}(x, y)$). While error due to this zero-order light leakage was observed in some outdoor tests, it was negligible in laboratory characterizations in which an $S_0$ reference and sample illumination levels were constant. PG's with a zero-order light transmission less than 3% over the passband would enable better accuracy regardless of the $S_0$ illumination level.

EXAMPLE 18

Outdoor Measurements

The snapshot imaging capability of a CLI polarimeter was also assessed outdoors on moving targets. For outdoor scenes, the absolute accuracy of the Stokes parameters for varying illumination levels is not well established, again due to the zero-order diffraction efficiency leakage discussed previously. Outdoor results are provided here to demonstrate snapshot imaging and reconstruction capabilities in full sunlight.

Figure 21:
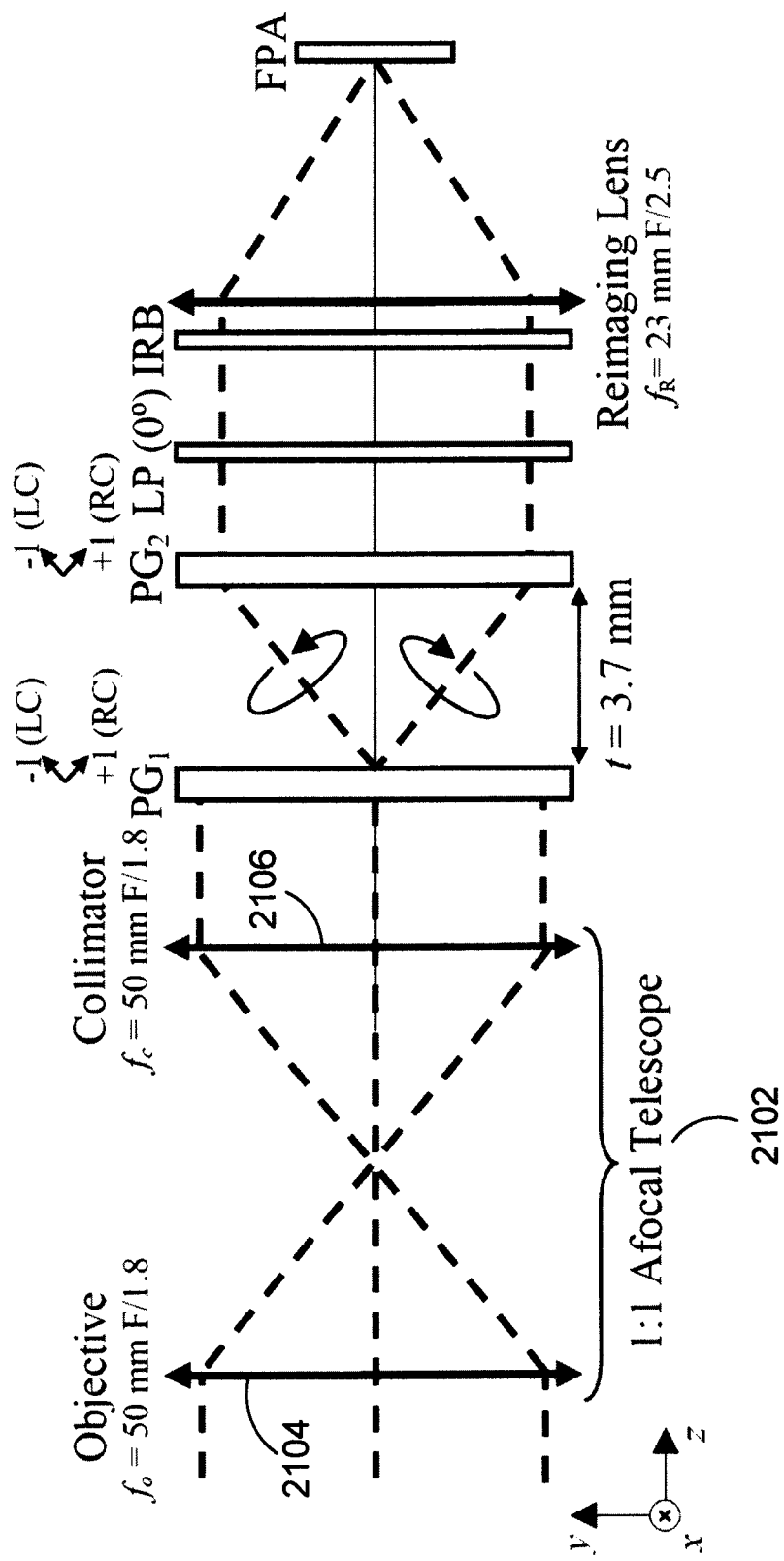
FIG. 21 is a schematic diagram of an experimental setup for viewing outdoor targets with a CLI polarimeter. An afocal telescope is included to allow the scene to be defocused while maintaining focus on the interference fringes.
Figure 22:
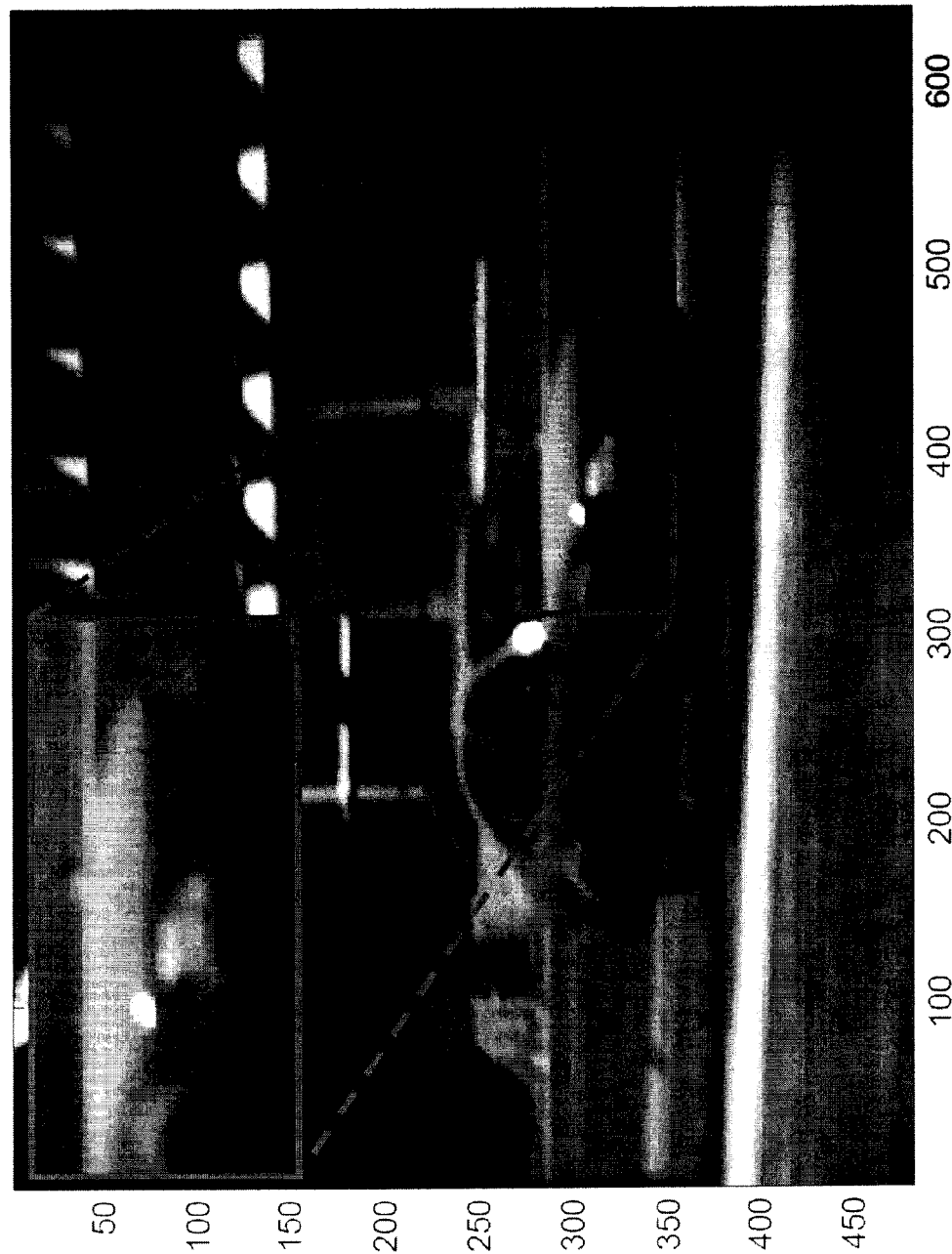
FIG. 22 is a raw image of a moving vehicle prior to extraction of Stokes parameters. Interference fringes are located in areas of the scene that are linearly polarized and are particularly evident in the vehicle hood.
Figure 23A:
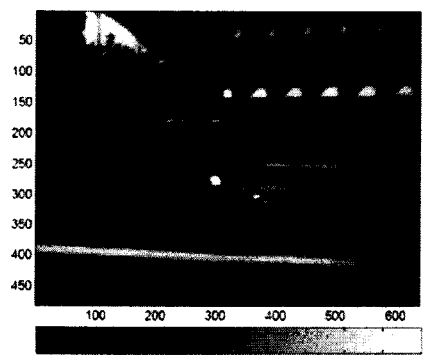
FIGS. 23A-23D are images obtained from the polarization data corresponding to the image of FIG. 22, wherein the images are based on $S_0$, degree of linear polarization (DOLP), $S_1/S_0$ and $S_2/S_0$, respectively.
Figure 23B:
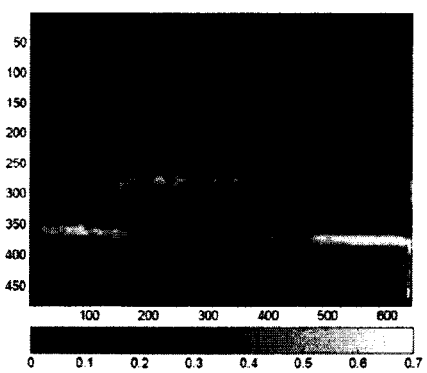
Figure 23C:
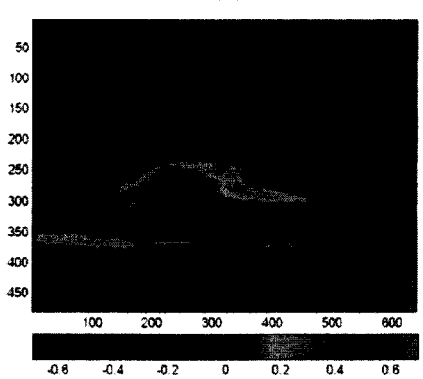
Figure 23D:
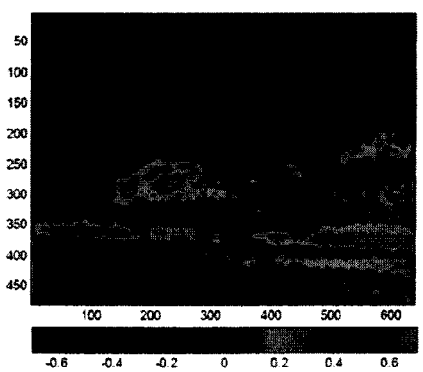

The optical configuration for these tests is depicted in FIG. 21. A 1:1 afocal telescope 2102 includes two 50 mm focal length lenses 2104, 2106 operating at a focal number of F/1.8. These optics enable defocus to be introduced into a scene image while simultaneously maintaining focus on the fringes that are localized at infinity. Defocus is used to band-limit the spatial frequency content of the scene, thereby reducing aliasing artifacts in the reconstructed Stokes parameters. A raw image of a moving vehicle, captured with the CLI polarimeter, is depicted in FIG. 22. The image was taken on a clear and sunny afternoon with an exposure time of approximately 1/1200 second with a re-imaging lens focal number of F/2.5. Reference data, taken of a linear polarizer oriented at 0° in front of a diffuser, was measured shortly after the vehicle was imaged. The diffuser was illuminated by sunlight.

The polarization data was extracted by taking a fast Fourier transformation of the raw data, followed by filtration, an inverse Fourier transformation, and calibration by application of Eqns. (26)-(28). The reconstructed data were also processed with an aliasing reduction filter that reduces noise due to aliasing artifacts. This produced the data depicted in FIG. 23A-23D corresponding to $S_0$, degree of linear polarization (DOLP), $S_1/S_0$, and $S_2/S_0$, respectively, wherein $$DOLP(x, y) = \frac{\sqrt{S_1^2(x, y) + S_2^2(x, y)}}{S_0(x, y)}.$$

The orientation of the linearly polarized light ($\theta_L$) can be extracted from the measured Stokes parameters using the formula $$\theta_L(x, y) = \frac{1}{2}\tan^{-1}\left(\frac{S_2(x, y)}{S_1(x, y)}\right). \quad (32)$$

By incorporating a color fusion method, this orientation information can be superimposed onto the DOLP and intensity ($S_0$) information. In color fusion, a hue (pixel color), saturation (amount of color within the pixel) and value (pixel brightness) color-mapping is used. This Hue-Saturation-Value (HSV) color map is mapped directly into linear polarization orientation (hue), DOLP (saturation), and intensity $S_0$ (value). Images generated with this scheme provide a qualitative assessment of polarimetric and intensity information. A color fusion image can be generated from the image data associated with FIGS. 23A-23D, along with orientation information calculated from Eq. (32) above.

EXAMPLE 19

Full Stokes Polarimetry

Figure 24A:
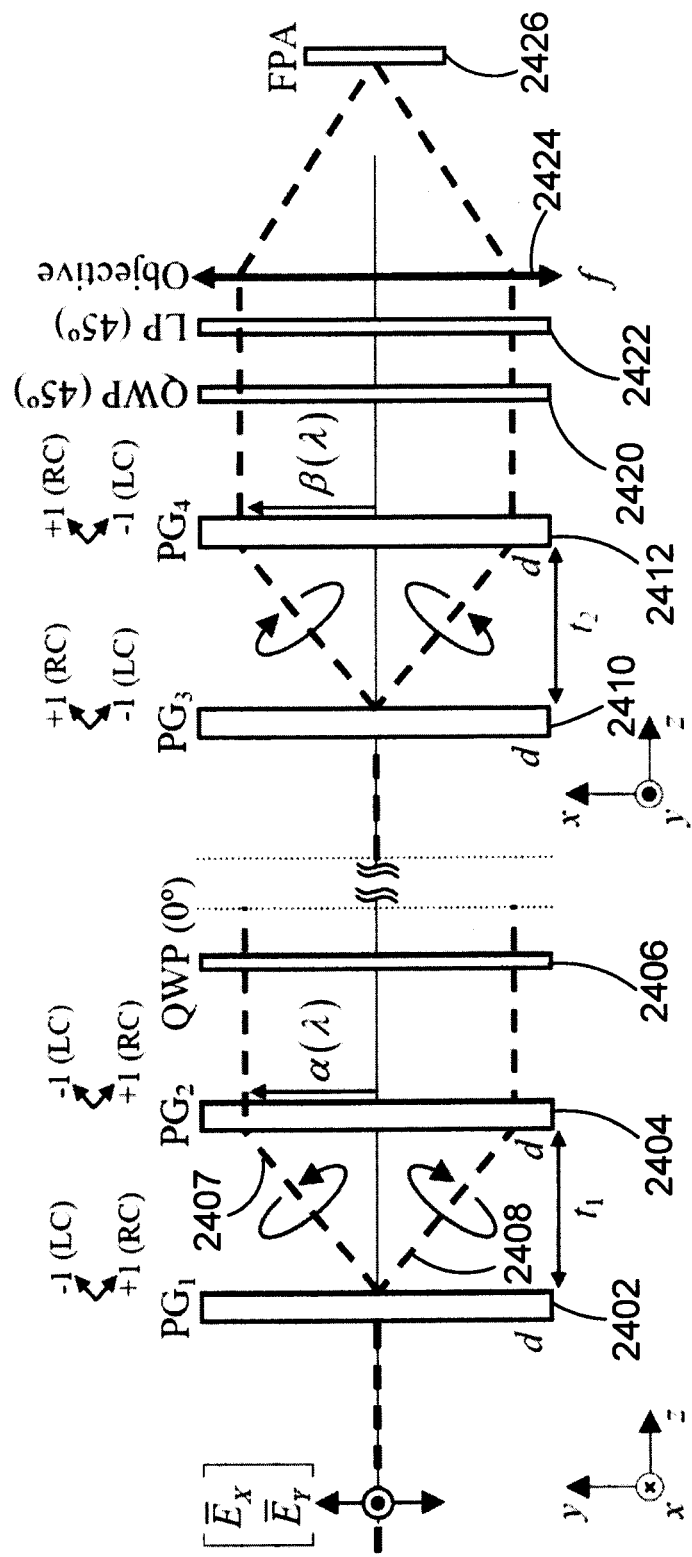
FIG. 24A is a schematic of a full imaging Stokes polarimeter that can provide images based on all four Stokes parameters. Polarization gratings $PG_1$ and $PG_2$ diffract in the yz plane, while polarization gratings $PG_3$ and $PG_4$ diffract in the xz plane.

A CLI polarimeter can be analyzed as a subset of a Savart-plate Stokes imaging polarimeter. By replacing each Savart plate with two PGs, a white-light Stokes imaging polarimeter capable of measuring $S_0$, $S_1$, $S_2$ and $S_3$ can be realized. An optical layout for this scheme is depicted schematically in FIG. 24A-24B. Light transmitted by $PG_1$ 2402 and $PG_2$ 2404 is sheared along a y axis by a distance a to produce two circularly polarized diffracted beams 2407, 2408 that are converted into linearly polarized light after propagation through a quarter wave plate (QWP) 2406. Transmission through $PG_3$ 2410 and $PG_4$ 2412 shears each of the beams 2407, 2408 along the x axis by a distance β. Propagation of the four circularly polarized beams through a QWP 2420, linear polarizer 2422, and objective lens 2424 generates white-light polarization interference fringes at an FPA 2426. Propagation of a single polarized ray is depicted in the perspective view in FIG. 24B.

For the purposes of the following derivation, the $PG_1$ to $PG_2$ separation ($t_1$) is equal to the $PG_3$ to $PG_4$ separation ($t_2$), such that $t_1=t_2=t$. Furthermore, all four PGs have an identical grating period Λ. The incident arbitrarily polarized electric field is defined as $$E_{inc} = \begin{bmatrix} \bar{E}_X \\ \bar{E}_Y \end{bmatrix} = \begin{bmatrix} E_X(\xi, \eta)e^{j\varphi_x(\xi,\eta)} \\ E_Y(\xi, \eta)e^{j\varphi_y(\xi,\eta)} \end{bmatrix}.$$

After transmission through $PG_1$ and $PG_2$, the x and y components of the electric field for $E_A$ and $E_B$ are identical to those of Example 13 above. Propagation through the QWP 2420, oriented with its fast-axis at 0°, yields $$E'_A = \begin{bmatrix} 1 & 0 \\ 0 & -j \end{bmatrix} E_A = \frac{1}{2}\begin{bmatrix} \bar{E}_X(\xi, \eta-\alpha) - j\bar{E}_Y(\xi, \eta-\alpha) \\ \bar{E}_X(\xi, \eta-\alpha) - j\bar{E}_Y(\xi, \eta-\alpha) \end{bmatrix},$$

$$E'_B = \begin{bmatrix} 1 & 0 \\ 0 & -j \end{bmatrix} E_B = \frac{1}{2}\begin{bmatrix} \bar{E}_X(\xi, \eta+\alpha) + j\bar{E}_Y(\xi, \eta+\alpha) \\ -\bar{E}_X(\xi, \eta+\alpha) - j\bar{E}_Y(\xi, \eta+\alpha) \end{bmatrix}.$$

Figure 24B:
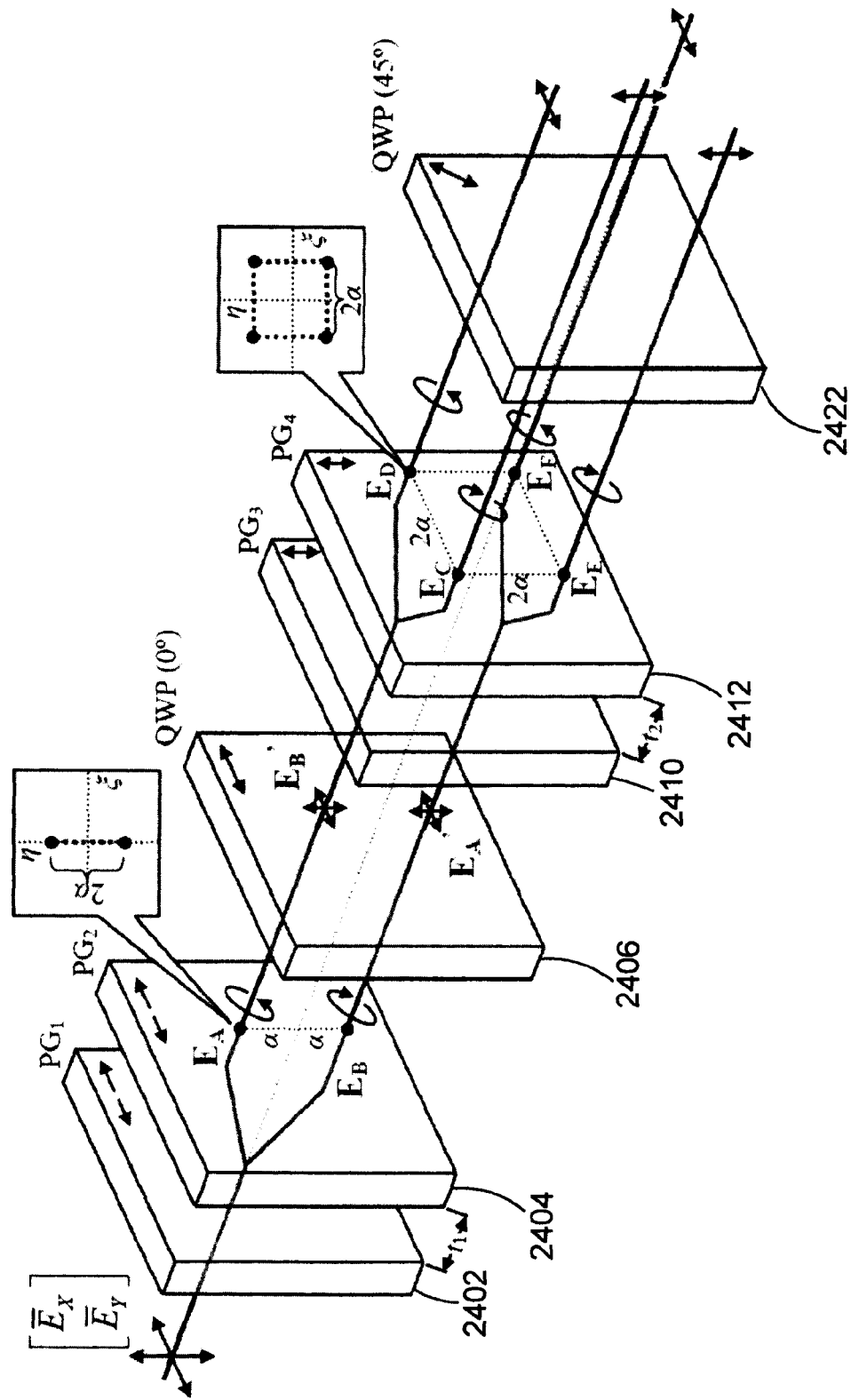
FIG. 24B is a perspective view of the polarimeter of FIG. 24A.

Propagation of $E_A'$ and $E_B'$ through $PG_3$ and $PG_4$ yields 4 beams, labeled $E_C$, $E_D$, $E_E$ and $E_E$ in FIG. 24B. These four transmitted fields are expressed by $$E_C(\xi+\alpha, \eta-\alpha) = J_{-1,LC}E'_A(\xi, \eta-\alpha) = \frac{1}{4}\begin{bmatrix} (\bar{E}_X - \bar{E}_Y) - j(\bar{E}_X + \bar{E}_Y) \\ (\bar{E}_X + \bar{E}_Y) + j(\bar{E}_X - \bar{E}_Y) \end{bmatrix},$$

$$E_D(\xi-\alpha, \eta-\alpha) = J_{+1,RC}E'_A(\xi, \eta-\alpha) = \frac{1}{4}\begin{bmatrix} (\bar{E}_X + \bar{E}_Y) + j(\bar{E}_X - \bar{E}_Y) \\ (\bar{E}_X - \bar{E}_Y) - j(\bar{E}_X + \bar{E}_Y) \end{bmatrix},$$

$$E_E(\xi+\alpha, \eta+\alpha) = J_{-1,LC}E'_B(\xi, \eta+\alpha) = \frac{1}{4}\begin{bmatrix} (\bar{E}_X - \bar{E}_Y) + j(\bar{E}_X + \bar{E}_Y) \\ -(\bar{E}_X + \bar{E}_Y) + j(\bar{E}_X - \bar{E}_Y) \end{bmatrix},$$

-continued $$E_F(\xi - \alpha, \eta + \alpha) = J_{+1,RC}E'_B(\xi, \eta + \alpha) = \frac{1}{4}\begin{bmatrix}(\bar{E}_X + \bar{E}_Y) - j(\bar{E}_X - \bar{E}_Y)\\-(\bar{E}_X - \bar{E}_Y) - j(\bar{E}_X + \bar{E}_Y)\end{bmatrix},$$

where $\bar{E}_X$ and $\bar{E}_Y$ are implicitly dependent on $\xi$, $\eta$, and $\alpha$. Transmission through the last QWP 2420, with its fast-axis oriented at 45°, rotates the circular polarization states of $E_C$, $E_D$, $E_E$ and $E_E$ into vertical and horizontal linear polarizations. Propagation of these beams through the analyzing linear polarizer 2422 unifies them into a 45° linear polarization state. The complete x and y components of the electric field incident on the lens 2424 are:

$$E_X^L = E_Y^L = \tfrac{1}{4}(\bar{E}_X(\xi+\alpha,\eta-\alpha) - j\bar{E}_Y(\xi+\alpha,\eta-\alpha)) + (\bar{E}_X(\xi-\alpha,\eta-\alpha) - j\bar{E}_Y(\xi-\alpha,\eta-\alpha)) + (j\bar{E}_X(\xi-\alpha,\eta+\alpha) - \bar{E}_Y(\xi-\alpha,\eta+\alpha)) + (-j\bar{E}_X(\xi-\alpha,\eta+\alpha) + \bar{E}_Y(\xi-\alpha,\eta+\alpha)).$$

The lens 2424 produces a Fourier transformation of the field. Performing this on the $E_X^L$ component yields $$E_L = F[E_X^L]_{\xi=\frac{x}{\lambda f},\eta=\frac{y}{\lambda f}} = \frac{1}{4}(\bar{E}_X - j\bar{E}_Y)e^{j\frac{2\pi}{\lambda f}\alpha(x-y)} + (-j\bar{E}_X + \bar{E}_Y)e^{-j\frac{2\pi}{\lambda f}\alpha(x-y)} + (\bar{E}_X - j\bar{E}_Y)e^{-j\frac{2\pi}{\lambda f}\alpha(x-y)},$$

wherein $\bar{E}_X$ and $\bar{E}_Y$ are implicitly dependent on x and y, f is the focal length of the objective lens 2424, and $\lambda$ is the wavelength of the incident illumination. The intensity is calculated by taking the absolute value squared of $E_L$. Simplifying the expression with the Stokes parameter definitions, combining terms into cosines and sines, and substituting the shear $\alpha$ from:

$$\alpha \cong \frac{m\lambda}{\Lambda}t,$$

produces the final intensity pattern on the FPA 2426:

$$I(x,y) = \frac{1}{2}S_0(x,y) + \frac{1}{2}S_3(x,y)\cos\left(2\pi\frac{2mt}{f\Lambda}x\right) + \frac{1}{4}S_2(x,y)\left[\cos\left(2\pi\frac{2mt}{f\Lambda}(x-y)\right) - \cos\left(2\pi\frac{2mt}{f\Lambda}(x+y)\right)\right] + \frac{1}{4}S_1(x,y)\left[\sin\left(2\pi\frac{2mt}{f\Lambda}(x-y)\right) + \sin\left(2\pi\frac{2mt}{f\Lambda}(x+y)\right)\right].$$

This configuration enables the measurement of all four Stokes parameters by isolating the various white-light spatial carrier frequencies $U_1$ and $U_2$, defined as $$U_1 = 2\frac{mt}{f\Lambda},$$

$$U_2 = 2\sqrt{2}\frac{mt}{f\Lambda}.$$

EXAMPLE 20

Optical Demodulation

Figure 25:
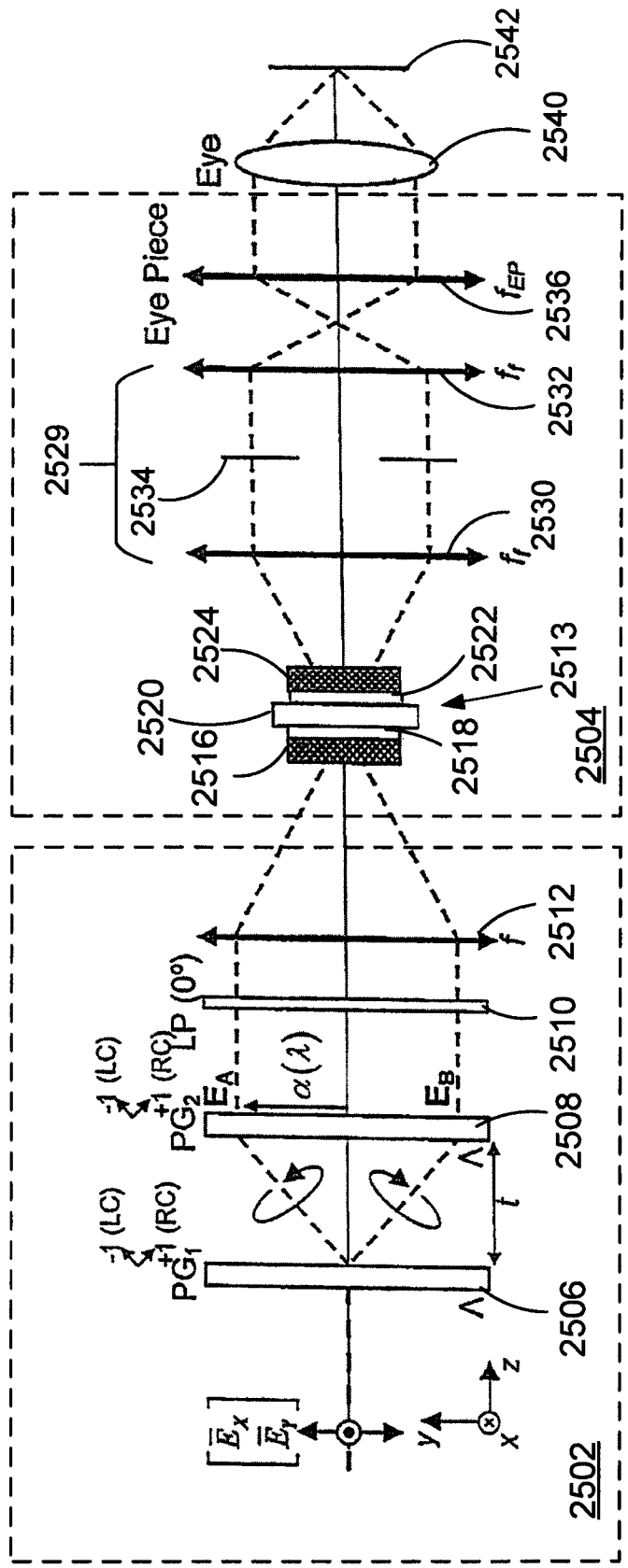
FIG. 25 illustrates a polarimeter that produces a directly viewable image based on intensity modulations associated with Stokes parameters.

FIG. 25 illustrates an imaging polarimeter that uses optical demodulation to permit direct viewing of optical intensities associated with one or more Stokes parameters. As shown in FIG. 25, a polarization modulation system 2502 receives an input optical flux associated with an image of an object or scene under investigation. The input optical flux is directed to a first polarization grating 2506 and a second polarization grating 2508 that are separated along a z-axis by a distance t. The polarization grating 2506 produces optical fluxes associated with a left circular SOP and a right circular SOP, and both are directed to the second polarization grating 2508 that directs these optical fluxes along a common axis (as shown in FIG. 25, the z-axis) and forms a polarization modulated optical flux having a modulation associated with beam shear introduced by the polarization gratings 2506, 2508. The polarization modulated optical flux is directed to a linear polarizer oriented to transmit an SOP parallel to a y-axis. A lens 2512 is situated to converge the optical flux to an optical demodulation system 2504.

In a representative example, a first phosphor layer 2516 is situated to receive the modulated optical flux and produce a corresponding emitted flux. Typically, the emitted flux is an unpolarized flux that is directed to a first linear polarizer 2518, a polarization grating 2520, a second linear polarizer 2522 and a second phosphor layer 2524. The linear polarizers 2518, 2522 are arranged so that beams produced by the polarization grating 2520 interfere at the second phosphor layer 2524. For convenience, the phosphor layers 2516, 2524, the linear polarizers 2518, 2522, and the polarization grating 2520 can be referred to as an optical demodulator 2513, but as discussed below, other arrangements of optical elements can serve as optical demodulators.

As noted above in the discussion of the system of FIG. 16, the optical intensity directed to the optical demodulator 2513 can be expressed as:

$$I(x,y) = \frac{1}{2}\left[S_0(x,y) + S_1(x,y)\cos\left(2\pi\frac{2mt}{f\Lambda}y\right) + S_2(x,y)\sin\left(2\pi\frac{2mt}{f\Lambda}y\right)\right],$$

Converting this intensity back into a complex amplitude at phosphor layer 2516 along with propagation through the polarization grating 2520 and time integration by the phosphor layer 2524 results in an intensity at the phosphor layer 2524 that is given by:

$$I_P(x,y) \propto b\left[S_0(x,y) + S_1(x,y)\cos\left(\frac{2\pi}{\lambda f}2\alpha y\right) + S_2(x,y)\sin\left(\frac{2\pi}{\lambda f}2\alpha y\right)\right]\cos\left(\frac{2\pi y}{\Lambda_3 f}\right),$$

wherein b is a proportionality constant relating to phosphor gain, f is a focal length of the lens 2512, and $\Lambda_3$ is the period of polarization grating 2520. The intensity pattern is a product of a trigonometric function (cos) having a period based on a grating period. This can be rewritten as follows:

$$I_P(x,y) \propto bS_0(x,y)\cos\left(\frac{2\pi}{\Lambda_3}y\right) + \frac{bS_1(x,y)}{2}\left[\cos\left[\left(\frac{2t}{f\Lambda} - \frac{1}{\Lambda_3}\right)y\right] + \cos\left[\left(\frac{2t}{f\Lambda} + \frac{1}{\Lambda_3}\right)y\right]\right] + \frac{bS_2(x,y)}{2}\left[\sin\left[\left(\frac{2t}{f\Lambda} - \frac{1}{\Lambda_3}\right)y\right] + \sin\left[\left(\frac{2t}{f\Lambda} + \frac{1}{\Lambda_3}\right)y\right]\right].$$

Stokes parameters $S_1$ and $S_2$ appear modulated as sum and difference frequencies based on the shear induced modulation and the modulation produced by the polarization grating 2520. The period $\Lambda_3$ of the polarization grating 2520 can be selected so that $$\frac{1}{\Lambda_3} = \frac{2t}{f\Lambda} = U,$$

and the intensity pattern is:

$$2b^{-1}I_p(x,y) \propto 2^{-1}S_0(x,y)\cos(2\pi Uy) + S_1(x,y)[1+\cos(4\pi Uy)] + S_2(x,y)[1+\sin(4\pi Uy)].$$

Stokes parameters are thus modulated at a spatial frequency U ($S_0$) and at twice a spatial frequency 2U ($S_1$ and $S_2$). In addition, Stokes parameters $S_1$ and $S_2$ are associated with baseband (unmodulated) terms.

A spatial filter 2529 comprising lenses 2530, 2532 and aperture 2534 are configured to block or substantially attenuate 2U and 4U spatial frequency components so that a baseband intensity is available having components corresponding to $S_1$ and $S_2$. If the intensity pattern input to the phosphor 2516 has modulations associated with any of the four Stokes parameters, appropriate selection of the grating period $\Lambda_3$ can produce demodulated intensity components associated with some or all of the Stokes parameters. In some cases, input spatial frequency modulations have x- and y-components, one or both of which can be independently demodulated. For example, two polarization gratings having different periods can be oriented to produce diffracted beams in x- and y-directions. Such gratings can be used for both modulation or demodulation.

An eyepiece 2536 is situated to receive the spatially filtered, demodulated Stokes parameter modulated intensity for direct viewing by a user so that an eye lens 2540 produces an image at a retina 2542. With the apparatus of FIG. 25, digital or other electronic Fourier transform based processing is not required to produce a suitable polarization dependent image. Spatial frequency terms of interest are demodulated and filtered optically.

Figure 26:
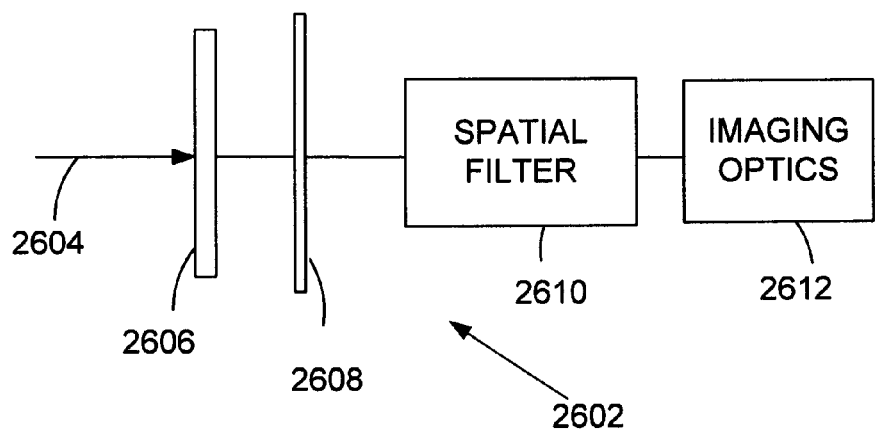
FIG. 26 illustrates a polarimeter that includes an optical demodulator.

Referring to FIG. 26, a polarization modulated optical beam 2604 is directed to an image convertor 2606 that produces an intensity image based of the beam 2604. Generally, the beam 2604 has modulations at one or more spatial frequencies associated with one or more Stokes parameters or other SOP-dependent image characteristics. A demodulation optical system 2608 is configured to receive the intensity image and apply a spatial frequency modulation to the intensity image. The demodulation is typically configured to demodulate one or more spatial frequency components of the beam 2604 so that corresponding baseband intensities are produced. Of course, if desired, higher frequency components can be produced as well, but such components are generally not as convenient for observation by a viewer. The demodulator 2608 then can apply a modulation at a spatial frequency corresponding to a spatial frequency modulation of the beam 2604 so that a baseband component is produced. In some examples, the demodulator 2608 applies modulations at a plurality of such spatial frequencies that can be along one or more axes. After application of one or more demodulation spatial frequencies by the optical demodulator 2608, any unwanted spatial frequencies are blocked or attenuated by a spatial filter 2610 and imaging optics 2612 produce a demodulated intensity image.

Figure 27:
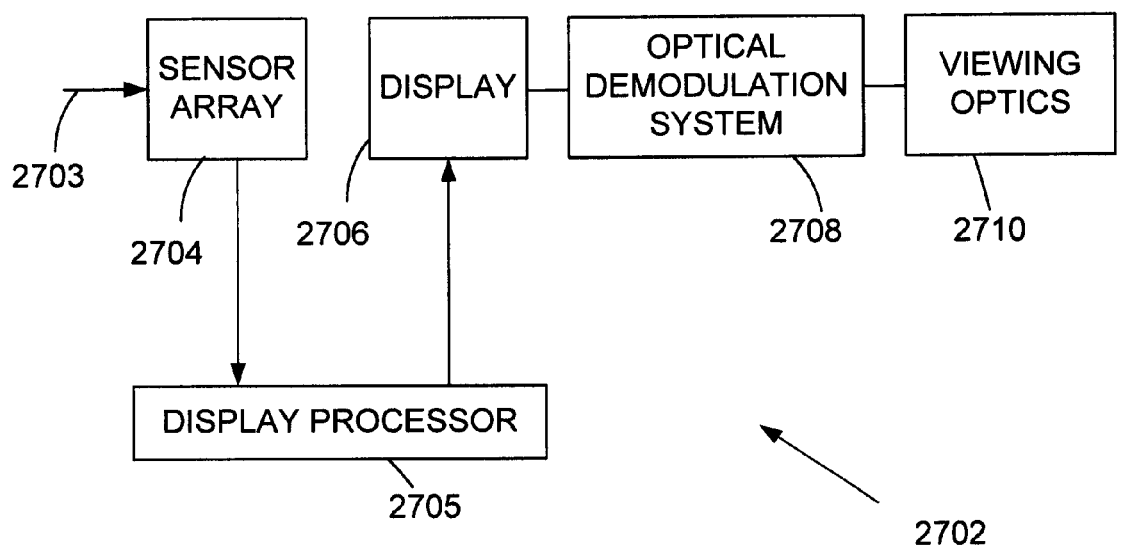
FIG. 27 illustrates a polarimeter that includes a sensor configured to receive a modulated polarization image and a display configured to produce an optical beam that is optically demodulated.

In a further example shown in FIG. 27, an optical demodulation system 2702 includes a sensor array 2704 situated to receive a polarization modulated optical beam 2703 and produce an electronic intensity image that can be stored in a memory or otherwise coupled to a display processor 2705. A display 2706 such a passive or emissive display is driven based on the intensity image to produce a corresponding converted image intensity. An optical demodulation system 2708 is situated to demodulate the converted image intensity which is then coupled to viewing optics 2710 for observation. If the display 2706 is a passive display such as a liquid crystal display, a light source is situated to direct a beam to the display 2706 to produce a suitable converted image intensity.

As noted above, image intensities can be modulated and demodulated along one or more axes. As shown in FIG. 28, a modulated beam 2802 is directed to a first phosphor 2803 and then to diffraction gratings 2804, 2805 that are configured to diffract along different (usually orthogonal) directions. For example, the gratings 2804, 2805 are configured to diffract along an x-axis and a y-axis, respectively. Amplitude gratings having approximately sinusoidal amplitude variations are generally preferred, but square wave or other amplitude gratings can be used. In addition, phase gratings can be used as well, as subsequent spatial filtering can produce associated amplitude and intensity variations. A second phosphor 2806 receives the diffracted beams and produces an intensity pattern with a polarization modulation associated with the beam and the additional modulations (or demodulations) applied by the gratings 2804, 2805. Additional polarizers are needed to project orthogonal SOPs so that interference is produced but these additional polarizers are not shown in FIG. 28.

Unwanted spatial frequency components are attenuated with a spatial filter 2808 that includes lenses 2810, 2816 and aperture plate 2812 that defines a transmissive aperture 2814. As shown in FIG. 28, the transmissive aperture 2814 tends to transmit baseband or low spatial frequency components, but can be arranged to block such low frequencies and transmit high frequencies if it is desirable to view periodic polarization modulations. The spatially filtered intensity is then input to a projection optical system 2818 that forms a polarization dependent image of an object on a screen 2820.

FIG. 30 illustrates a representative aperture plate 3002 that defines an aperture 3004 having differing dimensions along x- and y-directions. In some examples, a single circular aperture is suitable.

In some cases, an optically demodulated image is converted to an electronic image for display. For example, as shown in FIG. 29, a polarization modulated input beam 2902 is coupled to an optical demodulator comprising a phosphors 2904, 2906 and a diffraction grating 2905. A spatial filter assembly 2908 is situated to direct a spatially filtered polarization modulated image beam to an image sensor 2918 that produces a corresponding electrical image as a digital or analog electrical signal, or an image representation stored in a memory such as RAM or ROM. A display processor 2916 receives the electronic image and couples the electronic image to a display 2920 for presentation to a user.

Modulations imposed with polarization gratings can be demodulated as described, but other spatial frequency modulations obtained interferometrically (such as with Sagnac interferometers) or Savart plates or other birefringent plates can be similarly demodulated. In addition, Sagnac interferometers. Savart plates, or other modulation systems can also be arranged to receive a modulated optical intensity and then produce a demodulated optical intensity.

In some examples, not all Stokes parameters can be evaluated based on a single image, but Stokes parameters of interest can be selected or more complex configurations that provide all Stokes parameters as described above can be used. In some examples, viewed intensity patterns can be associated with a different wavelength range than the beam received from an object and whose SOP is evaluated by modulation. For example, an infrared image can be suitably polarization modulated and then optical demodulated using visible wavelengths using phosphor or other image convertors, or based on processing a visible image obtained from display based on a detected infrared image. Polarization and Stokes parameters in ultraviolet, infrared, far infra-red, or other wave length ranges can be demodulated into visible images.

Figure 31:
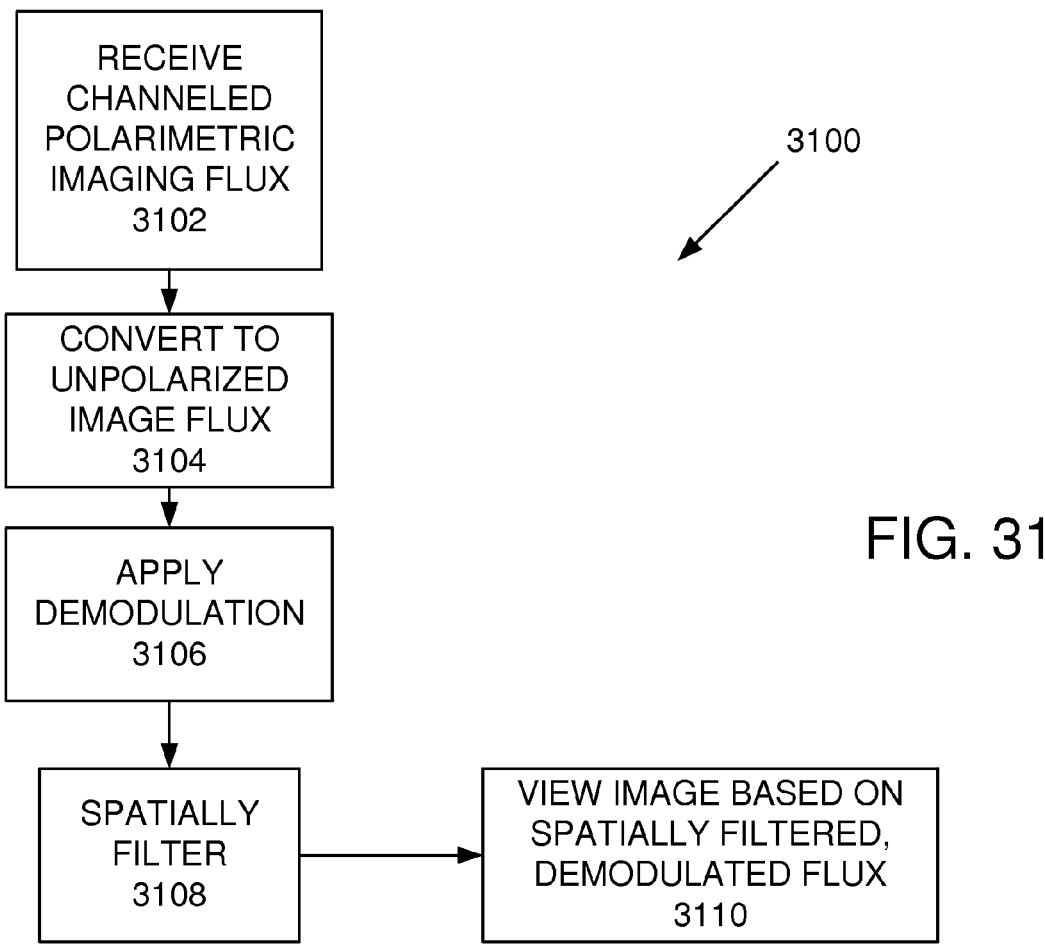
FIG. 31 illustrates a representative method of producing a viewable image based on optical demodulation of a channeled polarization based image.

Referring to FIG. 31, a method 3100 includes receiving a channeled polarimetric imaging flux at 3102. At 3104, a corresponding unpolarized image flux is produced. A demodulation is applied at 3106, typically at one or more spatial frequencies corresponding to spatial frequencies in the received imaging flux. At 3108, the unpolarized, demodulated imaging flux is spatially filtered, typically to pass only baseband portions, and at 3110, the spatially filtered flux is coupled to provide a viewable image.

The above methods and systems can be implemented in a variety of optical instruments such as telescopes, riflescopes, and still or video cameras. A video camera can provide a viewable image of a time varying object polarization based on time varying Stokes parameters or other polarization parameters.

ADDITIONAL EXAMPLES

Additional illustrative examples are set forth below, generally based on various configurations of birefringent prisms. In this examples, spatial frequencies can be modulated and demodulated as described above.

Example 21

With reference to FIGS. 32A-32B, an interferometer 3200 includes a linear polarizer 3202 situated along a z-axis of a xyz-coordinate system 3204. The linear polarizer has an axis of polarization 3206 oriented at an angle of 45 degrees with respect to an x-axis and a y-axis of the coordinate system 3204. A birefringent prism pair 3210 includes a first prism 3212 and a second prism 3214 having wedge angles β. As shown in FIGS. 32A and 32B, the first prism 3212 has an optic axis 3216 that is parallel to the y-axis and the second prism 3214 has an optic axis 3218 that is parallel to the x-axis. In typical examples, the prism pair 3210 is a Wollaston prism made of calcite, quartz, or other suitable materials. While Wollaston prisms typically are formed of two right angle prisms (β=45 degrees), as used herein, the prism wedge angle β can have other values, and is typically between 1 and 40 degrees, 2 and 20 degrees or 5 and 15 degrees. A linear analyzer 3220 is situated along the z-axis and is oriented an angle of 45 degrees with respect to the x-axis and the y-axis.

FIG. 32B also includes a schematic representation 3240 of an optical path difference (OPD) produced by directing an optical beam through the interferometer 3200. As shown in FIG. 32B, a y-polarization component is relatively delayed with respect to an x-polarization component by the prism 3212 and the y-polarization component is relatively delayed with respect to the x-polarization component by the prism 3214. The x- and y-polarization components are projected by the linear polarizer 3220 onto a common axis so that the projected components can interfere.

Other birefringent prisms and prism pairs can be used to produce an optical path difference (OPD). For example, as shown in FIG. 32C, one or more Rochon prisms 3280 can be used. The Rochon prism 3280 includes a prism 3282 of an isotropic material such as glass, and a birefringent prism 3284 of a material such as calcite, crystal quartz, or other crystalline materials.

Example 22

Figure 33A:
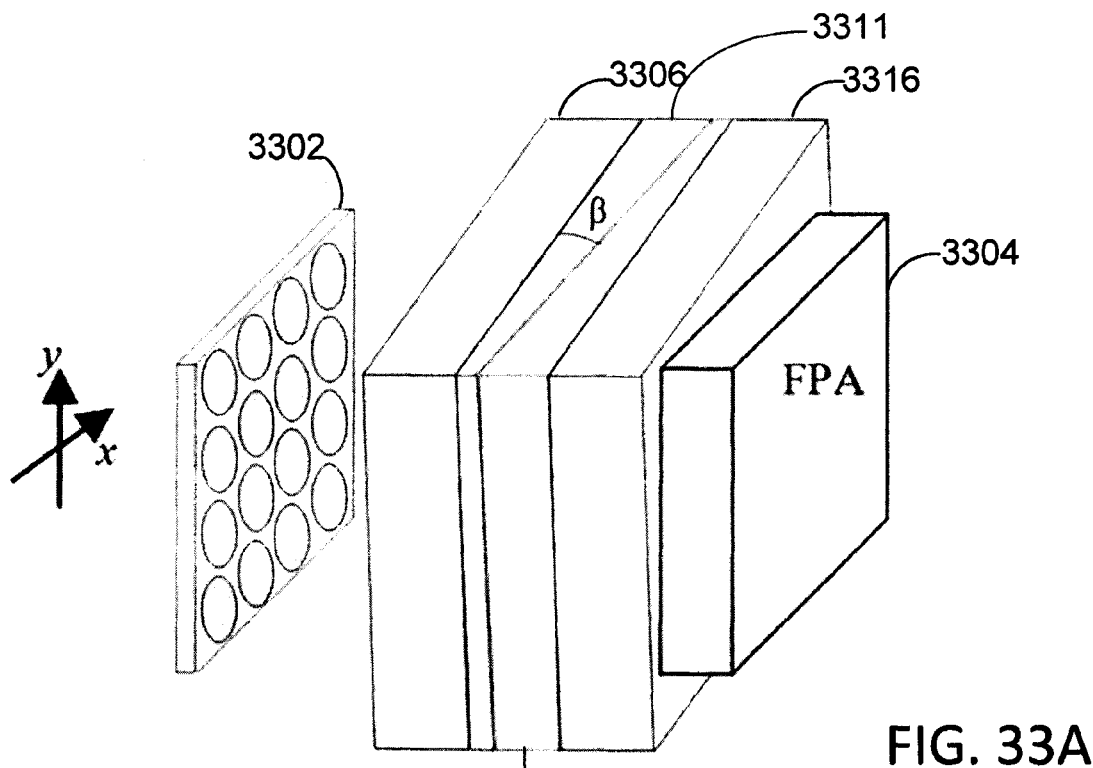
FIGS. 33A-33B illustrate a birefringence based snapshot imaging Fourier transform spectrometer that includes a birefringent prism pair and a lens array.
Figure 33B:
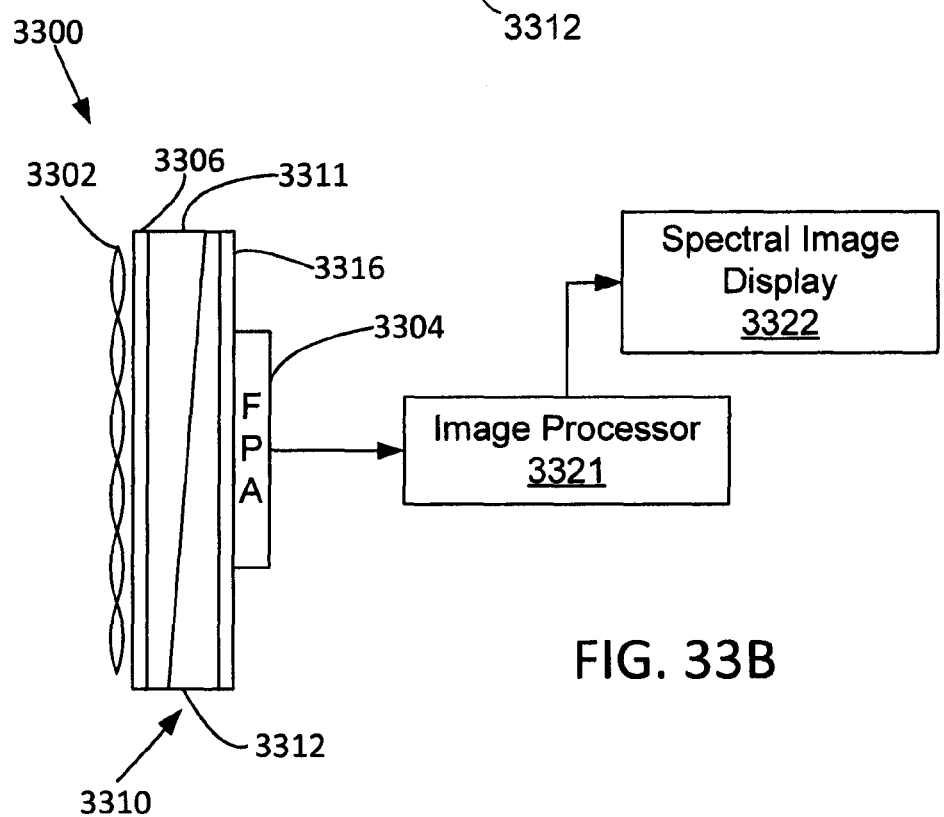

With reference to FIGS. 33A-33B, an imaging spectral interferometer 3300 includes a lenslet array 3302 that includes N by M lenses arranged in a rectangular array. The lenses of the array 3302 form corresponding images of an object and direct the images to a focal plane array 3304. The images are directed through a first polarizer 3306, a birefringent prism pair 3310, and a second polarizer 3316. The first polarizer 3306 and the second polarizer 3316 are linear polarizers having transmission axes that are tilted with respect to an x-axis toward a positive y-axis by an angle of 45+δ degrees. In this example, the sub-images formed by the lenslet array 3302 include a polarization based OPD that is a function of the x-coordinate due the varying thickness of wedge prisms 3311, 3312 and that can produce interference.

An image processor 3321 is coupled to the FPA 3304 to receive electrical signals associated with optical interference associated with the OPD produced by the prism pair 3310. The electrical image signals associated with one or all of the lenslets of the array 3302 can be recorded, and combined with other recorded signals. Typically, the recorded signals are processed to obtain an image so as to form an interference map as a function of OPD and then Fourier transformed at 3321. A resulting spectral image is presented for visual inspection on a display 3322, or stored or transmitted for further analysis. In this example, OPD is a function of x-coordinate, but additional prism pairs can be used to provide OPD variation along both x- and y-axes.

Example 23

Figure 34:
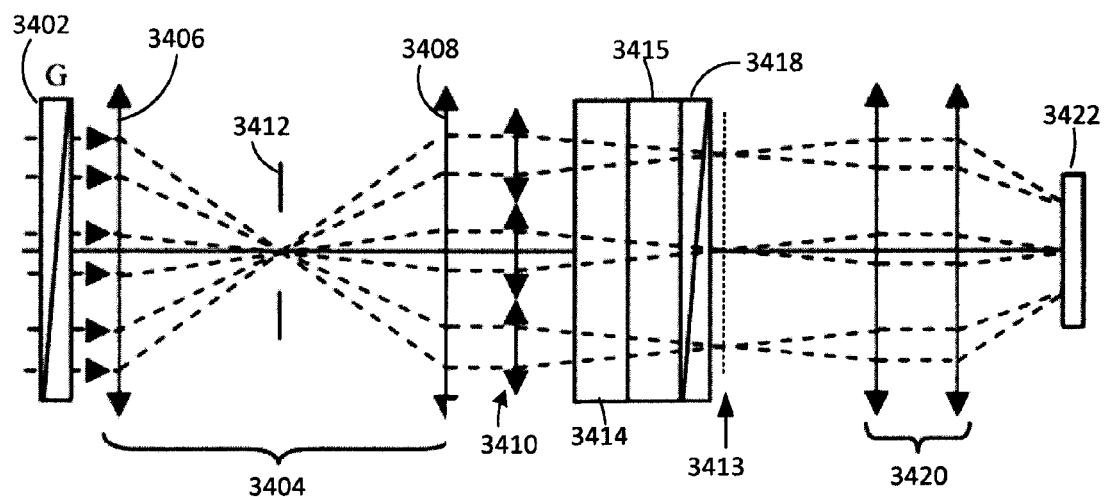
FIG. 34 illustrates a birefringence based snapshot imaging Fourier transform spectrometer that includes an afocal telescope and relay optics to image an intermediate image plane at a focal plane array.

With reference to FIG. 34, a representative snapshot imaging Fourier transform imager 3400 includes a linear polarizer 3402 situated to receive an optical flux from an object. A 1:1 afocal telescope 3404 that includes an input lens 3406 and an output lens 3408 is situated to receive the optical flux from the polarizer 3402 and deliver the optical flux to a lens array 3410, such as a 10 by 10 array of lenses. A field stop 3412 is situated at a focus of the input lens 3406. Lenslets of the lens array 3410 form respective images of the object and deliver the images to an intermediate image plane 3413 through birefringent prism pairs 3414, 3415 and a linear polarization analyzer 3418 that is re-imaged by relay optics 3420 to a focal plane array 3422. The prism pairs 3414, 3415 are situated to produce variable OPDs along orthogonal axes that are also orthogonal to a spectrometer axis 3424.

In the example of FIG. 34, the afocal telescope 3404 and the field stop 3412 permit the images formed by the lenslets of the lens array 3410 to be separated at the focal plane array 3422. The relay optics 3420 permit the image plane 3413 of the lens array 3410 to be re-imaged as needed. For a more compact instrument, the image plane 3413 can be at the focal plane array 3420, without relay optics. For convenient illustration, processing of the images detected by the focal plane array is not described in detail, but is based on Fourier transforms and the variable OPD provided by the prism pairs 3414, 3415.

Example 24

Figure 35:
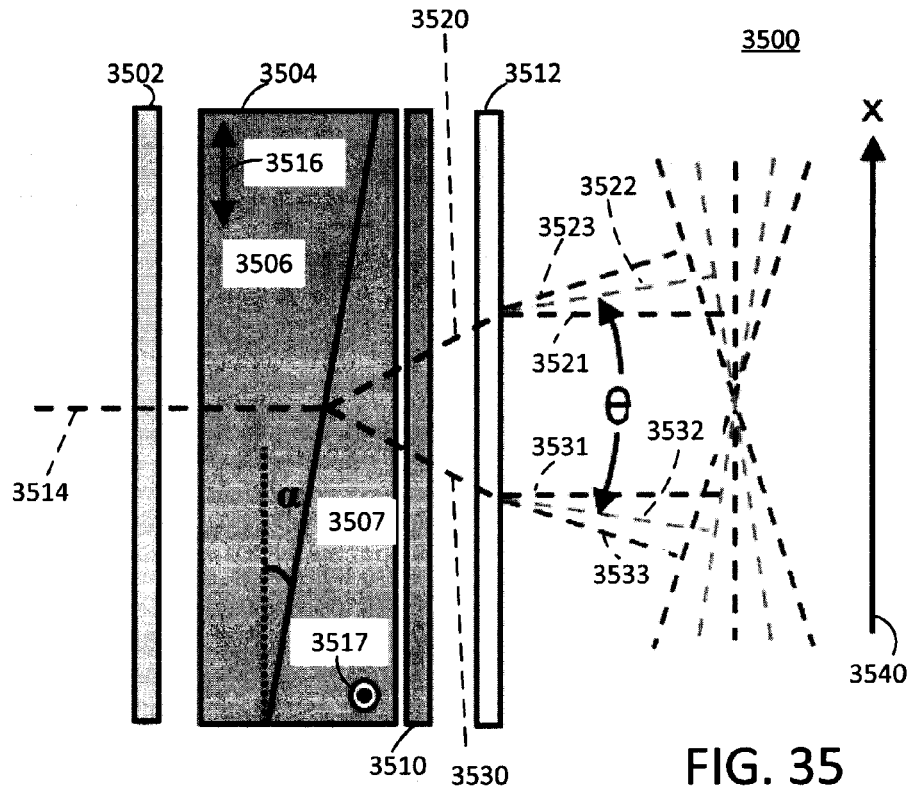
FIG. 35 is a schematic diagram of a representative Wollaston prism (WP) interference Fourier transform spectrometer (WIFTS) that includes a Wollaston prism.

With reference to FIG. 35, a polarizer/prism assembly 3500 for a birefringence based snapshot interferometer includes a linear analyzer 3502, a birefringent prism pair 3504 having prisms 3506, 3507, a quarter wave retarder (QWP) 3510 and a polarizing grating 3512 situated along an axis 3514. Other elements such as a lens array and a focal plane array or other image detectors are not shown. The prisms 3506, 3507 have optic axes 3516, 3517, respectively, that are mutually orthogonal and orthogonal to the axis 3514. The polarizing grating 3512 includes a liquid crystal arranged to diffract incident light into right and left circular polarization components. The QWP 3510 is situated to produce circular states of polarization (SOPs) from the linear components produced by the birefringent prism pair 3504. This enables the SOP exiting the birefringent prism pair 3504 to interact with the eigenmodes of the polarization grating 3512. Such polarizing gratings are described in, for example, Escuti et al., U.S. Patent Application Publication 20080278675, filed Nov. 13, 2008, which is incorporated herein by reference.

The assembly 3500 results in an effective heterodyne shift in a Fourier transform of the interference intensity patterns. As shown in FIG. 35, F, d, and C wavelengths (486.1 nm, 587.5 nm, and 656.2 nm, respectively) are directed by the polarizing grating 3512 along respective propagation directions 3521, 3522, 3523 for a polarization component refracted along an axis 3520, and F, d, and C wavelengths are directed by the polarizing grating 3512 along respective propagation directions 3531, 3532, 3533 for a polarization component refracted along an axis 3530. The resulting OPD can be expressed as:

$$OPD = x\theta = x\left[2B\tan(\alpha) - \frac{2\lambda}{\Lambda}\right],$$

wherein $\alpha$ is a prism wedge angle, x is an x-coordinate along an x-axis 3540, $\Lambda$ is a polarizing grating period, B is birefringence, and $\lambda$ is optical radiation wavelength. Optical intensity based on this OPD is given by:

$$I \propto \cos\left(\frac{2\pi OPD}{\lambda}\right) = \cos\left(\frac{4\pi x B \tan(\alpha)}{\lambda} - \frac{4\pi x}{\Lambda}\right).$$

It is apparent from this expression that frequency components proportional to wavenumber ($1/\lambda$), are offset by a frequency (wavenumber) that is proportional to $1/\Lambda$.

Example 25

Figure 36B:
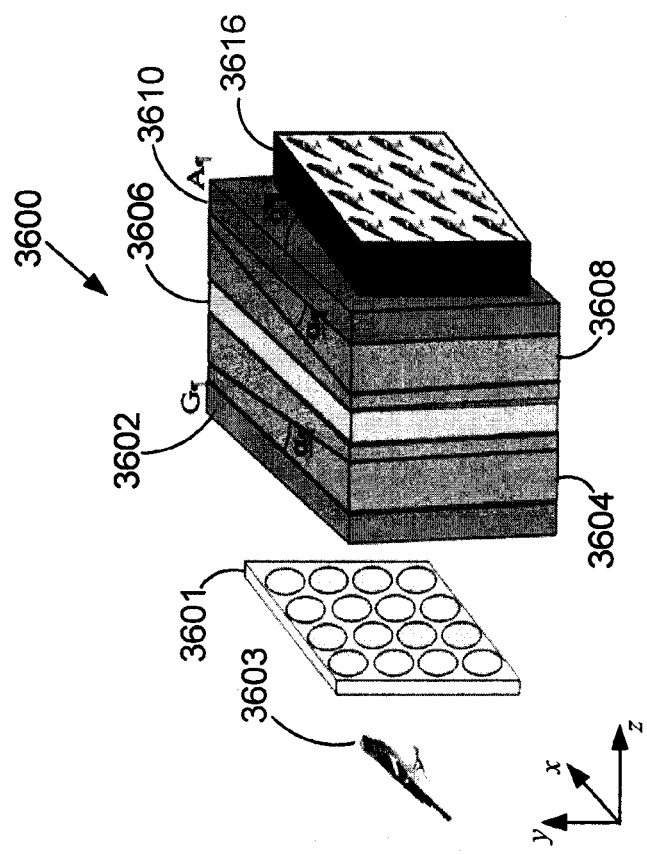
FIGS. 36A-36B illustrate a birefringent prism interferometer (BPI) based on Nomarski prisms (NP). In the example of FIGS. 36A-36B, a fringe localization (FL) plane is compensated and coincident with a focal plane array (FPA).
Figure 36A:
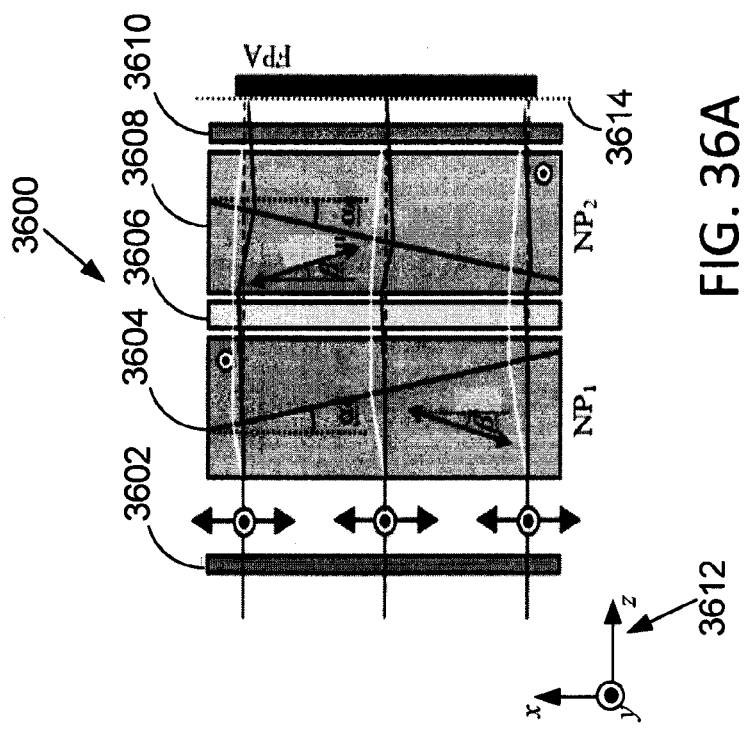

FIGS. 36A-36B illustrate a representative Snapshot Hyperspectral Imaging Fourier Transform (SHIFT) spectrometer 3600 that includes Nomarski prisms. As shown in FIGS. 36A-36B, the SHIFT spectrometer 3600 includes an N by M lens array 3601 that is situated to direct an imaging light flux from an object 3603 to a linear polarizer 3602 that is configured to provide a polarized light flux to a first Nomarski prism 3604, a half wave retarder 3606, a second Nomarksi prism 3608, and a linear polarization analyzer 3610 as situated along a z-axis of a coordinate system 3612. Each of the Nomarski prisms 3604, 3608 comprises two orthogonally oriented birefringent crystal prisms. One of the fast axes in each Nomarski prism is tilted with respect to a y-axis by an angle $\beta$ so as to define a real fringe localization (FL) plane 3614 that is exterior to the second Nomarksi prism 3608. The half wave retarder 3606 is situated between the Nomarski prism 3604, 3608 and oriented at 45° so as to effectively provide a 90° rotation of the polarization eigenmodes of the Nomarski prism 3608. In this way, the polarization eigenmodes of the Nomarski prism 3604, 3608 are effectively orthogonal, and the FL plane 3614 is compensated so as to be parallel to the xy plane and can be made coincident with a detection plane of a focal plane array (FPA) 3616. The polarizers 3602, 3610, the prisms 3604, 3608, and the retarder 3606 form a birefringent prism interferometer (BPI) that can produce interference fringes.

In operation, an input light flux from an object or scene of interest is polarized by the polarizer 3602 and interference fringes are generated along the FL 3614 plane by the linear polarization analyzer 3610, both of which are oriented at 45° with respect to the Nomarski prism eigenmodes. As a result, a compact structure can be provided that produces a linearly varying OPD between the two orthogonal polarization states as a function of x-coordinate. Using a prism apex (or wedge) angle $\alpha$, the OPD of a single Nomarski prism can be expressed as, for small angles $\alpha$:

OPD=$2Bx \tan(\alpha)$, wherein B is the birefringence of the crystal, defined as a difference between extraordinary ($\eta_e$) and ordinary ($n_o$) indices of refraction, i.e., B=($n_e$-$n_o$) and $\alpha$ is the wedge angle. Placing the BPI directly onto an FPA thus creates an OPD as a function of FPA pixel position. A rotation of this OPD is obtained by rotating the prisms, waveplate, and polarizers by a small angle $\delta$ with respect to the FPA, as illustrated in FIG. 36B. The lenslet array 3601 produces sub-images of the object 3603 that are imaged through the BPI and onto the FPA 3616.

Figure 37A:
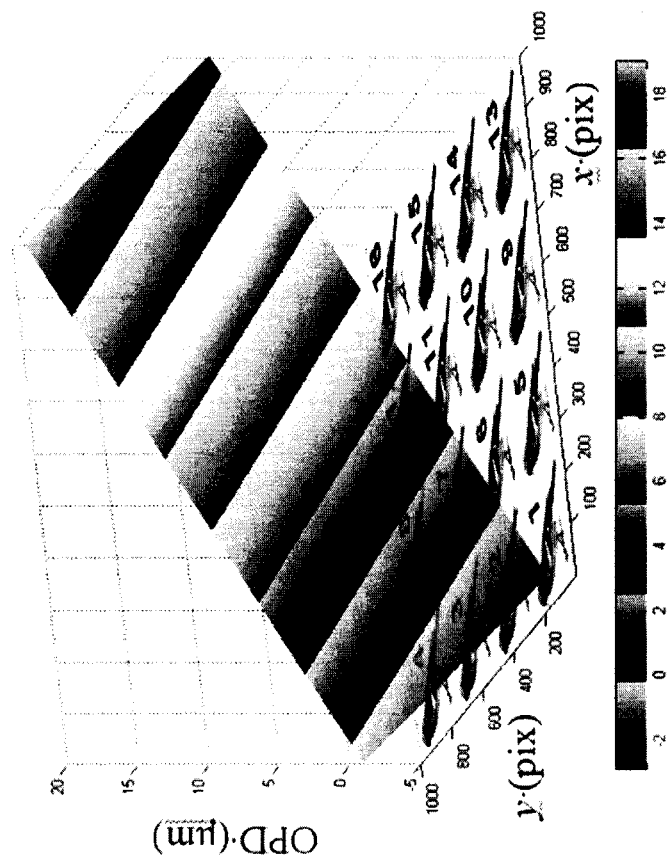
FIG. 37A is a graph of OPD (µm) as a function of sub-image location in pixels (pix) on a focal plane array.

N×M sub-images are formed coincident with both the FPA 3616 and the FL plane 3614, wherein N, M are numbers of lenslets along y and x, respectively. An example of OPD versus spatial position, relative to each sub-image, is depicted in FIG. 37A. Notable is the large slope in OPD along x, produced predominantly by the wedge angle $\alpha$, and the relatively small slope along y, which is produced by a small rotation $\delta$. The angle $\delta$ can be calculated by $$\delta=\tan^{-1}(1/M). \tag{33}$$

Figure 37B:
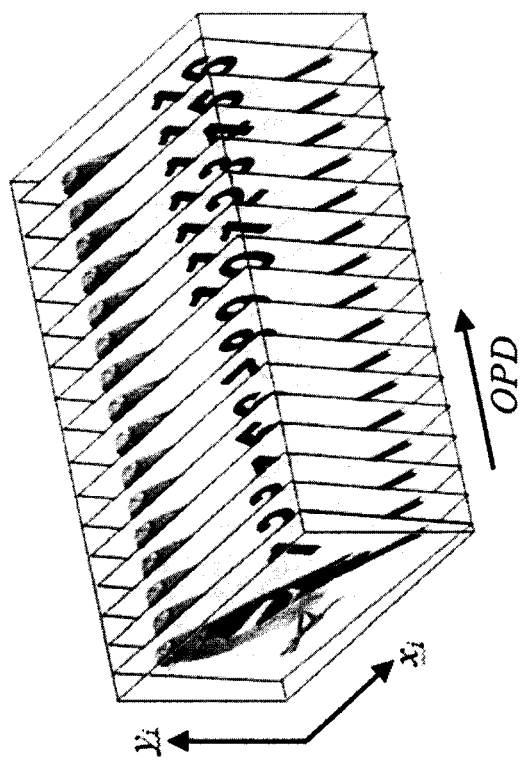
FIG. 37B illustrates construction of a 3D data cube with dimensions ($x_i$, $y_i$, OPD) from sampled sub-images.

This small rotation enables each sub-image to be based on sequentially larger values of OPD. To emphasize this, the sub-images in FIG. 37A are numbered 1-16, with images 1 and 16 representing the most negative and positive OPD samples, respectively. Consequently, each sub-image corresponds to a different "slice" of a 3D interferogram cube, as depicted in FIG. 37B which has dimensions ($x_i$, $y_i$, OPD), wherein $x_i$ and $y_i$ are spatial coordinates within sub-images. Thus, an interferogram and its corresponding spectrum can be calculated at each spatial location within the scene. Performing the post-processing calculations produces the datacube ($x_i$, $y_i$, $\lambda$).

Example 26

Figure 38:
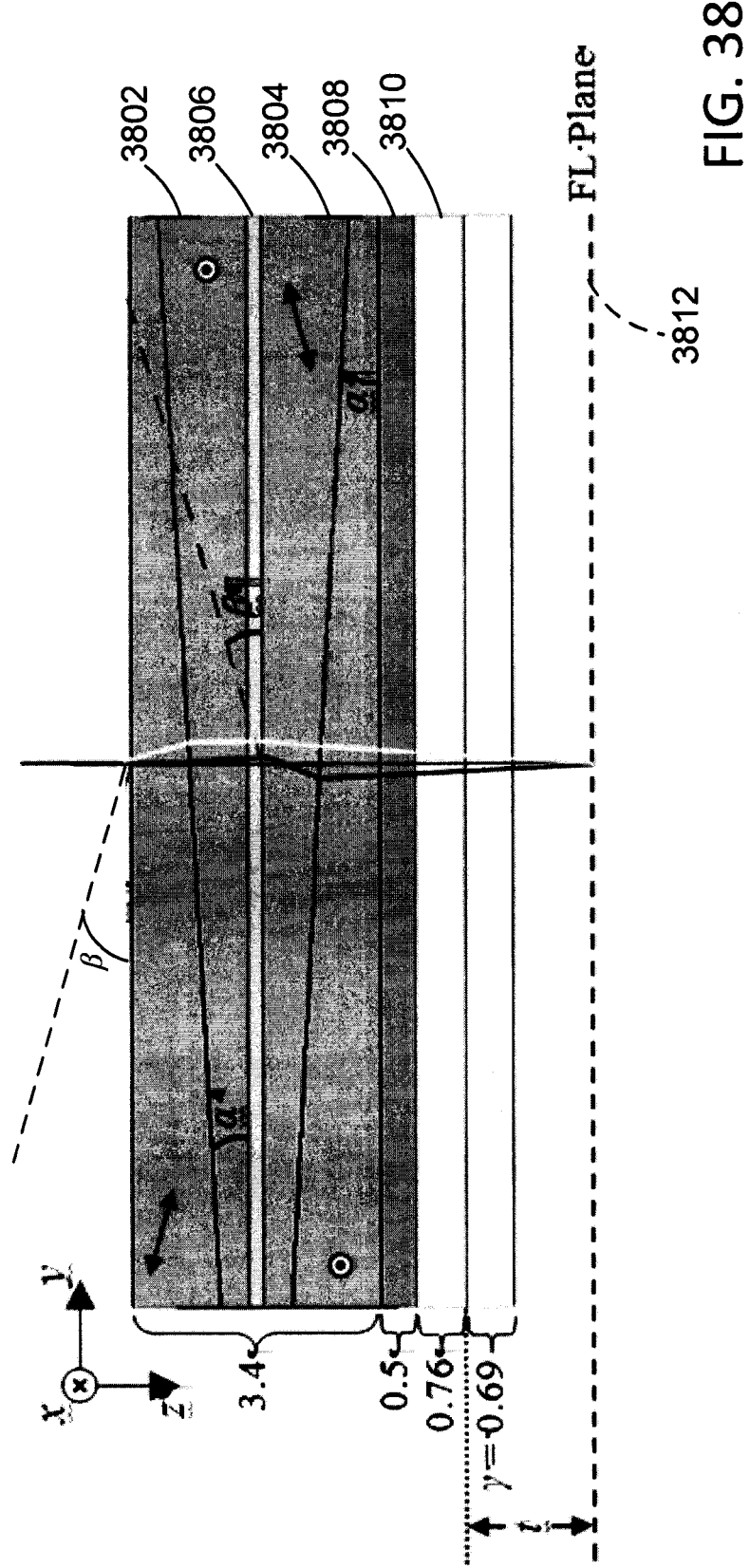
FIG. 38 is a sectional view of a representative birefringent interferometer. Dimensions are in mm, $\alpha=3.15°$, and $\beta=16.2°$.

For spatially and spectrally incoherent illumination, the FL plane of a Nomarski prism is located where the extraordinary (e) and ordinary (o) rays intersect. A representative interferometer configuration is depicted in FIG. 38, without a lenslet array. Quartz Nomarski prisms 3802, 3804, a half wave retarder 3806, a linear analyzer 3808, and a focal plane array cover glass 3810 are arranged in a stack. For the example of FIG. 38, the cover glass is assumed to be BK-38 glass and a rear vertex distance to an FPA is γ=0.69 mm based on typical values. Relocalizing a FL plane 3812 can be achieved by tilting the fast axes of one prism, within both NPs, by an angle β with respect to the y axis. A wedge angle α can be selected to produce an intended OPD as discussed above.

Example 27

Figure 39:
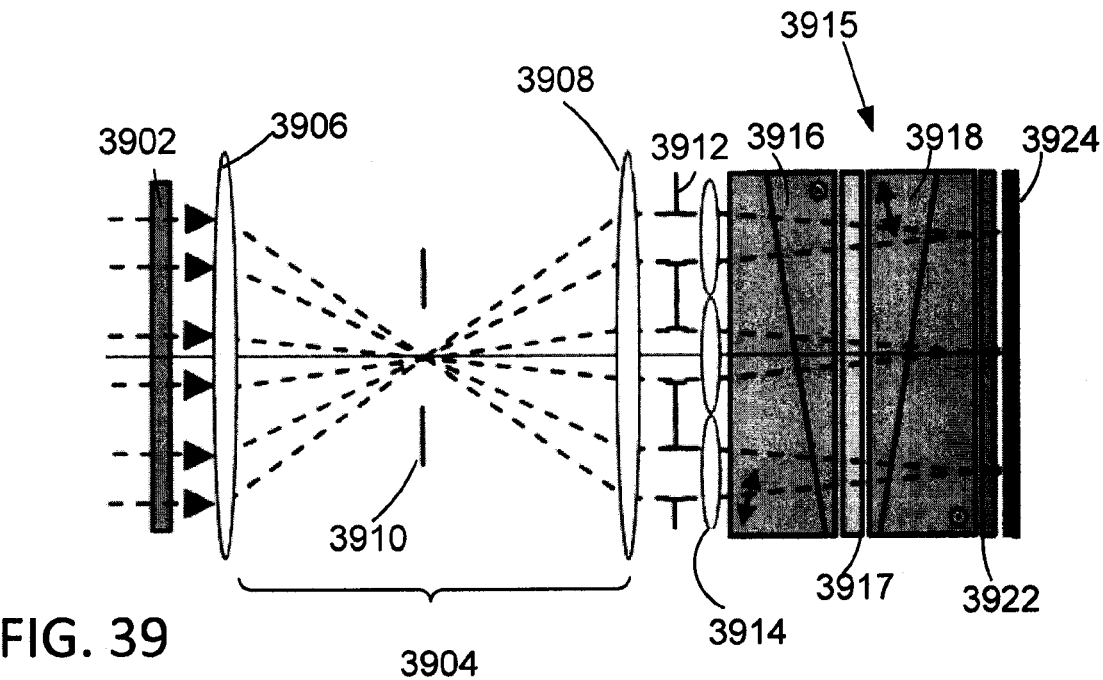
FIG. 39 is a schematic diagram of a representative implementation of a SHIFT sensor.

With reference to FIG. 39, a representative SHIFT sensor 3900 includes an input polarizer (or polarization generator) 3902 that directs a polarized optical flux to a relay optical system 3904 that includes an objective lens 3906 and a collimating lens 3908. The lenses 3904, 3906 have focal lengths of 50 mm focal length and focal ratios of 1.8. The generating polarizer is a wire-grid polarizer in this example, but other types can be used. A field stop/diffuser 3910 is situated a common focus of the lenses 3906, 3908. The diffuser can be a 1500 grit ground glass diffuser and serves to artificially flatten the scene, to reduce object-dependent image registration errors due to parallax. A 10 by 10 aperture array 3912 and a 10 by 10 fused silica lens array 3914 are situated to receive the optical flux from the relay optical system 3904 and produce sub-images that are transmitted through a BPI 3915 that includes quartz Nomarski prisms 3916, 3918 having angles α=3.15 degrees and β=16.2 degrees, and rotated by an angle δ=6.3 degrees. The lenslets of the array 3914 are symmetric plano-convex lenses with radii of curvature of 2.4 mm, but are shown as biconvex lenses for clarity. A polymer achromatic half wave plate (HWP) 3917 is situated between the prisms 3916, 3918 and has a retardance variation of ±0.008 waves over 420-680 nm. An analyzer 3922 is situated at an output of the BPI 3915, and sub-images produced by the lens array 3914 are formed on a focal plane array (FPA) 3924.

Example 28

Figure 40:
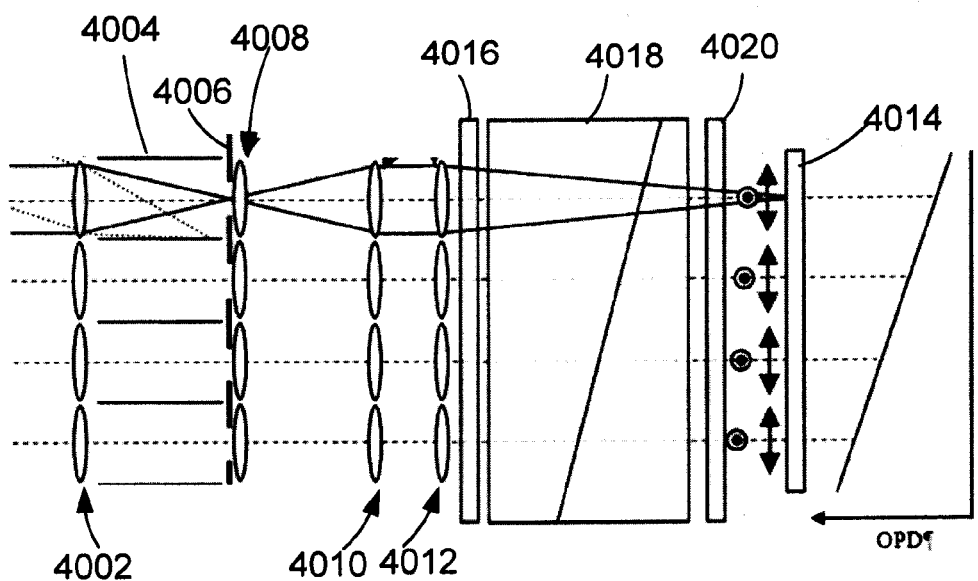
FIG. 40 is a schematic diagram of an additional example of a FPA-mounted SHIFT sensor based on a Wollaston prism using three extra lenslet arrays, a field-stop array, and a baffle array.

It is generally convenient to limiting the field of view of each lenslet in a lens array so that adjacent sub-images do not overlap or multiplex. An afocal telescope and a baffle stop array can be provided to control field of view. A representative example is illustrated in FIG. 40. An objective lens array 4002 delivers optical flux from a scene of interest through a baffle array 4004 to a field stop array 4006 and a field lens array 4008. A collimator array 4010 and a re-imaging array 4012 direct images to a focal plane array 4014 through a generating polarizer 4016, a Wollaston prism 4018, and an analyzer 4020 that are configured to produce interference. The baffle array controls stray light and can limit the field-of-view to a predetermined angular range such as +/−5°. The field lens array 4008 is used to control vignetting at the collimating lens array 4012.

Example 29

Spatial heterodyning in a birefringent interferometer and a SHIFT spectrometer can also be provided. One limitation of Fourier transform spectroscopy, as compared to a diffraction grating spectrometer, is that not all optical frequencies sampled by the interferometer are measured by the light detector. If the detector is only responsive between wavenumbers $\sigma = \sigma_{min}$ and $\sigma = \sigma_{max}$, then any spectral samples present spanning $0 < \sigma < \sigma_{min}$ and $\sigma > \sigma_{max}$ are effectively wasted after the detected intensity undergoes Fourier transformation. This typically means that only 25-50% of an interferogram's samples correspond to usable data. In addition, unlike a conventional diffraction-grating spectrometer, samples cannot generally be aligned to specific spectral frequencies. Conversely, in a traditional FTS, the sampling locations are determined by the sampling and Nyquist frequencies. Consequently, specific spectral locations which may correspond to spectral features of interest cannot be sampled with high spectral resolution. These limitations can be at least partially overcome with Spatial Heterodyne Interferometry (SHI) in which a carrier frequency offset is added to the FTS carrier frequency.

By tilting at least one interferometer mirror, a conventional Michelson-based FTS can produce a fringe pattern corresponding to $$I \propto \int_0^{\sigma_{max}} B(\sigma) R(\sigma)[1 + \cos(2\pi OPD(\sigma - \sigma_0))] d\sigma, \quad (34)$$

wherein $\sigma_0$ is an offset, usually corresponding to $\sigma_0 = \sigma_{min}$ such that 0 cycles/mm in an interferogram corresponds to $\sigma_{min}$. Note that this is converse to the non-heterodyned original case, wherein $\sigma = 0$ corresponded to 0 cycles/mm in the interferogram. This enables the interferometer to sample only a selected spectral region of interest; in this case, minimum and maximum wavenumbers corresponding to the responsivity of the detector. Furthermore, it enables a large frequency variation in the interferogram (I) to occur given a small spectral change in the incident spectrum, enabling the potential of sub-angstrom spectral resolution over a small spectral range $\sigma_{min}$ to $\sigma_{max}$.

FIG. 41 illustrates a SHI-based imaging spectral analyzer based on Wollaston prisms and polarizing gratings and can be made compact. In the example of FIG. 41, broadband achromatic fringes containing a single carrier frequency ($\sigma_0$), are generated by polarization grating 4102 ($PG_1$) and polarization grating 4104 ($PG_2$). These fringes are superimposed onto the broadband white-light fringes (a) generated by Wollaston prism 4106 ($WP_1$) and localized inside $WP_1$. A Wollaston prism 4108 ($WP_2$) then re-localizes the fringes onto a focal plane array 4110 (FPA). A generating linear polarizer 4112 (LPG) is used to place incident illumination into a coherent polarization state, while an analyzing linear polarizer 4114 (LPA) is used to enable the orthogonal polarization states exiting the system to interfere. A quarter-wave plate 4116 (QWP) is used to convert the right and left circular polarization states exiting the two PGs into the Wollaston prism eigenstates; specifically, right and left circular polarizations are converted into horizontal and vertical (or vice versa) polarization states.

The interference, generated by the PGs 4102, 4104 can be described by a tilt in the wavefronts exiting $PG_1$ and $PG_2$. This can be calculated by the grating equation:

$$\theta = \sin^{-1} \frac{m\lambda}{\Lambda} \approx \frac{m\lambda}{\Lambda}, \quad (35)$$

wherein $\Lambda$ is a grating period, $\lambda$ is a free-space wavelength of incident illumination, and m is a diffraction order. For a typical PG, m=0 and +/−1.

An illustration of tilted wavefronts exiting the two PGs 4102, 4104 is depicted in FIG. 42. The OPD between the two orthogonally polarized wavefronts can be calculated using the grating equation (Eq. 35) by first calculating the angle of a ray exiting PG$_2$ as:

$$\theta_o \approx \lambda\left(\frac{\Lambda_2 - \Lambda_1}{\Lambda_1 \Lambda_2}\right), \qquad (36)$$

wherein $\Lambda_1$, $\Lambda_2$ are periods of the gratings 4102, 4104, respectively. The OPD between two tilted wavefronts can be calculated, at a given x coordinate, as:

$$OPD_{pg} = 2x\lambda\left(\frac{\Lambda_2 - \Lambda_1}{\Lambda_1 \Lambda_2}\right). \qquad (37)$$

The interference fringes that are generated at the fringe localization plane are $$I \propto 1 + \cos\left(\frac{2\pi OPD}{\lambda}\right) = 1 + \cos\left(4\pi x\left(\frac{\Lambda_2 - \Lambda_1}{\Lambda_1 \Lambda_2}\right)\right). \qquad (38)$$

Note that the intensity pattern fringe frequency is only proportional to the periods of the two polarizing gratings. Due to the diffractive nature of the polarization gratings, the direct proportionality to wavelength λ in OPD as shown in Eq. 37, cancels with the inverse wavelength proportionality of the interference fringes from the left hand side of Eq. 38.

The effects of the Wollaston prism WP$_1$ on the OPD are determined. Unlike polarization gratings, a Wollaston prism will not generate a wavefront tilt that is linearly proportional to the wavelength. Conversely, sans a minor amount of high-order dispersion from the birefringent material, a Wollaston prism generates a tilt that is essentially achromatic versus wavelength. For a Wollaston prism, the OPD can be calculated as:

$$\theta_1 \approx 2B \tan(\alpha_1). \qquad (39)$$

The OPD can again be established by calculating the distance between the two orthogonally polarized wavefronts as:

$$OPD_{w1} = 2Bx \tan(\alpha_1). \qquad (40)$$

wherein B is the birefringence of the crystal material (B=$n_e$−$n_o$) and $n_e$, $n_o$ are the extraordinary and ordinary indices of refraction, respectively. By imaging the achromatic interference fringes directly into WP$_1$, the two optical path differences are combined; one dispersive (from the polarizing gratings), and the other achromatic (from the Wollaston prism). The cumulative optical path difference between the two orthogonally polarized beams becomes:

$$OPD_{pg} + OPD_{w1} = 2x\left(B\tan(\alpha_1) + \lambda\left(\frac{\Lambda_2 - \Lambda_1}{\Lambda_1 \Lambda_2}\right)\right). \qquad (41)$$

This creates a cumulative interference pattern as follows:

$$I \propto 1 + \cos\left(4\pi x\left(\frac{B\tan(\alpha_1)}{\lambda} + \left(\frac{\Lambda_2 - \Lambda_1}{\Lambda_1 \Lambda_2}\right)\right)\right). \qquad (42)$$

The carrier frequency (U) of the interferogram is a combination of wavelength dependent and wavelength independent components:

$$U = U_1(\lambda) + U_2, \qquad (43)$$

wherein $$U_1 = \frac{2B\tan(\alpha_1)}{\lambda}, \qquad (44)$$

$$U_2 = \left(\frac{\Lambda_2 - \Lambda_1}{\Lambda_1 \Lambda_2}\right). \qquad (45)$$

Here, $U_2$ is equivalent to $\sigma_0$ per Eq. 34 above. Consequently, a spatially heterodyned fringe field is located within WP$_1$. Transmission through the second Wollaston prism (WP$_2$) re-localizes this spatially heterodyned fringe field onto the FPA 4110. WP$_2$ also influences the OPD further; however, assuming it is made of the same material as WP$_1$, it only directly modifies the dispersion-related term of the OPD. The OPD of WP$_2$ can be expressed as:

$$OPD_{w2} = -2Bx \tan(\alpha_2). \qquad (46)$$

wherein the OPD is negative due to the inverse direction of the shear for WP$_2$ with respect to WP$_1$. This makes the cumulative OPD at the FPA proportional to:

$$OPD_{pg} + OPD_{w1} + OPD_{w2} \propto 2x\left(B\tan(\alpha_1) - B\tan(\alpha_2) + \lambda\left(\frac{\Lambda_2 - \Lambda_1}{\Lambda_1 \Lambda_2}\right)\right). \qquad (47)$$

Thus, the carrier frequency components are:

$$U_1 = 2B\sigma(\tan(\alpha_1) - \tan(\alpha_2)), \qquad (48)$$

$$U_2 = \left(\frac{\Lambda_2 - \Lambda_1}{\Lambda_1 \Lambda_2}\right). \qquad (49)$$

Consequently, an SHI interferometer, and by extension, high-resolution spectra over a narrow passband, can be obtained with a polarization-based instrument such as illustrated in FIG. 41.

Example 30

Figure 43:
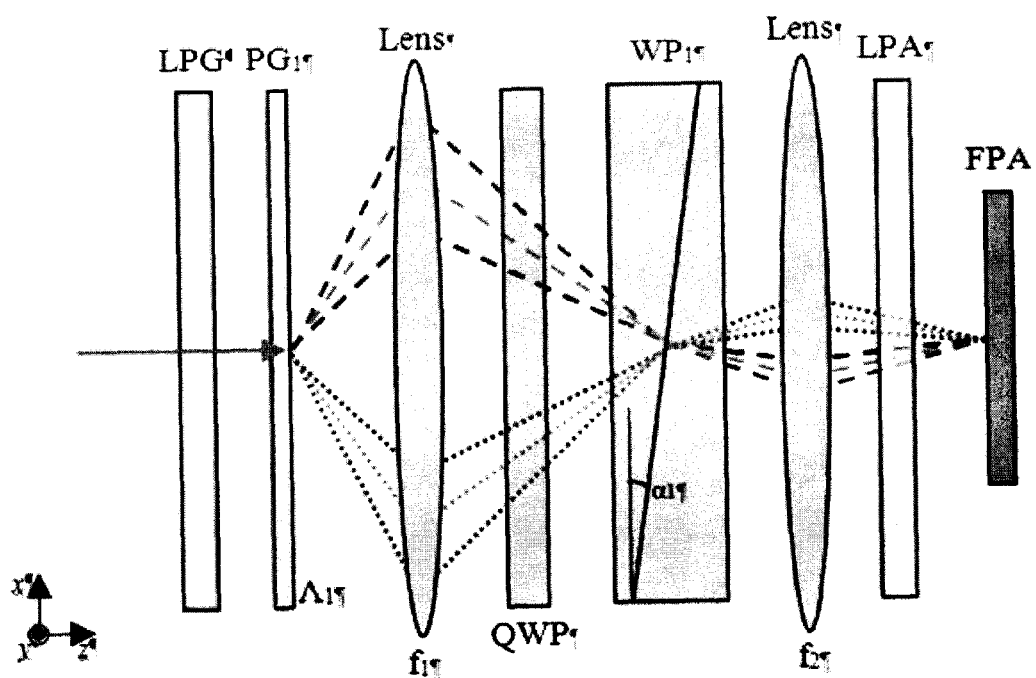
FIG. 43 is a schematic diagram of an alternative embodiment in which fringes are re-localized using lenses instead of a polarizing grating and a Wollaston prism.
Figure 44:
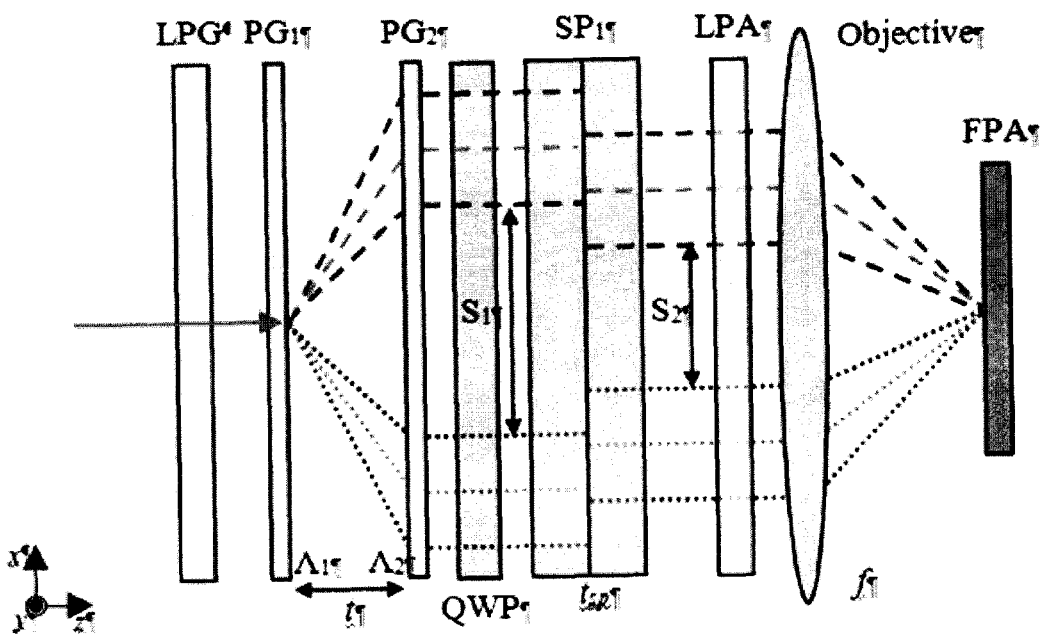
FIG. 44 is a schematic diagram of an alternative embodiment in which fringes are localized at infinity and collimated illumination is used through polarization gratings and a Savart plate.

FIG. 43 illustrates another embodiment in which relay lenses transfer interference fringes from one plane to a following plane. This embodiment is similar to that of FIG. 41 with PG$_2$ and WP$_2$ replaced with relay lenses. In this alternative, the interference fringes generated by PG$_1$ are re-localized onto WP$_1$ using a lens with focal length $f_1$ and an additional polarizing grating is unnecessary. Similarly, the interference fringes located within WP$_1$ are relayed onto the FPA with a lens of focal length $f_2$. This lens substitutes for the second Wollaston prism WP$_2$ of FIG. 41. In other examples, the FPA could be situated directly behind WP$_1$. However, since the fringes are technically localized at the wedge of WP$_2$, fringe visibility may be diminished in such a configuration. Furthermore, two PGs and one lens could be used instead of an additional Wollaston prism, or alternatively, one polarizing grating and one lens with two Wollaston prisms could be used instead of an additional polarizing grating.

Example 31

The embodiments described above generally use image-plane interferometers to generate SHI fringes. However, polarization components can also be used within the pupil of an optical system, such that all the interference fringes are localized at infinity. This can be beneficial, since the SHI would have collimated light transmitted through it, rather than converging light. Such factors can influence fringe visibility, or alternatively, can influence the minimum F/# (or speed) at which the interferometer can be operated. Typically, image plane interferometers (such as those of FIGS. 41, 43) have more difficulty with low F/# systems than do pupil interferometers.

A representative pupil interferometer configuration with two polarizing gratings and one Savart plate (SP) is illustrated in FIG. 43. In this embodiment, the two polarization gratings are used as in FIGS. 41, 42. Interference fringes from $PG_1$ and $PG_2$ are localized at infinity be setting the two PG periods to be equal ($\Lambda = \Lambda_1 = \Lambda_2$). This can produce white-light polarization interference fringes. The two PGs produce a shear ($S_1$) that is linearly proportional to the wavelength:

$$S_1 \approx 2\frac{\lambda}{\Lambda}t. \tag{50}$$

wherein t is the distance between $PG_1$ and $PG_2$. Transmission of the two orthogonally circularly polarized beams through the QWP converts them to orthogonally polarized linear beams.

After transmission through the QWP, the beams are incident upon a Savart Plate (SP). Similarly to the Wollaston prisms in other examples, the SP creates, to first order, an achromatic shear that is independent of the wavelength. The shear of the SP can be expressed as $$S_{SP} = \sqrt{2}\frac{n_e^2 - n_o^2}{n_e^2 + n_o^2}t_{sp}, \ldots \tag{51}$$

wherein $t_{sp}$ is the thickness of the SP and $n_e$, $n_o$ are the extraordinary and ordinary indices of refraction, respectively. Consequently, transmission of the sheared beams, from the PGs, through the SP creates a constant offset. This creates a second shear $S_2$, that can be calculated as $S_1 - S_{SP}$:

$$S_2 = \left(2\frac{\lambda}{\Lambda}t - \sqrt{2}\frac{n_e^2 - n_o^2}{n_e^2 + n_o^2}t_{sp}\right). \tag{52}$$

One term is linearly proportional to wavelength and another term that is essentially achromatic. In this system, an OPD is created after transmission through the objective lens. The OPD is:

$$OPD = S_{shear} \sin(\theta) \approx S_{shear} \theta, \tag{53}$$

wherein $S_{shear}$ is the shear generated by the combination of the PGs and SP (shear $S_2$). Here, $\theta$ is proportional to the focal length of the objective lens (f), and the image-plane coordinate (x), such that $\theta = x/f$ The intensity pattern on the FPA is then proportional to:

$$I \propto 1 + \cos\left(\frac{2\pi x}{f}\left(\frac{2t}{\Lambda} - \frac{\sqrt{2}}{\lambda}\frac{n_e^2 - n_o^2}{n_e^2 + n_o^2}t_{sp}\right)\right). \tag{54}$$

This can be decomposed into a wavelength dependent and wavelength independent part as:

$$U = U_1(\lambda) + U_2, \tag{55}$$

wherein $$U_1 = -\frac{\sqrt{2}}{\lambda f}\frac{n_e^2 - n_o^2}{n_e^2 + n_o^2}t_{sp}, \tag{56}$$

$$U_2 = \frac{2t}{\Lambda f}. \tag{57}$$

Again, $U_2$ is equivalent to a heterodyne offset similar to $\sigma_0$ of Eq. 34 above.

Example 32

Figure 45:
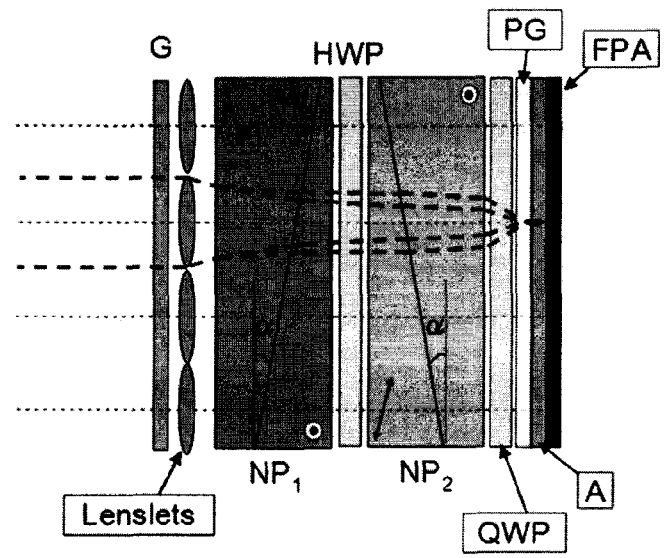
FIG. 45 is a schematic diagram of an imaging spatial heterodyne spectrometer.

In an example of a spatially heterodyned SHIFT spectrometer illustrated in FIG. 45, a plurality of Nomarski prisms (NP) or Wollaston prisms (WP), linear polarizers (LPs), polarization gratings (PG), and waveplates (QWP or HWP) are situated along an axis. Generally, the waveplates are used to rotate the eigenmodes of the polarization states between the different components. A PG is then used to spatially heterodyne the interference fringes from the two NPs. A lenslet array is included to create an array of sub-images onto an FPA. Generally, the interference fringes can be optically relayed between any of the fringe localization planes using lenses, or by use of a combination of birefringent optical elements.

Example 33

Figure 46:
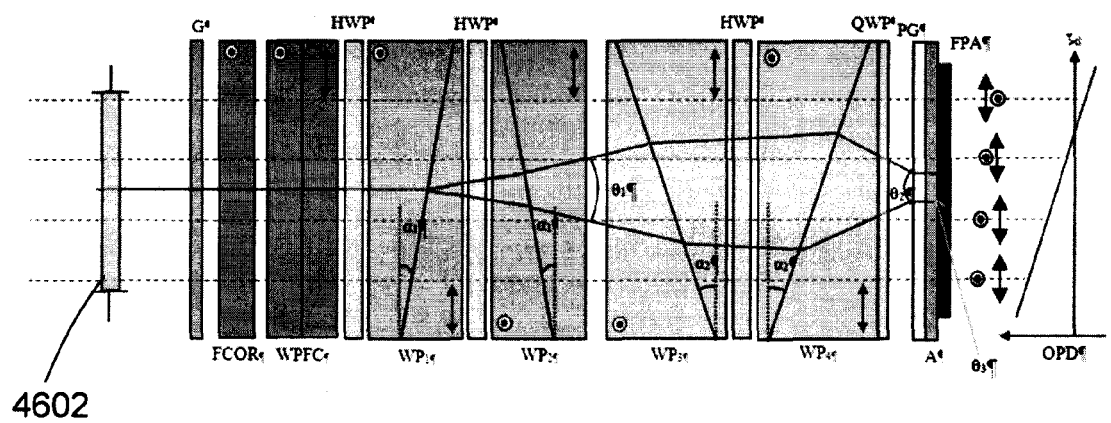
FIG. 46 is a schematic diagram of a non-imaging spatial heterodyne spectrometer (SHS) device.

With reference to FIG. 46, a field widened birefringent SHS is depicted. A depolarizer 4602 is coincident with an input aperture, and can reduce instrumental dependence on incident polarization state. Depolarized light is then converted into a 45° linear polarization state by a generating polarizer (G). Light is then transmitted through a field compensated offset retarder (FCOR), which delays the relative phase of the two orthogonal components. This is equivalent to setting a retardance offset by making the two path-lengths in a Michelson-SHS different (i.e. $d_1 \neq d_2$). A Wollaston prism field compensator (WPFC) compensates the optical path difference (OPD) versus field of view (FOV) of the interferometer (i.e. field-widening), thereby increasing the system's overall étendue. Light then reaches the first pair of identical, but orthogonally oriented, Wollaston prisms $WP_1$ and $WP_2$.

Inserting a half wave plate (HWP) between $WP_1$ and $WP_2$ doubles the splitting angle, instead of negating it, with respect to that of a single Wollaston prism (WP). This orientation of prism pairs also maintains optical path difference symmetry between the prisms, enabling the fringes to remain localized within a plane normal to the optical axis, instead of at the wedge. Such a combination of $WP_1$ and $WP_2$ is referred to herein as fringe localization compensated (FLC) prisms. The angle between the two orthogonally polarized beams exiting the first ($WP_1$ and $WP_2$) and second ($WP_3$ and $WP_4$) WP pair is $$\theta_2 = 4B(\tan(\alpha_1) - \tan(\alpha_2)), \tag{58}$$

wherein B=($n_e$−$n_o$) is the birefringence of the uniaxial crystal, $n_o$ and $n_e$ are the ordinary and extraordinary indices of refraction, respectively, and $\alpha_1$ and $\alpha_2$ are the prism apex angles for the first and second WP pairs, respectively. Since $|\alpha_2|>|\alpha_1|$, light transmitted by WP$_3$ and WP$_4$ now converges towards the optical axis into a non-virtual (real) fringe localization plane. In order to induce a spatial heterodyning wavelength, a polarization grating (PG) is inserted. In a PG, right and left circularly polarized light diffracts into the +1$^{st}$ or −1$^{st}$ diffraction order according to the classical grating equation:

$$\theta_{PG} \approx \frac{m\lambda}{\Lambda}, \quad (59)$$

wherein m is a diffraction order, π is the free-space wavelength, and Λ is the period of the PG. Since the eigenpolarizations of the PG are circular, a quarter-wave plate (QWP) is included at the output of WP$_4$ so that the linearly polarized light exiting WP$_4$ is converted into circularly polarized light. Upon exiting the PG, the total angle between the two orthogonally polarized beams, to first order, is:

$$\theta_3 = 4B(\tan(\alpha_1) - \tan(\alpha_2)) + \frac{2\lambda}{\Lambda}. \quad (60)$$

Transmission through the analyzing polarizer (A) unifies the polarization state, thereby enabling the two polarized beams to generate interference fringes that are measured by the focal plane array (FPA). The optical path difference can be calculated by multiplying Eq. (60) by the spatial coordinate of the FPA, x, and by including the retardance of the FCOR as:

$$OPD = x\left[4B(\tan(\alpha_1) - \tan(\alpha_2)) + \frac{2\lambda}{\Lambda}\right] + \Delta_{FCOR}. \quad (61)$$

Substitution of the OPD into the standard two-beam interference equation produces the interferogram:

$$I \propto \int_0^\infty K(\sigma)R(\sigma)\left[1 + \cos\left(2\pi x\left[4B(\tan(\alpha_1) - \tan(\alpha_2))\sigma + \frac{2}{\Lambda}\right] + 2\pi\Delta_{FCOR}\right)\right]d\sigma. \quad (62)$$

From Eq. (62), the heterodyne offset $\sigma_0$ is $$\sigma_0 = \frac{2}{\Lambda}. \quad (63)$$

The heterodyne wavelength can be calculated by setting the term inside the square brackets, per Eq. (62), equal to zero. Solving for $\lambda_0$ ($\sigma=1/\lambda_0$) yields $$\lambda_0 = -2B\Lambda(\tan(\alpha_1) - \tan(\alpha_2)). \quad (64)$$

Therefore, by combining a Wollaston prism-based Fourier transform spectrometer with a polarization grating, a spatially heterodyned interferogram can be generated. This provides an added advantage in that objective lenses are not necessary to re-localize a virtual fringe field onto the FPA, as is the case with reflective SHS instruments.

Example 34

Figure 47:
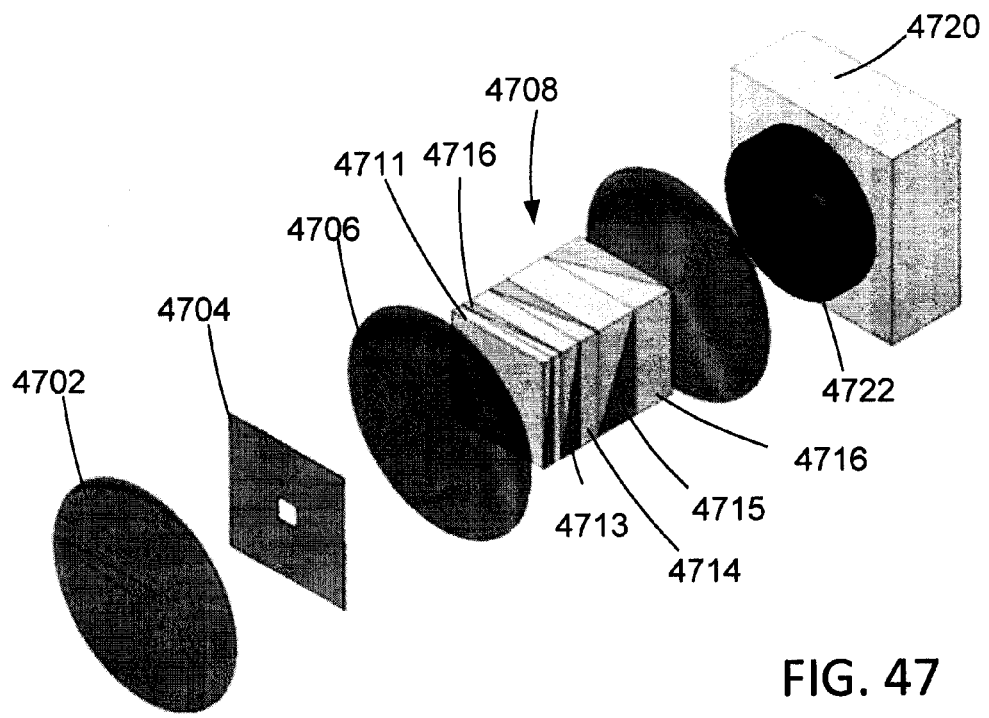
FIG. 47 is a schematic diagram of a representative Wollaston prism (WP) interference Fourier transform spectrometer (WIFTS) that includes a series of 6 Wollaston prisms to produce an 8 by 8 array of sub-images at a focal plane array (FPA).

With reference to FIG. 47, a primary lens 4702 is situated to produce an image of a scene or object at a field stop 4704. A first re-imaging lens 4706 collimates the image and directs the collimated image to a WP stack 4708 that comprises WPs 4711-4716. The WPs 4711, 4713, 4715 are defined by wedge angles along a first axis, and WPs 4712, 4714, 4716 are defined by wedge angles along a second axis that is perpendicular to the first axis. In order to provide a proper polarization state into the Wollaston series, a polarizer at 45° is inserted in just behind the first re-imaging lens but is not shown in FIG. 47. The Wollaston series is then able to split the 'single beam' of the field stop into 64 beams, which then creates 64 (8×8) copies of the image in the field stop onto a FPA 4720. A rotated Wollaston prism with an analyzer 4722 is situated just prior to the FPA 4720. When the 8×8 array of images is imaged onto this rotated Wollaston, reconstruction of a 3D data cube of interferograms and spectra can then be accomplished. Therefore, such an arrangement has the advantages of high temporal registration (snapshot) with a common path interference system. Additionally, any complex imaging system can be used with this instrument (such as a large astronomical telescope, or other sophisticated imaging lens or mirror systems).

Figure 48:
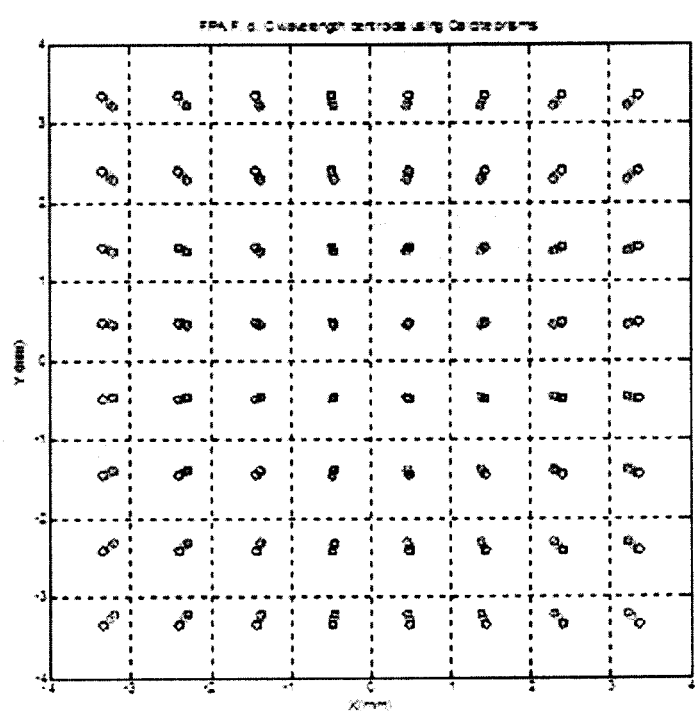
FIG. 48 illustrates calculated dispersion effects associated with calcite Wollaston prisms. Centroids for F (486.1 nm), d (587.5 nm), and C (656.2 nm) wavelengths are shown for each of the sub-images of an 8 by 8 array.

In the example of FIG. 47, 6 Wollaston prisms are used to obtain 64 images in an 8×8 array, but more or fewer Wollaston prisms can be used and these can be arranged differently. If N is a total number of Wollaston prism used to produce sub-images along a particular axis, then a number of images created by these prisms is $2^N$. For example, as shown in FIG. 48, the number of sub-images in each of the x and y directions is $2^3$ (N=3). If N=7 Wollaston prisms were arranged to produced images along a single axis, 27=128 sub-images in a 1 by 128 array. These N=7 Wollaston prisms can also be arranged to produce sub-images along different axes. For example, N=3 WPs and N=4 WPs can be arranged to produced sub-images along an x and a y axis, respectively, to produce 128 sub-images in an 8×16 array. N=8 Wollaston prisms can be used to form 256 sub-images in a 16×16 array.

Example 35

Wollaston prisms formed of calcite are dispersive, and any array of sub-images will generally exhibit image displacements that are function of wavelength. For the representative series of N=6 calcite WPs illustrated in FIG. 45 above, F, d, and C wavelength centroids (486.1 nm, 587.5 nm, and 656.2 nm, respectively) at the FPA and a sample image would appear as shown in FIG. 48. C wavelength centroids are the innermost, and F wavelength centroids are the outermost. Interference effects due to the last Wollaston prism at the FPA are not included. As can be seen from FIG. 48, the amount of dispersion to obtain the required image split is high, especially for the images towards the corner of the FPA. An excellent achromatic Wollaston prism can be made by combining Calcite and Yttrium Vanadate (YVO$_4$). In fact, the partial dispersion ratios of these two materials are nearly identical. Since the secondary dispersion is dependent upon the difference of the partial dispersion ratios, this means that this not only creates an achromatic prism, but it is roughly apochromatic.

Example 36

Figure 49:
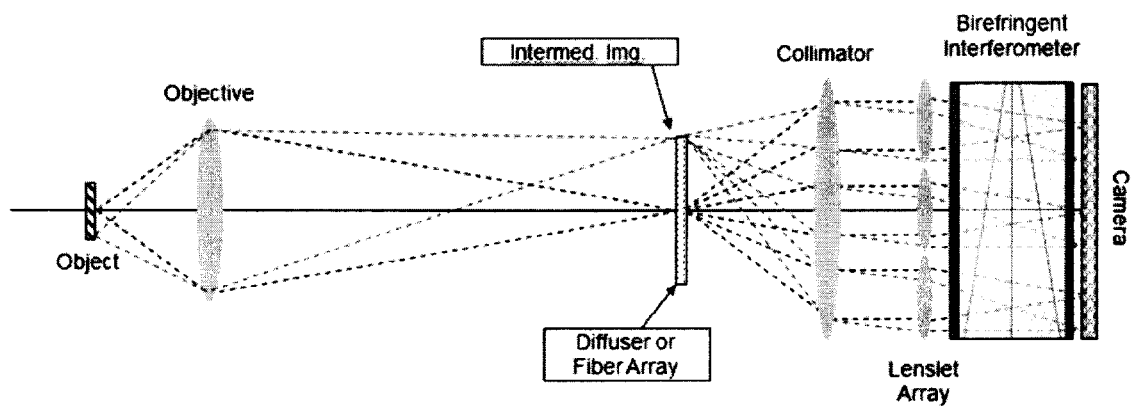
FIG. 49 illustrates a birefringent interferometer coupled to a microscope.
Figure 50:
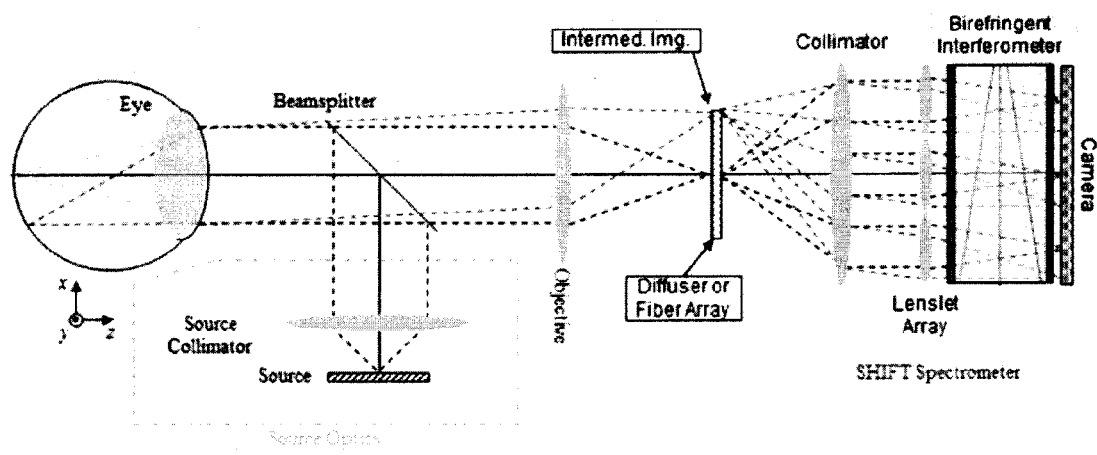
FIG. 50 illustrates a Snapshot Hyperspectral Imaging Fourier Transform (SHIFT) sensor configured for retinal imaging.

FIGS. 49-50 illustrate representative applications of SHIFT sensors. FIG. 49 illustrates use with a microscope, and FIG. 50 illustrates retinal imaging with a fundus camera. In some applications, a diffuser is positioned to avoid parallax. The disclosed systems can be used in a variety of other applications.

The examples above are representative only and are selected for purposes of illustration. In other examples, the same or different combinations of polarization parameters such as Stokes parameters can be estimated, and interferometers that include additional reflective surfaces and/or polarization diffraction gratings can be used. Some examples are described with respect to linear polarizers, but in other examples, circular polarizers can be used. In view of the many possible embodiments to which the principles of the disclosed technology may be applied, it should be recognized that the illustrated embodiments are only preferred examples and should not be taken as limiting. We claim as our invention all that comes within the scope and spirit of the appended claims.

We claim:

1. An apparatus, comprising:
    an optical modulation system situated to modulate an optical flux received from an object so as to produce a modulated imaging optical intensity associated with a corresponding modulation of at least one Stokes parameter associated with the optical flux; and
    an optical demodulator situated to demodulate the modulated imaging optical intensity and produce a viewable image associated with at least one Stokes parameter associated with the received optical flux.

2. The apparatus of claim 1, wherein the at least one Stokes parameter includes $S_1$, $S_2$, and combinations thereof.

3. The apparatus of claim 1, wherein the optical modulation system is situated to apply a polarization dependent modulation at a first spatial frequency and the optical demodulator is situated to apply a demodulation corresponding to the first spatial frequency.

4. The apparatus of claim 3, wherein the optical demodulator includes a grating configured to establish the demodulation associated with the first spatial frequency.

5. The apparatus of claim 4, wherein a period of the grating corresponds to the first spatial frequency.

6. The apparatus of claim 4, wherein the grating is a polarization grating.

7. The apparatus of claim 3, wherein the optical demodulator includes a polarization grating having a period corresponding to the first spatial frequency and situated to produce modulation at a spatial frequency corresponding to twice the first spatial frequency.

8. The apparatus of claim 1, wherein the optical demodulator includes a first phosphor, a grating, and a second phosphor, wherein the first phosphor is situated to produce a modulated intensity corresponding to the modulated imaging optical intensity and direct the modulated intensity to the grating so that the grating delivers a grating modulated intensity to the second phosphor.

9. The apparatus of claim 8, wherein the optical demodulator includes a spatial filter situated to transmit a baseband portion of the grating modulated intensity.

10. The apparatus of claim 9, further comprising an eyepiece situated for viewing the baseband demodulated optical intensity.

11. The apparatus of claim 1, wherein the optical demodulator includes a sensor array configured to produce an electronic image associated with the modulated imaging optical intensity and a display system situated to deliver a modulated optical intensity to the optical demodulator.

12. A method, comprising:
    producing an imaging optical beam having a periodic modulation associated with at least one Stokes parameter of optical radiation from an object; and
    applying a corresponding optical demodulation to the periodically modulated imaging optical beam.

13. The method of claim 12, further comprising spatially filtering the demodulated, periodically modulated optical beam.

14. The method of claim 13, wherein the spatial filtering attenuates spatial frequency components at a spatial frequency corresponding to the periodic modulation of the imaging optical beam.

15. The method of claim 13, wherein the spatial filtering i directs spatial frequency components at a spatial frequency corresponding to a difference between a spatial frequency of the periodic modulation of the imaging optical beam and a spatial frequency associated with the optically applied demodulation.

16. The method of claim 13, wherein the optical demodulation is applied with a grating having a period corresponding to the periodic modulation of the imaging optical beam.

17. The method of claim 16, wherein the periodically modulated imaging optical beam is produced by directing an optical beam from the object to a phosphor.

18. The method of claim 16, wherein the periodically modulated imaging beam is produced by directing an optical beam from the object to an image sensor, and producing the modulated imaging beam by displaying an image based on a detected image from the image sensor.

19. The method of claim 12, further comprising forming an image based on the demodulation applied to the periodically modulated imaging optical beam.

* * * * *